US011138009B2

(12) United States Patent
Babich, Jr. et al.

(10) Patent No.: US 11,138,009 B2
(45) Date of Patent: Oct. 5, 2021

(54) ROBUST, EFFICIENT MULTIPROCESSOR-COPROCESSOR INTERFACE

(71) Applicant: NVIDIA Corporation, San Jose, CA (US)

(72) Inventors: Ronald Charles Babich, Jr., Murrysville, PA (US); John Burgess, Austin, TX (US); Jack Choquette, Palo Alto, CA (US); Tero Karras, Uusimaa (FI); Samuli Laine, Uusimaa (FI); Ignacio Llamas, Palo Alto, CA (US); Gregory Muthler, Austin, TX (US); William Parsons Newhall, Jr., Woodside, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 3 days.

(21) Appl. No.: 16/101,247

(22) Filed: Aug. 10, 2018

(65) Prior Publication Data

US 2020/0050451 A1    Feb. 13, 2020

(51) Int. Cl.
| | |
|---|---|
| *G06F 9/30* | (2018.01) |
| *G06F 9/38* | (2018.01) |
| *G06T 1/20* | (2006.01) |
| *G06T 1/60* | (2006.01) |
| *G06F 9/48* | (2006.01) |

(52) U.S. Cl.
CPC ......... *G06F 9/3004* (2013.01); *G06F 9/3877* (2013.01); *G06F 9/4843* (2013.01); *G06T 1/20* (2013.01); *G06T 1/60* (2013.01); *G06T 2200/28* (2013.01)

(58) Field of Classification Search
CPC .................................................... G06F 9/3004
See application file for complete search history.

(56) References Cited

U.S. PATENT DOCUMENTS

| | | | | |
|---|---|---|---|---|
| 5,706,489 A | * | 1/1998 | Chi ..................... | G06F 9/30076 712/228 |
| 6,782,445 B1 | * | 8/2004 | Olgiati ................. | G06F 9/3879 710/35 |
| 7,734,895 B1 | * | 6/2010 | Agarwal .................. | G06F 8/52 712/13 |
| 8,645,634 B1 | * | 2/2014 | Cox ........................ | G06F 13/28 711/147 |
| 2007/0113048 A1 | * | 5/2007 | Royer ................... | G06F 9/3879 712/34 |
| 2009/0183161 A1 | * | 7/2009 | Kolinummi ........... | G06F 9/3012 718/102 |

(Continued)

*Primary Examiner* — Michael J Metzger
(74) *Attorney, Agent, or Firm* — Nixon & Vanderhye PC

(57) ABSTRACT

Systems and methods for an efficient and robust multiprocessor-coprocessor interface that may be used between a streaming multiprocessor and an acceleration coprocessor in a GPU are provided. According to an example implementation, in order to perform an acceleration of a particular operation using the coprocessor, the multiprocessor: issues a series of write instructions to write input data for the operation into coprocessor-accessible storage locations, issues an operation instruction to cause the coprocessor to execute the particular operation; and then issues a series of read instructions to read result data of the operation from coprocessor-accessible storage locations to multiprocessor-accessible storage locations.

21 Claims, 37 Drawing Sheets

Example Parallel Processing Unit

(56) References Cited

U.S. PATENT DOCUMENTS

| | | | |
|---|---|---|---|
| 2012/0213360 A1* | 8/2012 | Le Quere | G06F 9/3877 380/28 |
| 2013/0304990 A1* | 11/2013 | Bass | G06F 12/0835 711/118 |
| 2013/0318329 A1* | 11/2013 | Takeuchi | G06F 7/4806 712/221 |
| 2017/0192921 A1* | 7/2017 | Wang | G06F 12/0811 |

* cited by examiner

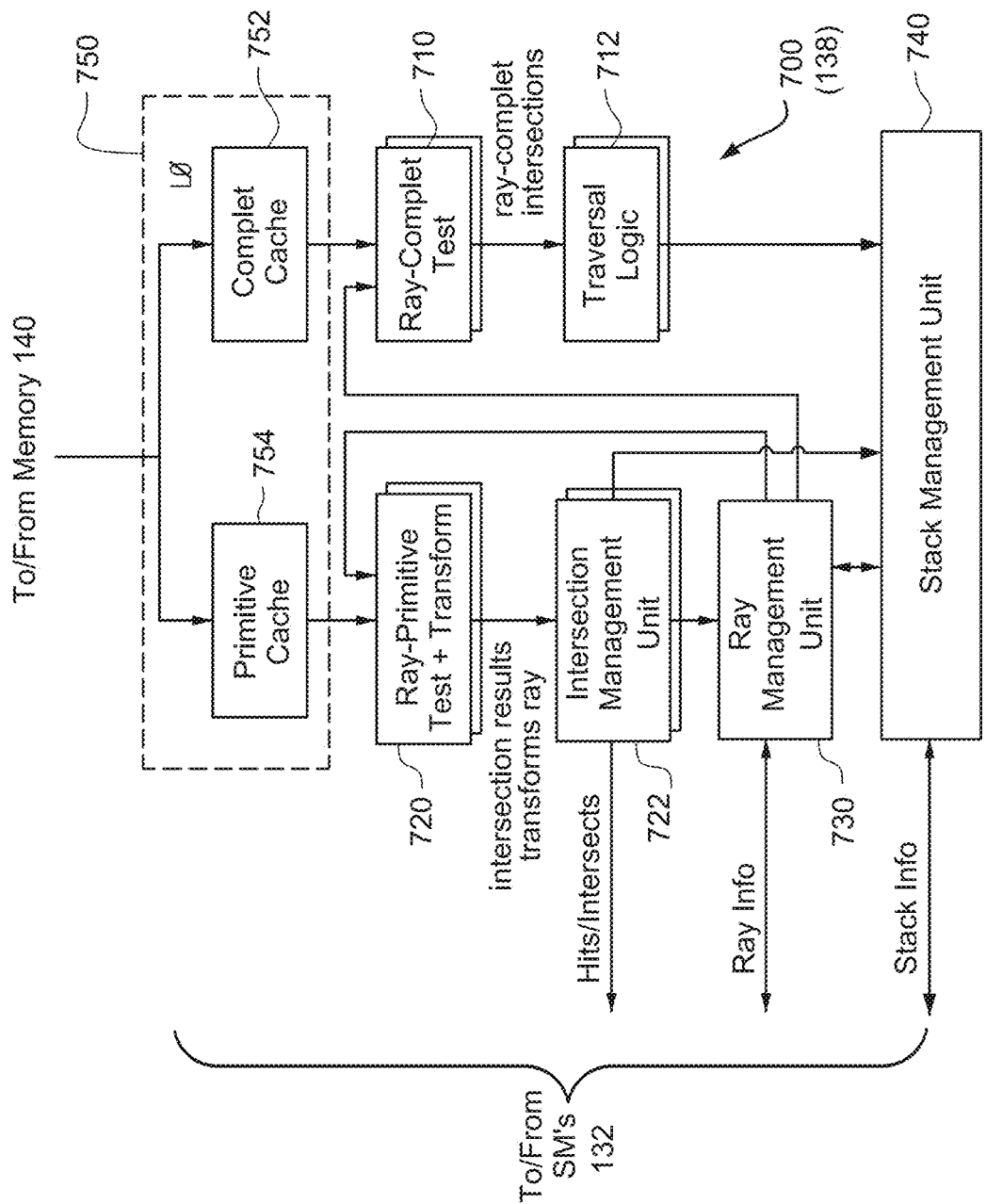
FIG. 9 TRAVERSAL COPROCESSOR

Example Ray Tracing Shading Pipeline

Example Process To Generate an Image

Example Parallel Processing Unit

Example Memory Partition Unit

Example General Processing Cluster

Graphics Processing Pipeline

Example Streaming Multiprocessor

Example Streaming Multiprocessor

ROBUST, EFFICIENT MULTIPROCESSOR-COPROCESSOR INTERFACE

CROSS-REFERENCE TO RELATED PATENTS AND APPLICATIONS

This application is related to the following commonly-assigned US patents and patent applications, the entire contents of each of which are incorporated by reference: U.S. application Ser. No. 14/563,872 titled "Short Stack Traversal of Tree Data Structures" filed Dec. 8, 2014; U.S. Pat. No. 9,582,607 titled "Block-Based Bounding Volume Hierarchy"; U.S. Pat. No. 9,552,664 titled "Relative Encoding For A Block-Based Bounding Volume Hierarchy" as; U.S. Pat. No. 9,569,559 titled "Beam Tracing" filed Mar. 18, 2015; U.S. Pat. No. 10,025,879 titled "Tree Data Structures Based on a Plurality of Local Coordinate Systems"; U.S. application Ser. No. 14/737,343 titled "Block-Based Lossless Compression of Geometric Data" filed Jun. 11, 2015; and the following US Applications filed concurrently herewith:

- U.S. application Ser. No. 16/101,066 filed Aug. 10, 2018, (U.S. Pat. No. 10,580,196 issued Mar. 3, 2020) titled "Method for Continued Bounding Volume Hierarchy Traversal On Intersection Without Shader Intervention";
- U.S. application Ser. No. 16/101,109 filed Aug. 10, 2018, titled "Method for Efficient Grouping of Cache Requests for Datapath Scheduling";
- U.S. application Ser. No. 16/101,180 filed Aug. 10, 2018, (U.S. Pat. No. 10,867,429 issued Dec. 15, 2020) titled "Query-Specific Behavioral Modification of Tree Traversal";
- U.S. application Ser. No. 16/101,148 filed Aug. 10, 2018, (U.S. Pat. No. 10,825,230 issued Nov. 3, 2020) titled "Conservative Watertight Ray Triangle Intersection";
- U.S. application Ser. No. 16/101,196 filed Aug. 10, 2018, (U.S. Pat. No. 10,740,952 issued Aug. 11, 2020) titled "Method for Handling of Out-of-Order Opaque and Alpha Ray/Primitive Intersections"; and
- U.S. application Ser. No. 16/101,232 filed Aug. 10, 2018, (U.S. Pat. No. 10,885,698 issued Jun. 5, 2021) titled "Method for Forward Progress and Programmable Timeouts of Tree Traversal Mechanisms in Hardware".

FIELD

The present technology relates to multiprocessor-coprocessor interfaces. In one particular application, the technology relates to hardware acceleration of computer graphics processing including but not limited to ray tracing. Still more particularly, an example non-limiting technology herein relates to a hardware-based traversal coprocessor that efficiently traverses an acceleration data structure e.g., for real time ray tracing.

BACKGROUND & SUMMARY

If you look around the visual scene before you, you will notice that some of the most interesting visual effects you see are produced by light rays interacting with surfaces. This is because light is the only thing we see. We don't see objects—we see the light that is reflected or refracted by the objects. Most of the objects we can see reflect light (the color of an object is determined by which parts of light the object reflects and which parts it absorbs). Shiny surfaces such as metallic surfaces, glossy surfaces, ceramics, the surfaces of liquids and a variety of others (even the corneas of the human eyes) act as mirrors that specularly reflect light. For example, a shiny metal surface will reflect light at the same angle as it hit the surface. An object can also cast shadows by preventing light from reaching other surfaces that are behind the object relative to a light source. If you look around, you will notice that the number and kinds of reflections and the number, kinds and lengths of shadows depend on many factors including the number and type of lights in the scene. A single point light such as a single faraway light bulb will produce single reflections and hard shadows. Area light sources such as windows or light panels produce different kinds of reflection highlights and softer shadows. Multiple lights will typically produce multiple reflections and more complex shadows (for example, three separated point light sources will produce three shadows which may overlap depending on the positions of the lights relative to an object).

If you move your head as you survey the scene, you will notice that the reflections change in position and shape (the shadows do the same). By changing your viewpoint, you are changing the various angles of the light rays your eyes detect. This occurs instantaneously—you move your head and the visual scene changes immediately.

The simple act of drinking a cup of tea is a complex visual experience. The various shiny surfaces of the glossy ceramic cup on the table before you reflect each light in the room, and the cup casts a shadow for each light. The moving surface of the tea in the cup is itself reflective. You can see small reflected images of the lights on the tea's surface, and even smaller reflections on the part of the tea's surface where the liquid curves up to meet the walls of the cup. The cup walls also cast shadows onto the surface of the liquid in the cup. Lifting the cup to your mouth causes these reflections and shadows to shift and shimmer as your viewpoint changes and as the surface of the liquid is agitated by movement.

We take these complexities of reflections and shadows for granted. Our brains are adept at decoding the positions, sizes and shapes of shadows and reflections and using them as visual cues. This is in part how we discern the position of objects relative to one another, how we distinguish one object from another and how we learn what objects are made of. Different object surfaces reflect differently. Specular (mirror type) reflection of hard metal creates images of reflected objects, while diffuse reflection off of rough surfaces is responsible for color and lights up objects in a softer way. Shadows can be soft and diffuse or hard and distinct depending on the type of lighting, and the lengths and directions of the shadows will depend on the angle of the light rays relative to the object and our eyes.

Beginning artists typically don't try to show reflection or shadows. They tend to draw flat scenes that have no shadows and no reflections or highlights. The same was true with computer graphics of the past.

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every 1/30th or 1/60th of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

Some have built other technologies onto this basic scan conversion rasterization approach to allow real time graphics systems to accomplish a certain amount of realism in rendering shadows and reflections. For example, texture mapping has sometimes been used to simulate reflections and shadows in a 3D scene. One way this is commonly done is to transform, project and rasterize objects from different perspectives, write the rasterized results into texture maps, and sample the texture maps to provide reflection mapping, environment mapping and shadowing. While these techniques have proven to be useful and moderately successful, they do not work well in all situations. For example, so-called "environment mapping" may often require assuming the environment is infinitely distant from the object. In addition, an environment-mapped object may typically be unable to reflect itself. See e.g., http://developer.download.nvidia.com/CgTutorial/cg_tutorial_chapter07.html. These limitations result because conventional computer graphics hardware—while sufficiently fast for excellent polygon rendering—does not perform the light visualization needed for accurate and realistic reflections and shadows. Some have likened raster/texture approximations of reflections and shadows as the visual equivalent of AM radio.

There is another graphics technology which does perform physically realistic visibility determinations for reflection and shadowing. It is called "ray tracing". Ray tracing was developed at the end of the 1960's and was improved upon in the 1980's. See e.g., Apple, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

Much research has been done on making the process of tracing rays more efficient and timely. See e.g., Glassner, An Introduction to Ray Tracing (Academic Press Inc., 1989). Because each ray in ray tracing is, by its nature, evaluated independently from the rest, ray tracing has been called "embarrassingly parallel." See e.g., Akenine-Möller et al., Real Time Rendering at Section 9.8.2, page 412 (Third Ed.

CRC Press 2008). As discussed above, ray tracing involves effectively testing each ray against all objects and surfaces in the scene. An optimization called "acceleration data structure" and associated processes allows the graphics system to use a "divide-and-conquer" approach across the acceleration data structure to establish what surfaces the ray hits and what surfaces the ray does not hit. Each ray traverses the acceleration data structure in an individualistic way. This means that dedicating more processors to ray tracing gives a nearly linear performance increase. With increasing parallelism of graphics processing systems, some began envisioning the possibility that ray tracing could be performed in real time. For example, work at Saarland University in the mid-2000's produced an early special purpose hardware system for interactive ray tracing that provided some degree of programmability for using geometry, vertex and lighting shaders. See Woop et al., "RPU: A Programmable Ray Processing Unit for Real Time Ray Tracing" (ACM 2005). As another example, Advanced Rendering Technology developed "RenderDrive" based on an array of AR250/350 rendering processors derived from ARM1 and enhanced with custom pipelines for ray/triangle intersection and SIMD vector and texture math but with no fixed-function traversal logic. See e.g., http://www.graphicshardware.org/previous/www_2001/presentations/Hot3D_Daniel_Hall.pdf.

Then, in 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US20160070820; and US20160070767.

Given the great potential of a truly interactive real time ray tracing graphics processing system for rendering high quality images of arbitrary complexity in response for example to user input, further work is possible and desirable.

BRIEF DESCRIPTION OF THE DRAWINGS

FIG. 9 shows a simplified example non-limiting traversal co-processor comprising a tree traversal unit (TTU).

DETAILED DESCRIPTION OF NON-LIMITING EMBODIMENTS

Figure 1:
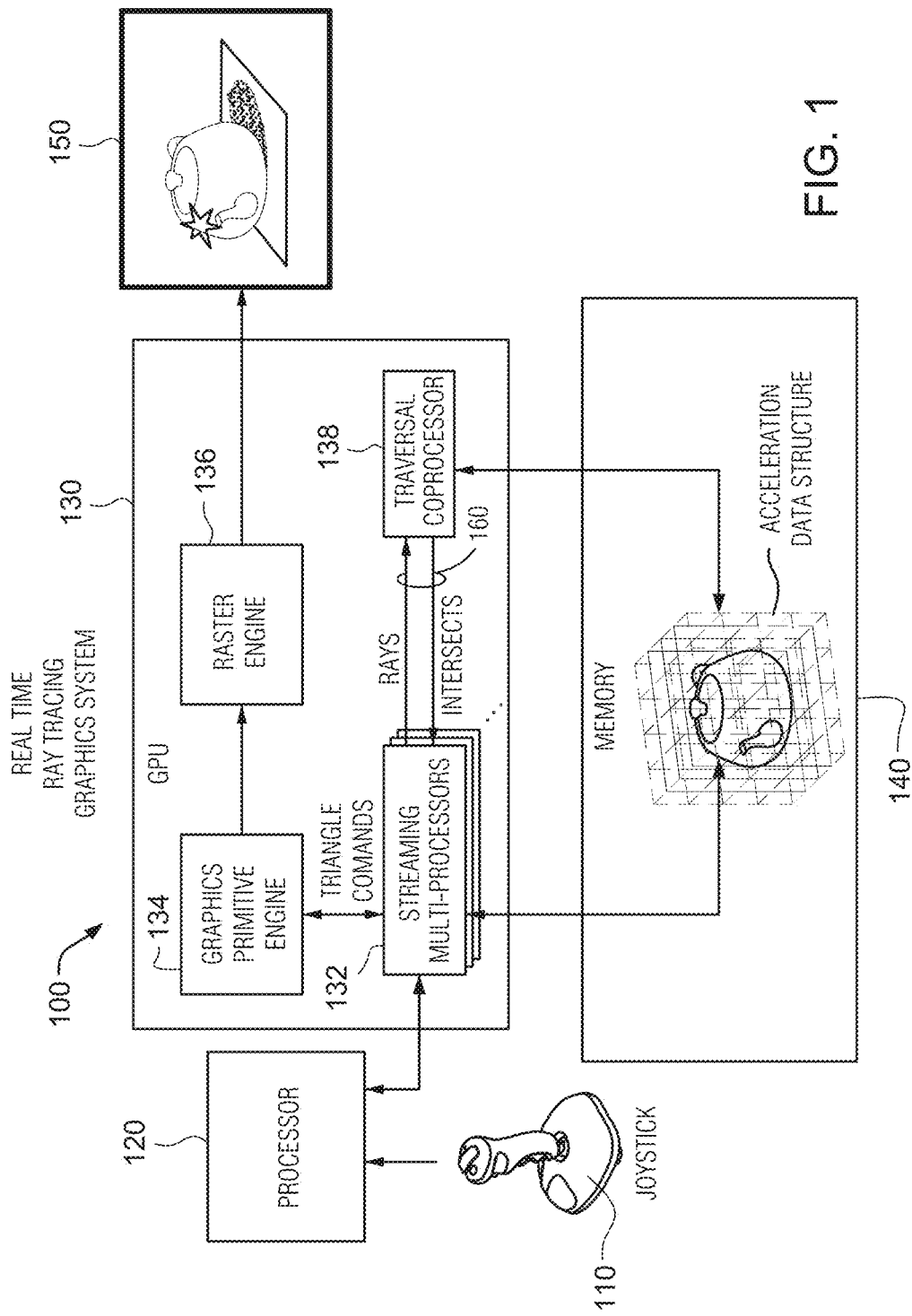
FIG. 1 illustrates an example non-limiting ray tracing graphics system.

The technology herein provides hardware capabilities that accelerate ray tracing to such an extent that it brings the power of ray tracing to games and other interactive real time computer graphics, initially enabling high effect quality in shadows and reflections and ultimately global illumination. In practice, this means accelerating ray tracing by a factor of up to an order of magnitude or more over what would be possible in software on the same graphics rendering system.

In more detail, the example non-limiting technology provides dedicated hardware to accelerate ray tracing. In non-limiting embodiments, a hardware co-processor (herein referred to as a "traversal coprocessor" or in some embodiments a "tree traversal unit" or "TTU") accelerates certain processes supporting interactive ray tracing including ray-bounding volume intersection tests, ray-primitive intersection tests and ray "instance" transforms.

In some non-limiting embodiments, the traversal co-processor performs queries on an acceleration data structure for processes running on potentially massively-parallel streaming multiprocessors (SMs). The traversal co-processor traverses the acceleration data structure to discover information about how a given ray interacts with an object the acceleration data structure describes or represents. For ray tracing, the traversal coprocessors are callable as opposed to e.g., fixed function units that perform an operation once between logical pipeline stages running different types of threads (e.g., vertex threads and pixel threads).

In some non-limiting embodiments, the acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor tests rays against the primitives to determine which object surfaces the rays intersect and which object surfaces are visible along the ray.

The traversal co-processor performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached. Once the traversal co-processor traverses the acceleration data structure to reach a terminal or "leaf" node that contains a geometric primitive, it performs an accelerated ray-primitive intersection test that determines whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray).

The traversal co-processor also accelerates the transform of each ray from world space into object space to obtain finer and finer bounding box encapsulations of the primitives and reduce the duplication of those primitives across the scene. Objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Certain presently disclosed non-limiting embodiments thus provide a traversal co-processor, a new subunit of one or a group of streaming multiprocessor SMs of a 3D graphics processing pipeline. In order to understand where the traversal co-processor fits in the overall picture, it may be helpful to understand a few fundamentals of the algorithm employed by most or all modern ray tracers. But it should be pointed out that the technology herein provides a generic capability to determine, for a thread running in a GPU, what the nearest visible thing is from a given point along a specified direction, or if anything lies between two points. A common use case for such capability will be in processes that start tracing rays from points that have already been rasterized on triangles using conventional scan conversion techniques. The disclosed technology can but does not necessarily replace or substitute for scan conversion technology, and may often augment it and be used in conjunction with scan conversion techniques to enhance images with photorealistic reflections, shadows and other effects.

Ray Tracing Techniques

Generally, ray tracing is a rendering method in which rays are used to determine the visibility of various elements in the scene. Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between.

Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. See Akenine-Möller et al., cited above. Ray tracing technology thus allows a graphics system to develop physically correct reflections and shadows that are not subject to the limitations and artifacts of scan conversion techniques.

Traversal Coprocessor

The basic task the traversal coprocessor performs is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. By pre-processing the scene geometry and building a suitable acceleration data structure in advance, however, it is possible to reduce the average-case complexity to O(log n). In ray tracing, the time for finding the closest (or for shadows, any) intersection for a ray is typically order O(log n) for n objects when an acceleration data structure is used. For example, bounding volume hierarchies (BVHs) of the type commonly used for modern ray tracing acceleration data structures typically have an O(log n) search behavior.

Bounding Volume Hierarchies

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In such instances, the traversal coprocessor may be called a "tree traversal unit" or "TTU".

Given a BVH, ray tracing amounts to a tree search where each node in the tree visited by the ray has a bounding volume for each descendent branch or leaf, and the ray only visits the descendent branches or leaves whose corresponding bound volume it intersects. In this way, only a small number of primitives must be explicitly tested for intersection, namely those that reside in leaf nodes intersected by the ray. In the example non-limiting embodiments, the traversal coprocessor accelerates both tree traversal (including the ray-volume tests) and ray-primitive tests. As part of traversal, the traversal coprocessor can also handle "instance transforms"—transforming a ray from world-space coordinates into the coordinate system of an instanced mesh (object space) e.g., in order to avoid the computational complexity of transforming the primitive vertices into world space. It can do so in a MIMD (multiple-instruction, multiple data) fashion, meaning that the rays are handled independently once inside the traversal coprocessor.

Example Non-Limiting Real Time Interactive Ray Tracing System

FIG. 1 illustrates an example real time ray interactive tracing graphics system 100 for generating images using three dimensional (3D) data of a scene or object(s). System 100 includes an input device 110, a processor(s) 120, a graphics processing unit(s) (GPU(s)) 130, memory 140, and a display(s) 150. The system shown in FIG. 1 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable streaming multiprocessors (SMs) 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

Traversal Coprocessor Addition to Architecture

To enable the GPU 130 to perform ray tracing in real time in an efficient manner, the GPU is provided with traversal coprocessor 138 coupled to one or more SMs 132. The traversal coprocessor 138 includes hardware components configured to perform operations commonly utilized in ray tracing algorithms A goal of the traversal coprocessor 138 is to accelerate operations used in ray tracing to such an extent that it brings the power of ray tracing to real-time graphics application (e.g., games), enabling high-quality shadows, reflections, and global illumination. As discussed in more detail below, the result of the traversal coprocessor 138 may be used together with or as an alternative to other graphics related operations performed in the GPU 130.

In the example architecture shown, the new hardware component called a "traversal coprocessor" 138 is used to accelerate certain tasks including but not limited to ray tracing. Ray tracing refers to casting a ray into a scene and determining whether and where that ray intersects the scene's geometry. This basic ray tracing visibility test is the fundamental primitive underlying a variety of rendering algorithms and techniques in computer graphics. For example, ray tracing can be used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". To overcome limitations in image quality that can be achieved with rasterization, system 100 can also generate entire images or parts of images using ray tracing techniques. Ray tracing may also be used as the basic primitive to accurately simulate light transport in physically-based rendering algorithms such as path tracing, photon mapping, Metropolis light transport, and other light transport algorithms.

More specifically, SMs 132 and the traversal coprocessor 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with traversal coprocessor 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the traversal coprocessor 138 is capable of accelerating in hardware certain of the more computationally-intensive aspects of that process.

In the example non-limiting technology herein, traversal coprocessor 138 accelerates both ray-box tests and ray-primitive tests. As part of traversal, it can also handle at least one level of instance transforms, transforming a ray from world-space coordinates into the coordinate system of an instanced mesh. In the example non-limiting embodiments, the traversal coprocessor 138 does all of this in MIMD fashion, meaning that rays are handled independently once inside the traversal coprocessor.

In the example non-limiting embodiments, the traversal coprocessor 138 operates as a servant (coprocessor) to the SMs (streaming multiprocessors) 132. In other words, the traversal coprocessor 138 in example non-limiting embodiments does not operate independently, but instead follows the commands of the SMs 132 to perform certain computationally-intensive ray tracing related tasks much more efficiently than the SMs 132 could perform themselves.

In the examples shown, the traversal coprocessor 138 receives commands via SM 132 instructions and writes results back to an SM register file. For many common use cases (e.g., opaque triangles with at most one level of instancing), the traversal coprocessor 138 can service the ray tracing query without further interaction with the SM 132. More complicated queries (e.g., involving alpha-tested triangles, primitives other than triangles, or multiple levels of instancing) may require multiple round trips. In addition to tracing rays, the traversal coprocessor 138 is capable of performing more general spatial queries where an AABB or the extruded volume between two AABBs (which we call a "beam") takes the place of the ray. Thus, while the traversal coprocessor 138 is especially adapted to accelerate ray tracing related tasks, it can also be used to perform tasks other than ray tracing.

In addition to the traversal coprocessor 138, the example non-limiting technology used to support the system 100 of FIG. 1 provides additional accelerated ray tracing enhancements to a number of units as well as a substantial effort devoted to BVH construction. BVH construction need not be hardware accelerated (although it may be in some non-limiting embodiments) but could instead be implemented using highly-optimized software routines running on SMs 132 and/or CPU 120 and/or other development systems e.g., during development of an application. The following exposition describes, among other things, software-visible behavior of the traversal coprocessor 138, interfaces to surrounding units (SMs 132 and the memory subsystem), and additional features that are part of a complete ray-tracing solution such as certain enhancements to the group of SMs 132 and the memory caching system.

As discussed above, the traversal coprocessor 138 allows for quick traversal of an acceleration data structure (e.g., a BVH) to determine which primitives (e.g., triangles used for generating a scene) in the data structure are intersected by a query data structure (e.g., a ray). In order to handle the large numbers of rays and primitives that are tested for intersections in each scene, certain example embodiments provide a highly efficient and robust multiprocessor-coprocessor interface 160 between the SM 132 and the traversal coprocessor 138.

The multiprocessor-coprocessor interface 160 of certain embodiments, for example, enables a streaming processor to efficiently and robustly run acceleration structure traversals on the traversal coprocessor by using a series of shorter instructions instead of a single wide instruction having numerous operands. The motivation for not using a "single wide instruction" is that it would be an invasive and costly change to most processor designs and especially RISC architectures, which are commonly built around fixed-length instructions. Certain embodiments help to avoid system inefficiencies such as long per instruction completion times, which are especially relevant when the operation involves allocation of resources from a limited pool. Certain embodiments improve the system's ability to implement instruction-level preemption of threads.

Traversing an Acceleration Data Structure

A good way to accelerate ray tracing is to use an acceleration data structure. The acceleration data structure represents the 3D model of an object or a scene in a manner that will help assist in quickly deciding which portion of the object a particular ray is likely to intersect and quickly rejecting large portions of the scene the ray will not intersect. A bounding volume hierarchy (BVH) data structure is one type of acceleration data structure which can help reduce the number of intersections to test. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

Figure 2A:
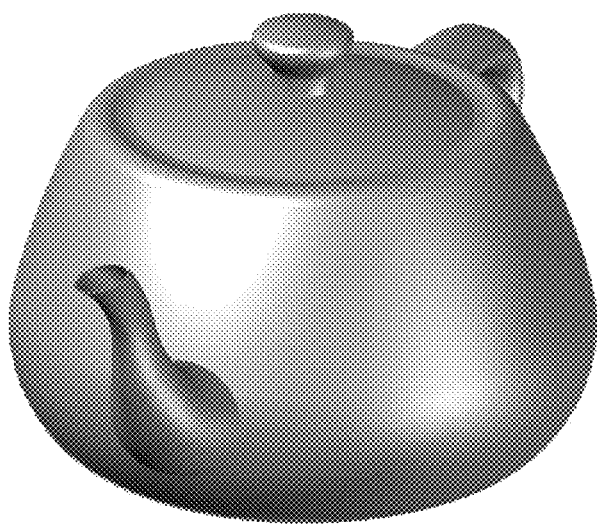
FIG. 2A shows an example specular object.
Figure 2B:
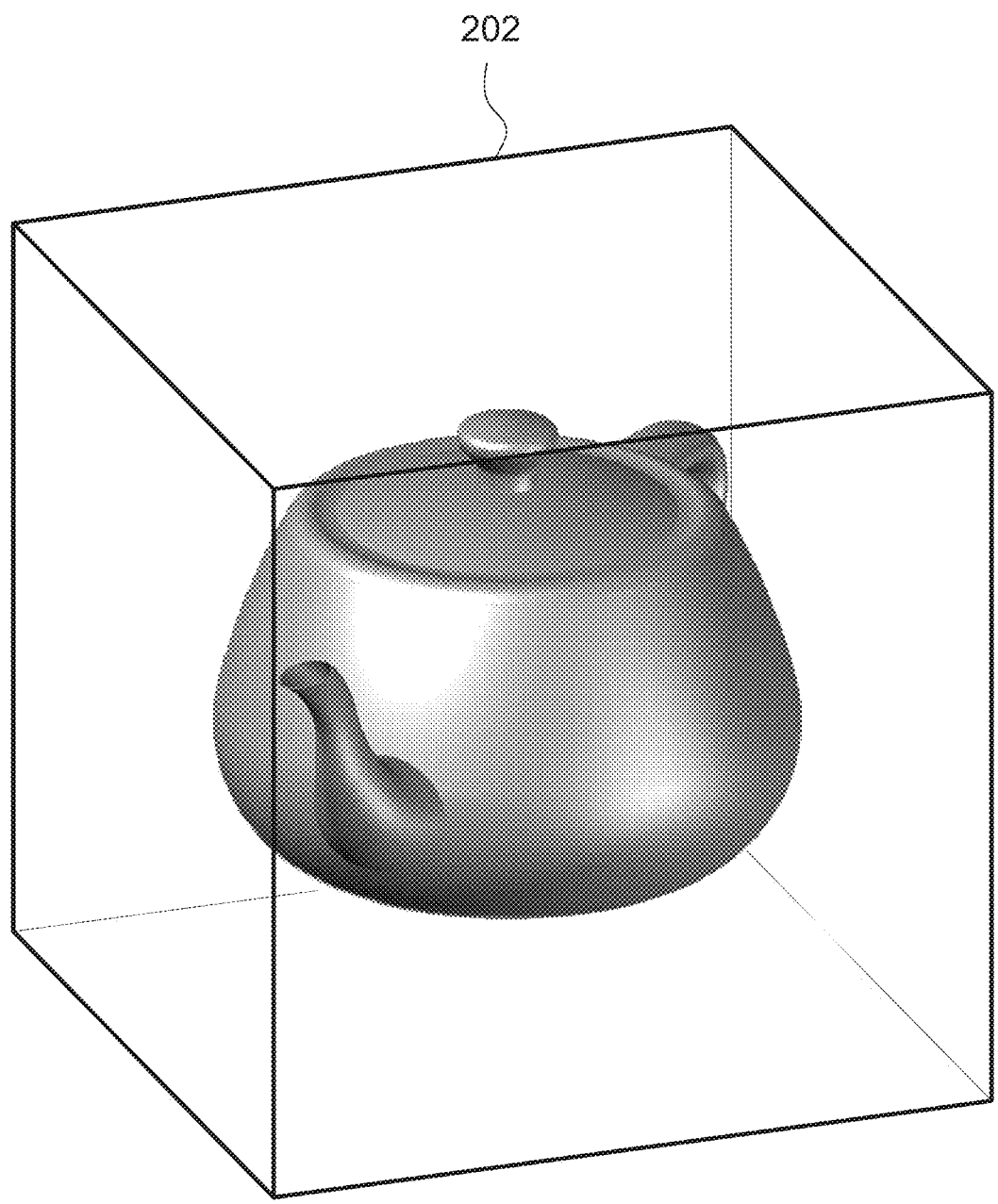
FIG. 2B shows the example object within a bounding volume.

To illustrate how a bounding volume hierarchy works, FIGS. 2A-2G show a teapot recursively subdivided into smaller and smaller hierarchical bounding volumes. FIG. 2A shows a teapot object, and FIG. 2B shows a bounding volume 202 (in this case a box, cube or rectangular parallelepiped) enclosing the whole teapot. The bounding volume 202, which can be efficiently defined by its vertices, provides an indication of the spatial location of the object and is typically dimensioned to be just slightly larger than the object.

The first stage in acceleration structure construction acquires the bounding boxes of the referenced geometry. This is achieved by executing for each geometric primitive in an object a bounding box procedure that returns a conservative axis-aligned bounding box for its input primitive such as box 202 shown in FIG. 2B. Using these bounding boxes as elementary primitives for the acceleration structures provides the necessary abstraction to trace rays against arbitrary user-defined geometry (including several types of geometry within a single structure). Because in FIG. 2B the bounding volume 202 is larger than and completely contains the teapot, a ray that does not intersect bounding volume 202 cannot intersect the teapot, although a ray that does intersect the bounding volume may or may not intersect the teapot. Because the bounding volume 202 is readily defined by the x,y,z coordinates of its vertices in 3D space and a ray is defined by its x,y,z coordinates in 3D space, the ray-bounding volume test to determine whether a ray intersects the bounding volume 202 is straightforward (although some transform may be used to adjust to different coordinate systems, as will be explained below).

Figure 2C:
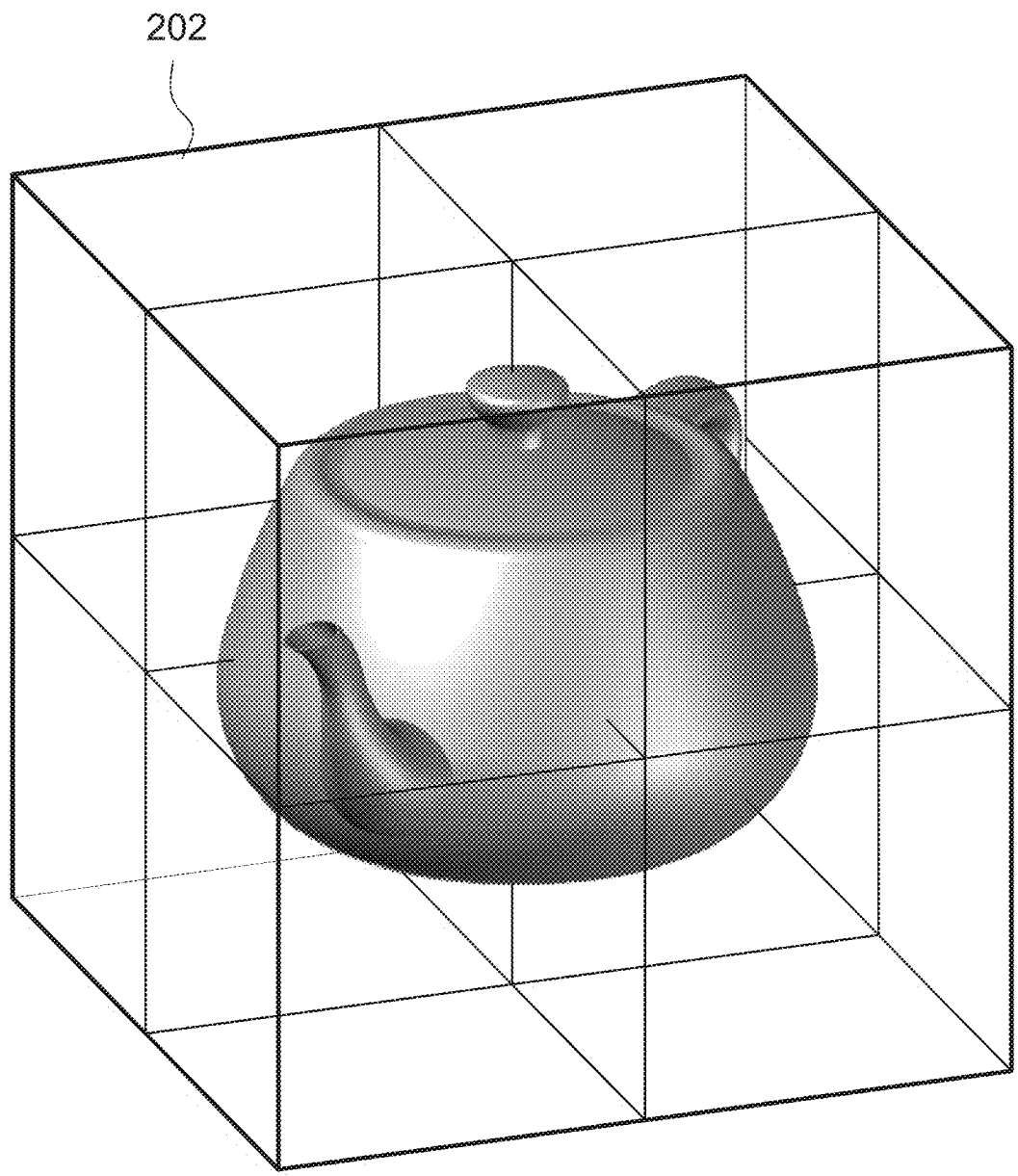
FIG. 2C shows an example volumetric subdividing of the FIG. 2B bounding volume.

FIG. 2C, shows the bounding volume 202 subdivided into smaller contained bounding volumes. While the subdivision scheme shown here for purposes of illustration is a so-called 8-ary subdivision or "octree" in which each volume is subdivided into eight smaller volumes of uniform size, many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

Figure 2D:
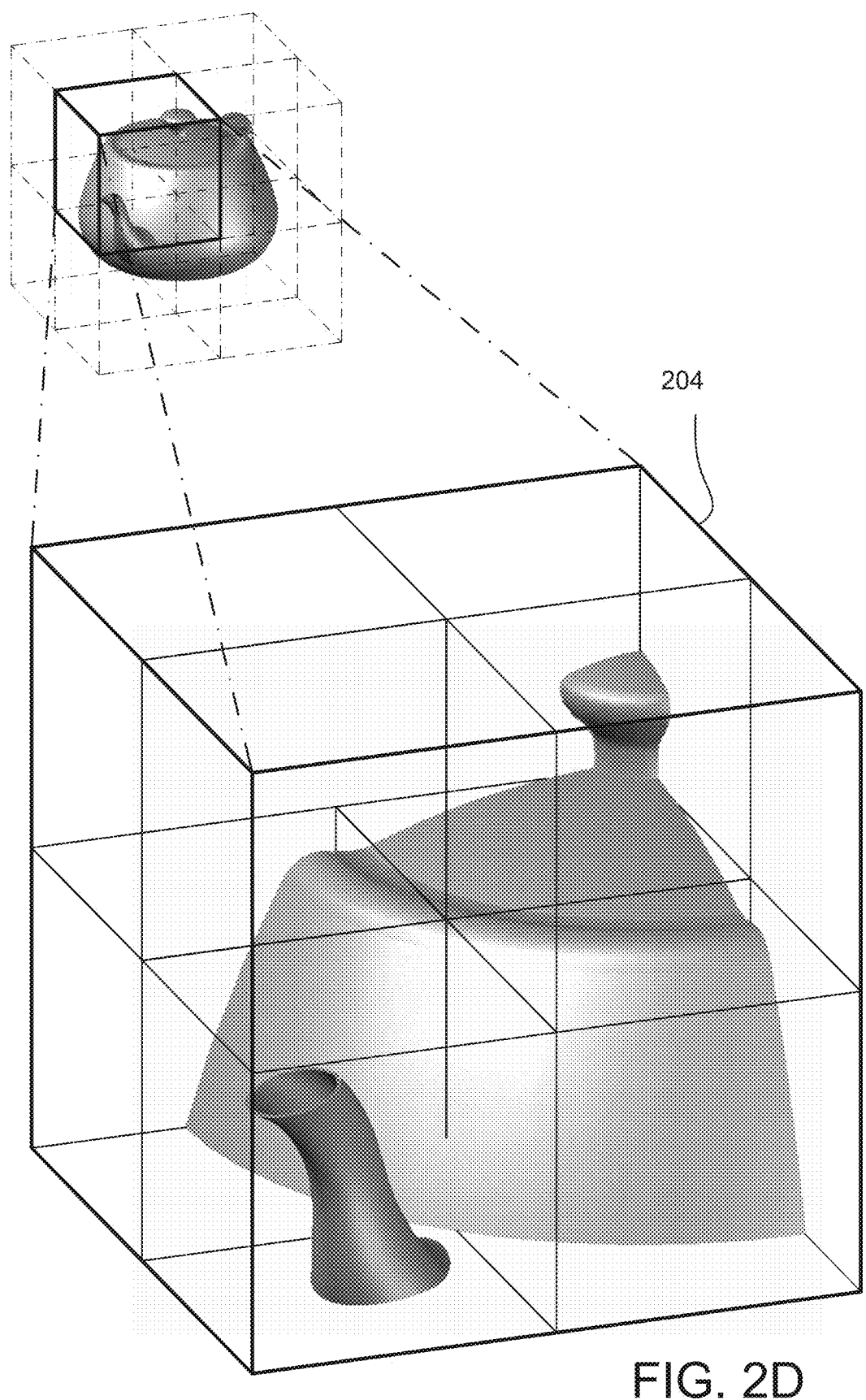
FIGS. 2D, 2E and 2F show example further levels of volumetric subdivision of the bounding volume to create a bounding volume hierarchy (BVH).

Each of the subdivided bounding volumes shown in FIG. 2C can be still further subdivided. FIG. 2D shows one of the subdivided volumes 204 of FIG. 2C being further subdivided to provide additional subdivided encapsulated bounding volumes. As shown in FIG. 2D, some of the subdivided bounding volumes include portions of the teapot and some do not. Volumes that do not contain a portion of the teapot are not further subdivided because the further subdivisions provide no further spatial information about the teapot. Already subdivided bounding volumes that do include at least one portion of the teapot can be still further recursively subdivided—like the emergence of each of a succession of littler and littler cats from the hats of Dr. Seuss's' The Cat In The Hat Comes Back (1958). The portions of the space within bounding volume 202 that contain geometry are recursively subdivided to permit the traversal coprocessor 138 to use the volumetric subdivisions to efficiently discover where the geometry is located relative to any given ray. It can be noted that while a spatial or active subdivision of the volume is possible, many implementations will create the hierarchical structure defining volumes and subvolumes ahead of time. In such cases, the builder may often build the hierarchy up from individual triangles and not down from the whole scene. Building up means you do not need to determine if some subdivided volume contains anything since by definition it contains what is below it in a hierarchy of volumetric subdivisions.

Figure 2E:
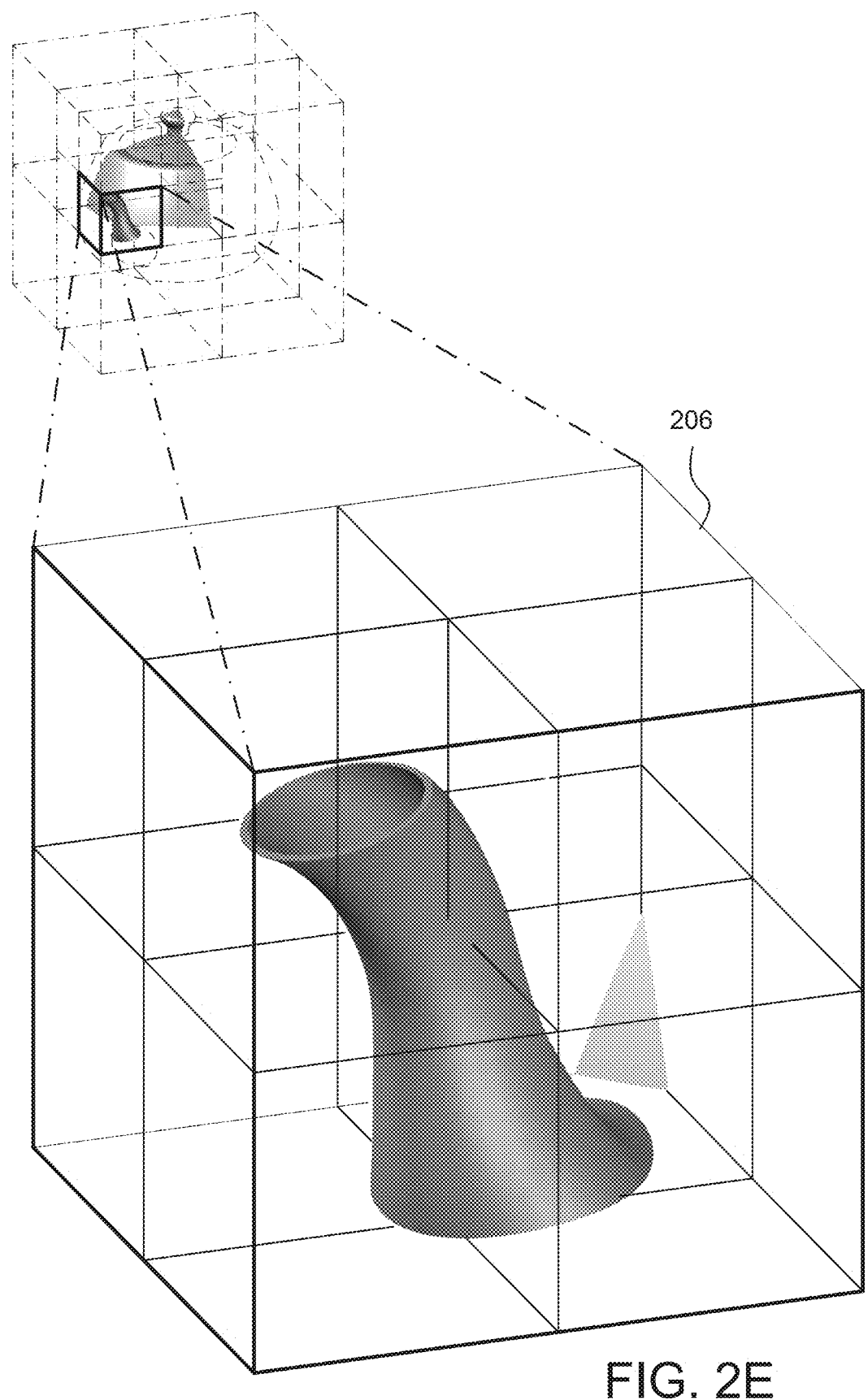
Figure 2F:
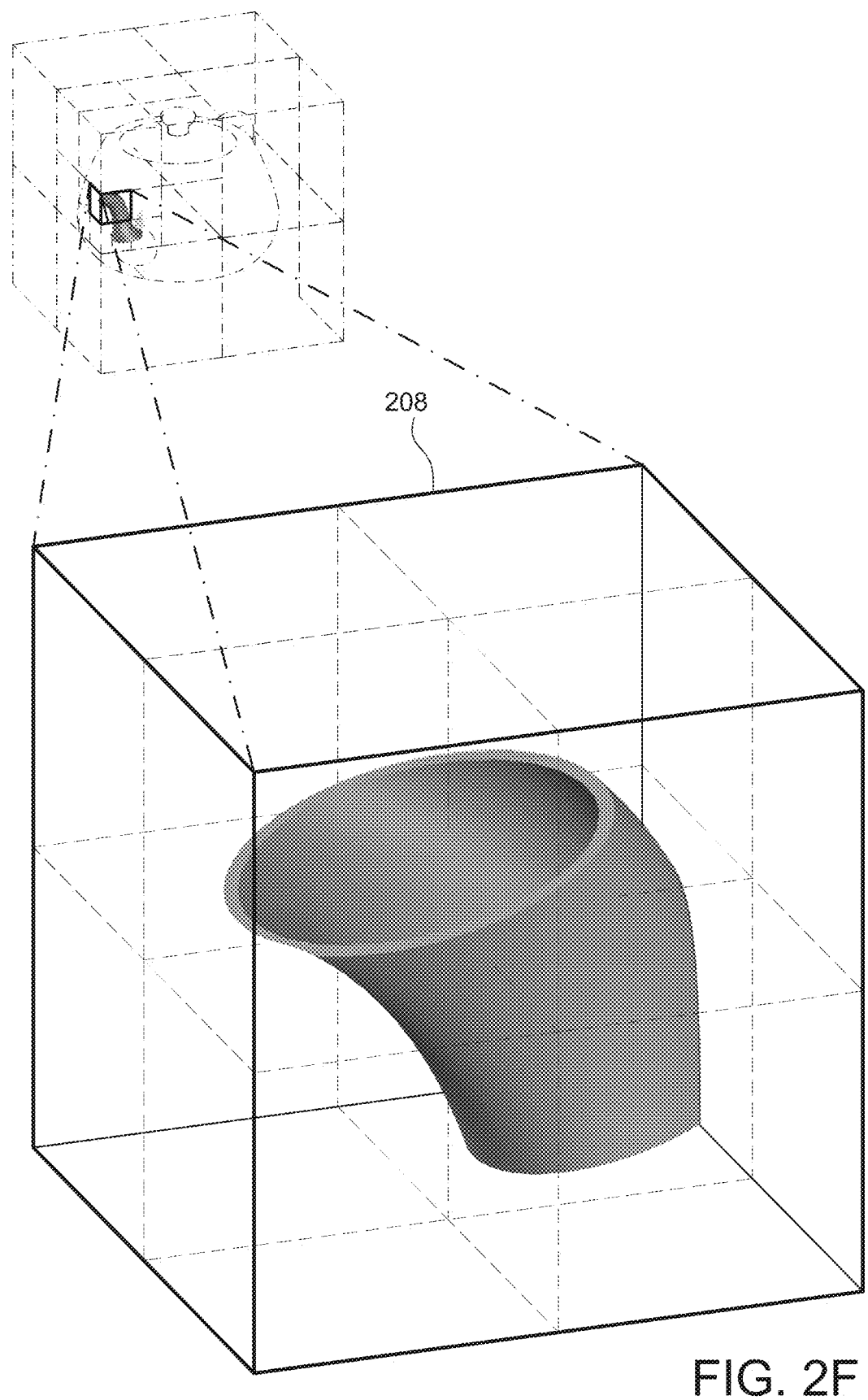

FIG. 2E shows a further such subdivision of bounding volume 204 into a further smaller contained bounding volume 206 containing in this example just the spout of the teapot plus another surface on the wall of the teapot, and FIG. 2F shows an additional subdivision of bounding volume 206 into still smaller contained subdivision 208 encapsulating the end of the teapot's spout. Depending on the way the BVH is constructed, bounding volume 208 can be further and further subdivided as desired—and traversal coprocessor 138 enables the FIG. 1 system 100 to efficiently traverse the BVH down to any arbitrary subdivision level. The number and configurations of recursive subdivisions will depend on the complexity and configuration of the 3D object being modeled as well as other factors such as desired resolution, distance of the object from the viewpoint, etc.

Figure 2G:
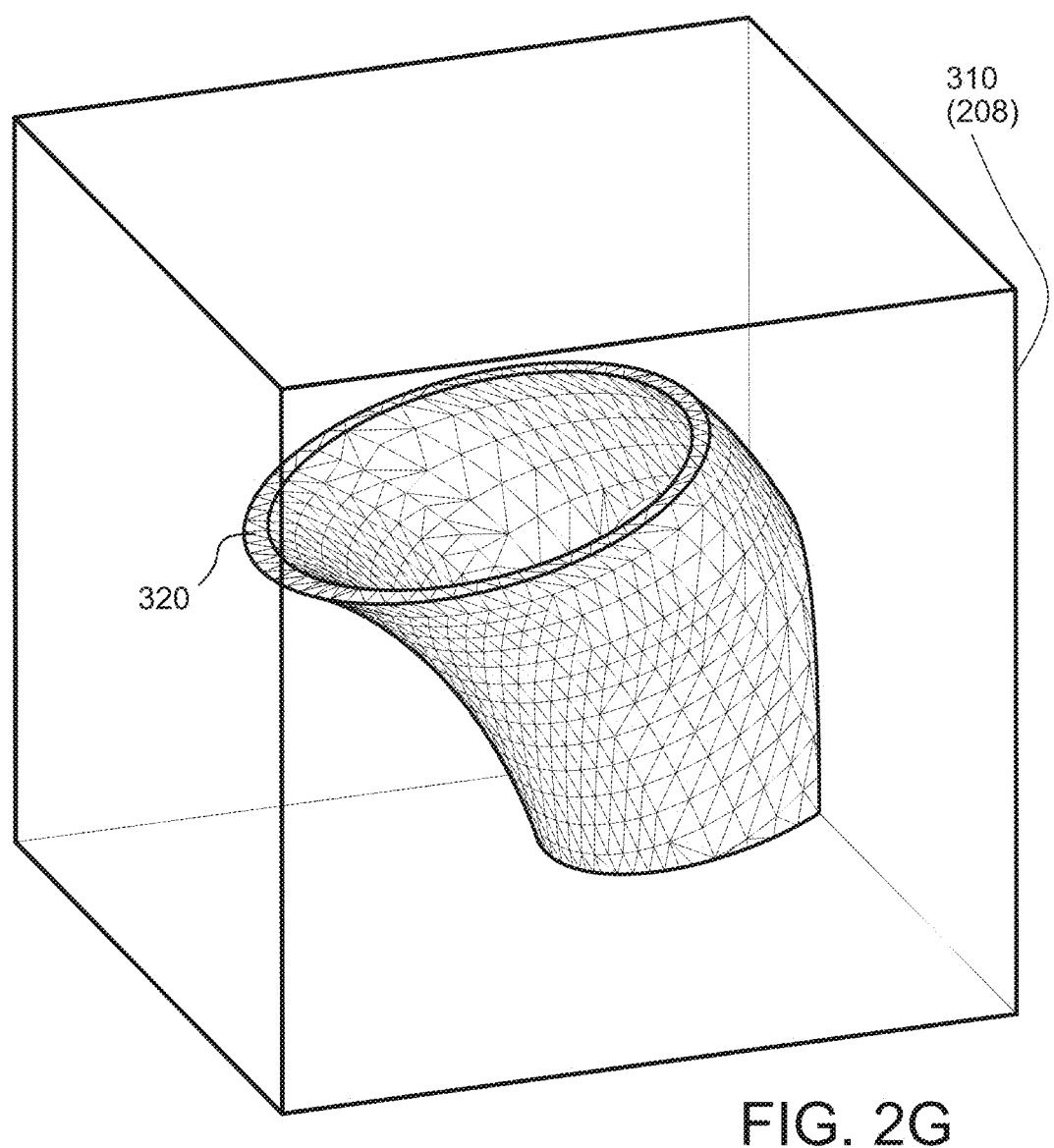
FIG. 2G shows an example portion of the object comprised of primitive surfaces, in this case triangles.

At some level of subdivision (which can be different levels for different parts of the BVH), the traversal coprocessor 138 encounters geometry making up the encapsulated object being modeled. Using the analogy of a tree, the successive volumetric subdivisions are the trunk, branches, boughs and twigs, and the geometric is finally revealed at the very tips of the tree, namely the leaves. In this case, FIG. 2G shows the surface of the teapot's spout defined by an example mesh of geometric primitives. The geometric primitives shown are triangles but other geometric primitives, such as quads, lines, rectangles, quadrics, patches, or other geometric primitives known to those familiar with the state of the art, may be used (in one embodiment, such other types of primitives may be expressed as or converted into triangles). The geometric primitives in the mesh represent the shape of the 3D surface of the object being modeled. The example shown here is a mesh, but bounded geometry can include discontinuous geometry such as particles that may not be connected. In the example non-limiting embodiments, the traversal coprocessor 138 also accelerates ray intersection tests with this geometry to quickly determine which triangles are hit by any given ray. Determining ray-primitive intersections involves comparing the spatial xyz coordinates of the vertices of each primitive with the xzy coordinates of the ray to determine whether the ray and the surface the primitive defines occupy the same space. The ray-primitive intersection test can be computationally intensive because there may be many triangles to test. For example, in the mesh shown in FIG. 2G, the spout of the teapot alone is made up of over a hundred triangles—although it may be more efficient in some implementations to further volumetrically subdivide and thereby limit the number of triangles in any such "leaf node" to something like 16 or fewer.

As discussed above, ray tracing procedures determine what geometric primitives of a scene are intersected by a ray. However, due to the large number of primitives in a 3D scene, it may not be efficient or feasible to test every geometric primitive for an intersection. Acceleration data structures, such as BVH, allow for quick determination as to which bounding volumes can be ignored, which bounding volumes may contain intersected geometric primitives, and which intersected geometric primitives matter for visualization and which do not.

Ray Intersection Testing

Figure 3A:
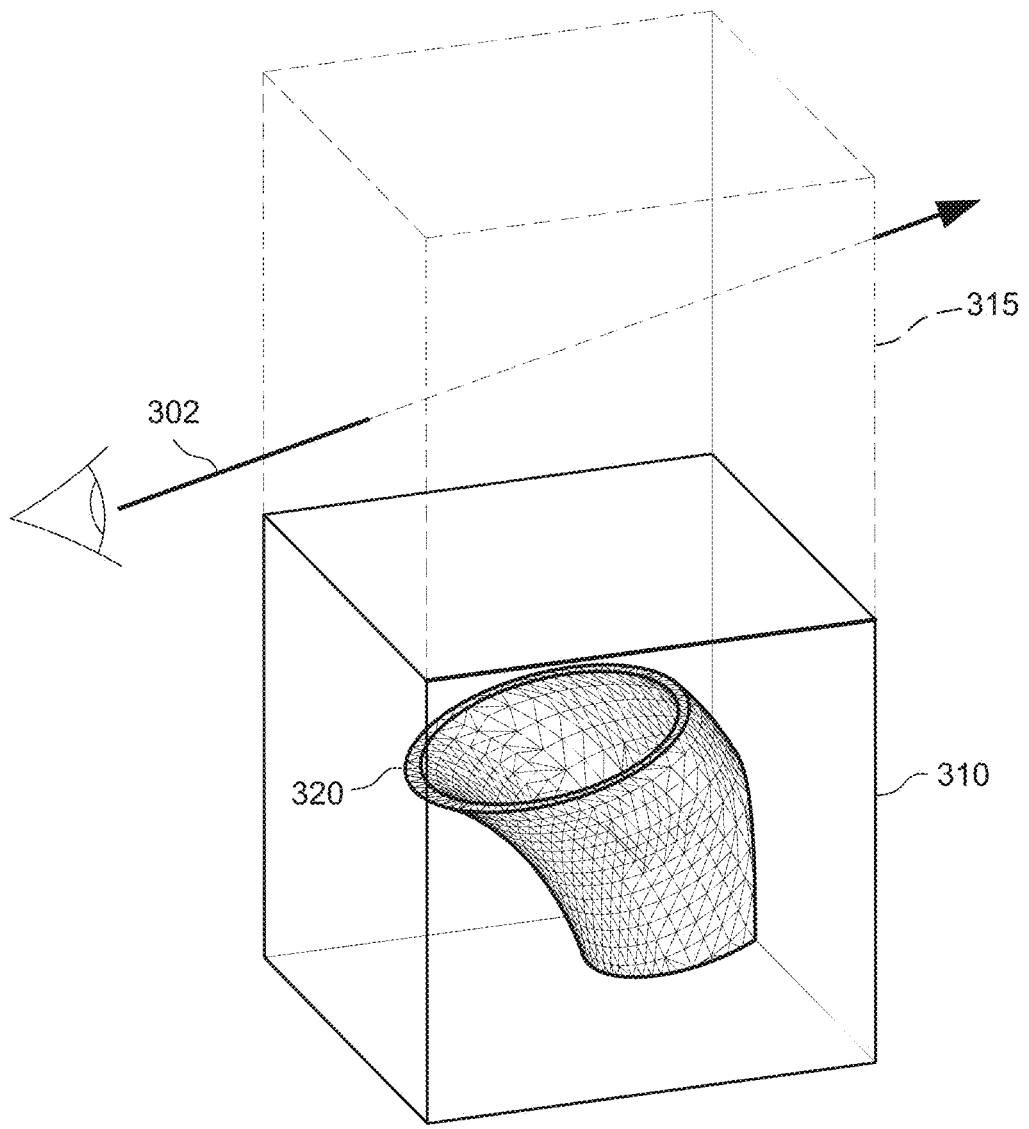
FIGS. 3A-3C show example simplified ray tracing tests to determine whether the ray passes through a bounding volume containing geometry and whether the ray intersects geometry.
Figure 3B:
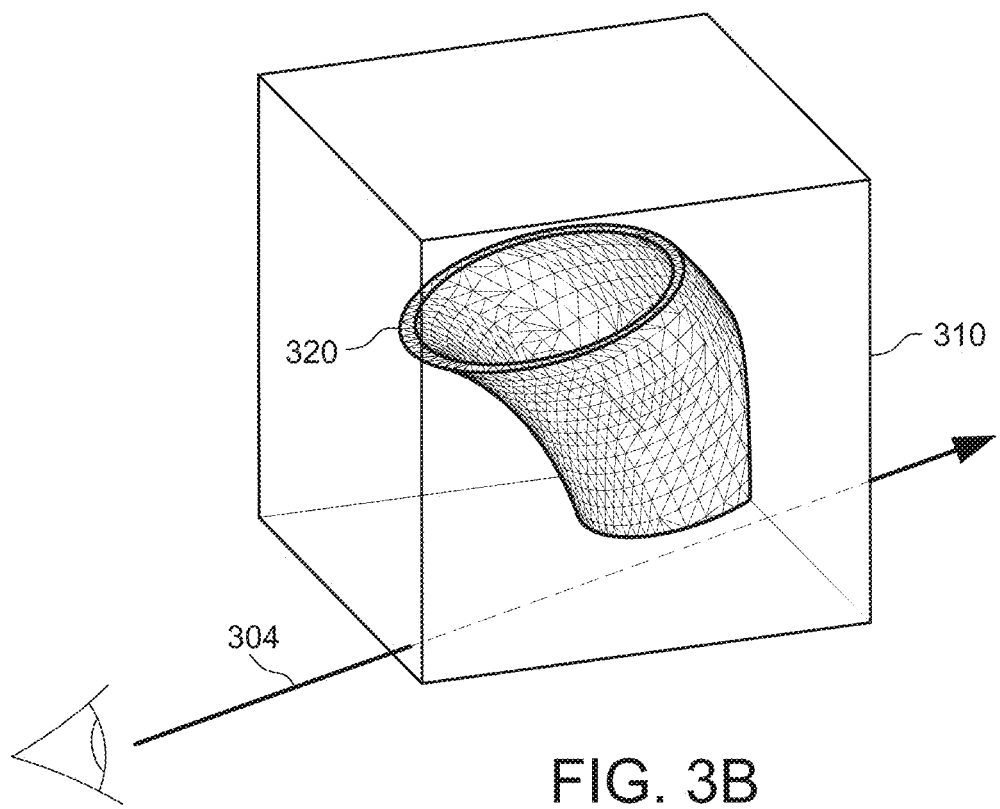
Figure 3C:
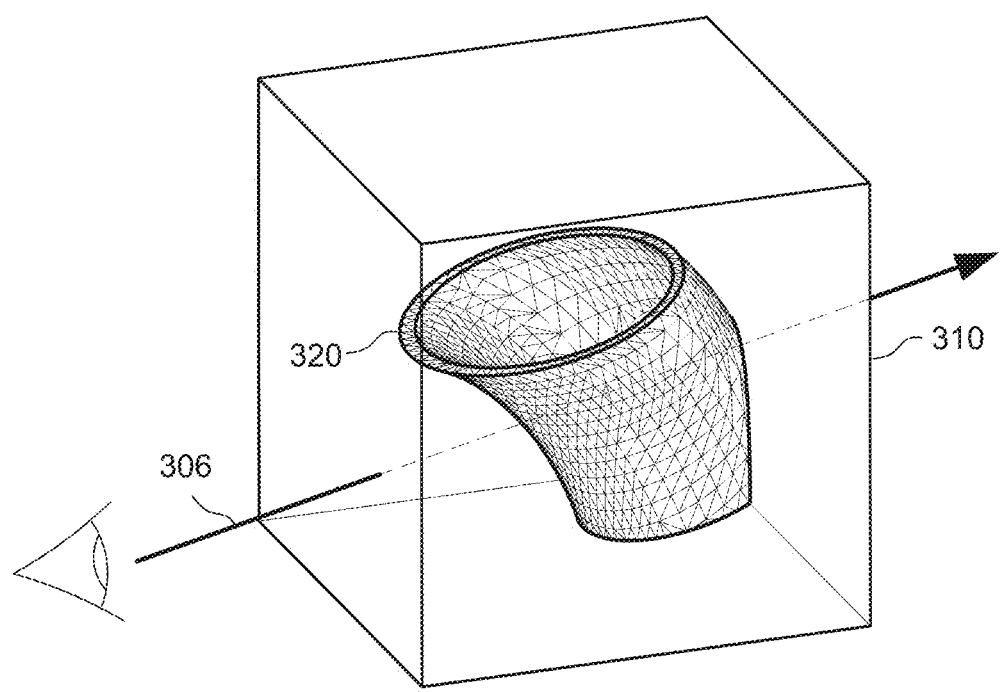

FIGS. 3A-3C illustrate ray tracing applied to the FIG. 2G bounding volume 208 including triangle mesh 320. FIG. 3A shows a ray 302 in a virtual space including bounding volumes 310 and 315. To determine whether the ray 302 intersects one or more triangles in the mesh 320, each triangle could be directly tested against the ray 302. But to accelerate the process (since the object could contain many thousands of triangles), the ray 302 is first tested against the bounding volumes 310 and 315. If the ray 302 does not intersect a bounding volume, then it does not intersect any triangles inside of the bounding volume and all triangles inside the bounding volume can be ignored for purposes of that ray. Because in FIG. 3A the ray 302 misses bounding volume 310, the triangles of mesh 320 within that bounding volume need not be tested for intersection. While bounding volume 315 is intersected by the ray 302, bounding volume 315 does not contain any geometry and so no further testing is required.

On the other hand, if a ray such as ray 304 shown in FIG. 3B intersects a bounding volume 310 that contains geometry, then the ray may or may not intersect the geometry inside of the bounding volume so further tests need to be performed on the geometry itself to find possible intersections. Because the rays 304, 306 in FIGS. 3B and 3C intersect a bounding volume 310 that contains geometry, further tests need to be performed to determine whether any (and which) of the primitives inside of the bounding volume are intersected. In FIG. 3B, further testing of the intersections with the primitives would indicate that even though the ray 304 passes through the bounding volume 310, it does not intersect any of the primitives the bounding volume encloses (alternatively, as mentioned above, bounding volume 310 could be further volumetrically subdivided so that a bounding volume intersection test could be used to reveal that the ray does not intersect any geometry or more specifically which primitives the ray may intersect).

FIG. 3C shows a situation in which the bounding volume 310 intersected by ray 306 and contains geometry that ray 306 intersects. Traversal coprocessor 138 tests the intersections between the ray 306 and the individual primitives to determine which primitives the ray intersects.

Ray Tracing Operations

Figure 4:
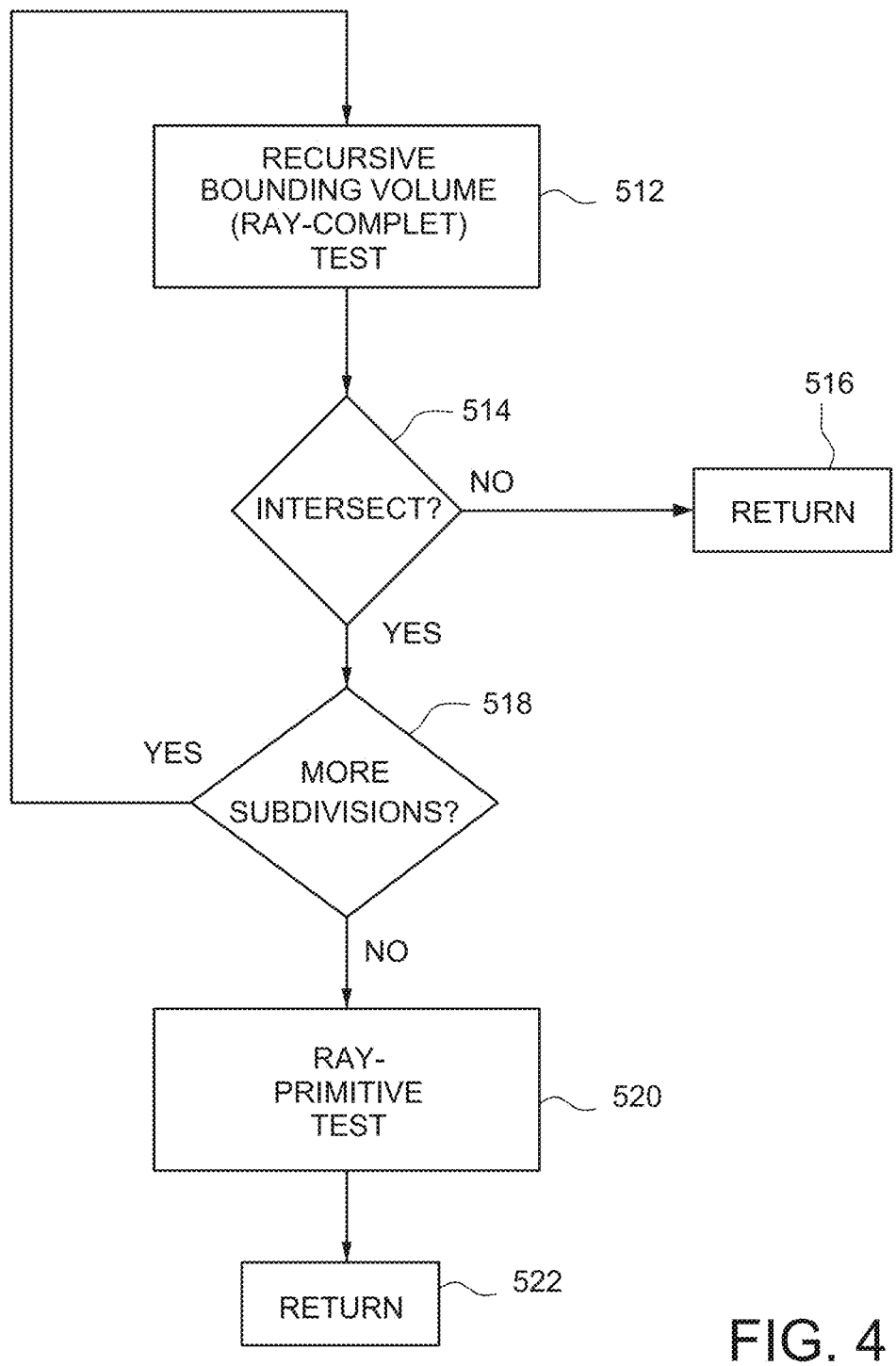
FIG. 4 illustrates an example ray tracing flowchart.

FIG. 4 is a flowchart summarizing example ray tracing operations the traversal coprocessor 138 performs as described above in cooperation with SM(s) 132. The FIG. 4 operations are performed by traversal coprocessor 138 in cooperation with its interaction with an SM 132. The traversal coprocessor 138 may thus receive the identification of a ray from the SM 132 and traversal state enumerating one or more nodes in one or more BVH's that the ray must traverse. The traversal coprocessor 138 determines which bounding volumes of a BVH data structure the ray intersects (the "ray-complet" test 512) and subsequently whether the ray intersects one or more primitives in the intersected bounding volumes and which triangles are intersected (the "ray-primitive test" 520). In example non-limiting embodiments, "complets" (compressed treelets) specify root or interior nodes (i.e., volumes) of the bounding volume hierarchy with children that are other complets or leaf nodes of a single type per complet.

First, the traversal coprocessor 138 inspects the traversal state of the ray. If a stack the traversal coprocessor 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the traversal coprocessor 138 can return this result to the requesting SM 132. This is because if a ray misses a bounding volume (as in FIG. 3A with respect to bounding volume 310), then the ray will miss all other smaller bounding volumes inside the bounding volume being tested and any primitives that bounding volume contains.

If the bounding box test performed by the traversal coprocessor 138 reveals that the bounding volume is intersected by the ray ("Yes" in Step 514), then the traversal coprocessor determines if the bounding volume can be subdivided into smaller bounding volumes (step 518). In one example embodiment, the traversal coprocessor 138 isn't necessarily performing any subdivision itself. Rather, each node in the BVH has one or more children (where each child is a leaf or a branch in the BVH). For each child, there is a bounding volume and a pointer that leads to a branch or a leaf node. When a ray processes a node using traversal coprocessor 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The traversal coprocessor 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by traversal coprocessor 138 recursively applying steps 512-518.

Once the traversal coprocessor 138 determines that the bounding volumes intersected by the ray are leaf nodes ("No" in step 518), the traversal coprocessor performs a primitive (e.g., triangle) intersection test 520 to determine whether the ray intersects primitives in the intersected bounding volumes and which primitives the ray intersects. The traversal coprocessor 138 thus performs a depth-first traversal of intersected descendent branch nodes until leaf nodes are reached. The traversal coprocessor 138 processes the leaf nodes. If the leaf nodes are primitive ranges, the traversal coprocessor 138 tests them against the ray. If the leaf nodes are instance nodes, the traversal coprocessor 138 applies the instance transform. If the leaf nodes are item ranges, the traversal coprocessor 138 returns them to the requesting SM 132. In the example non-limiting embodiments, the SM 132 can command the traversal coprocessor 138 to perform different kinds of ray-primitive intersection tests and report different results depending on the SMs needs. For example, the SM 132 can command the traversal coprocessor 138 to report the nearest visible primitive revealed by the intersection test, or to report all primitives the ray intersects irrespective of whether they are the nearest visible primitive. The SM 132 can use these different results for different kinds of visualization. Once the traversal coprocessor 138 is done processing the leaf nodes, there may be other branch nodes (pushed earlier onto the ray's stack) to test.

Multiple Intersections

In more detail, as shown in FIG. 3C, any given ray may intersect multiple primitives within a bounding volume. Whether the ray intersection within a given primitive matters for visualization depends on the properties and position of that primitive as well as the visualization procedures the SM 132 is performing. For example, primitives can be opaque, transparent or partially transparent (i.e., translucent). Opaque primitives will block a ray from passing through the primitive because the eye cannot see through the primitive's opaque surface. Transparent primitives will allow the ray to pass through (because the eye can see through the transparent primitive) but the situation may be more complex. For example, transparent primitives may have specular properties that cause some portion of the ray to reflect (think of reflection from a window pane) and the rest of the ray to pass through. Other transparent primitives are used to provide a surface onto which a texture is mapped. For example, each individual leaf of a tree may be modeled by a transparent primitive onto which an image of the leaf is texture mapped.

Figure 5A:
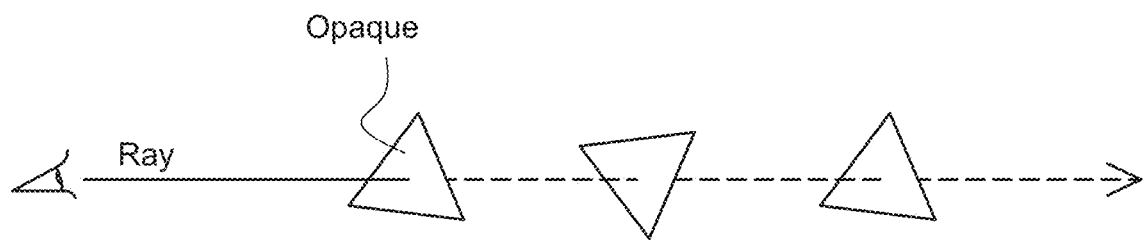
FIGS. 5A-5C show example different ray-primitive intersection scenarios.
Figure 5B:
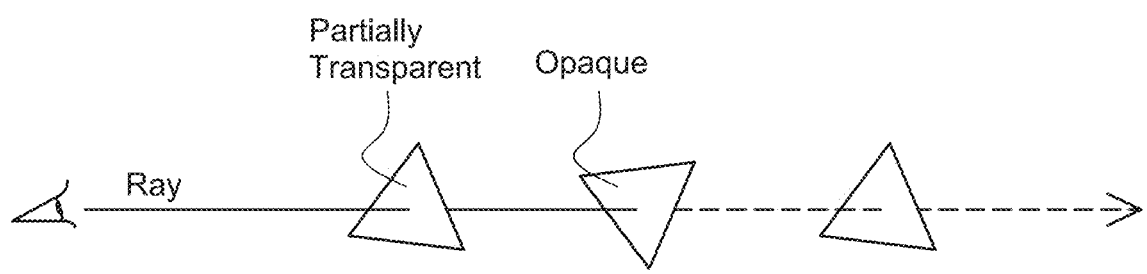
Figure 5C:
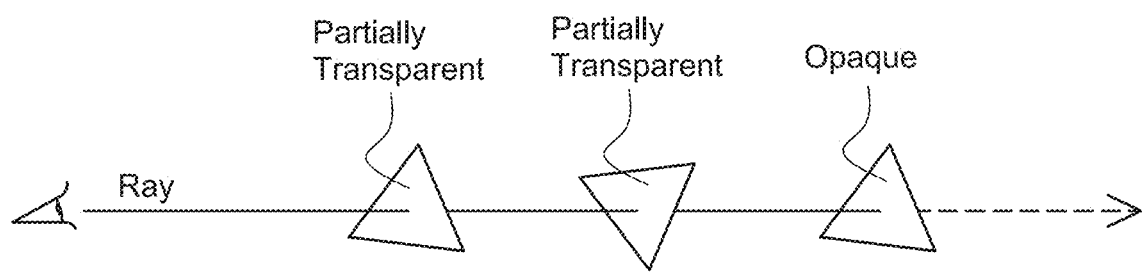

FIGS. 5A-5C illustrate some of these scenarios using an example of three triangles assumed to be in the same bounding volume and each intersected by a ray. FIG. 5A illustrates a ray directed towards these three triangles, with the first triangle the ray encounters relative to the viewpoint being opaque. Because the "front" (from the standpoint of the direction of the ray from the eye) intersected triangle is opaque, that triangle will block the ray so the ray will not reach the other triangles even through it spatially intersects them. In this example, the triangles "behind" the opaque triangle from the viewpoint can be ignored (culled) after the intersection of the opaque triangle is identified because the "front", opaque triangle hides the other triangles from the user's view along the ray. Culling is indicated by dotted lines in FIGS. 5A-5C. In this case, the traversal coprocessor 138 may only need to report the identification of the first, opaque triangle to the SM 132.

FIG. 5B illustrates a ray directed towards the same three triangles but now the nearest visible triangle is partially transparent rather than opaque. Because the nearest visible intersected triangle is at least partially transparent, the ray may pass through it to hit the opaque triangle behind it. In this case, the opaque triangle will be visible through the partially transparent triangle but will block the user's view of the third triangle along the ray. Here, the traversal coprocessor 138 may report the identification of both front triangles to the SM 132 but not report the third, culled triangle even though the ray spatially intersects that third triangle. Order of discovery may matter here. In the case of an alpha and opaque triangle, if the opaque was found first, the traversal coprocessor 138 returns the opaque triangle to the SM 132 with traversal state that will resume testing at the alpha triangle. While there is an implication here that the alpha means transparent, it really means "return me to the SM 132 and let the SM determine how to handle it." For example, an alpha triangle might be trimmed according to a texture or function so that portions of the triangle are cut away (i.e., absent, not transparent). The traversal coprocessor 138 does not know how the SM 132 will handle the alpha triangles (i.e., it does not handle transparent triangles differently from trimmed triangles). Thus, alpha triangles may or may not block or tint the light arriving from points beyond them along the ray, and in example embodiments, they require SM 132 intervention to handle/determine those things.

FIG. 5C illustrates a scenario in which the first two triangles the ray encounters are partially transparent. Because the first and second intersected triangles are at least partially transparent, the ray will pass through the first and second triangles to impinge upon the also-intersecting third opaque triangle. Because third intersected triangle is opaque, it will block the ray, and the ray will not impinge upon any other triangles behind the third triangle even though they may be spatially intersected by it. In this case, the traversal coprocessor 138 may report all three triangles to the SM 132 but need not report any further triangles behind the opaque triangle because the opaque triangle blocks the ray from reaching those additional triangles.

In some modes, however, the SM 132 may need to know the identities of all triangles the ray intersects irrespective of whether they are opaque or transparent. In those modes, the traversal coprocessor 138 can simply perform the intersection test and return the identities of all triangles the ray spatially intersects (in such modes, the traversal coprocessor will return the same intersection results for all three scenarios shown in FIGS. 5A-5C) and allow the SM 132 to sort it out—or in some cases command the traversal coprocessor 138 to do more tests on these same triangles.

As will be discussed in more detail below, when a ray intersects an opaque triangle, the traversal coprocessor 138 can in certain operations be programmed to reduce the length of the ray being tested to the location of the opaque triangle intersection so it will not report any triangles "behind" the intersected triangle. When a partially transparent triangle is determined to be intersected by a ray, the traversal coprocessor 138 will return a more complete list of triangles the ray impinges upon for purposes of visualization, and the requesting SM 132 may perform further processing to determine whether, based for example any texture or other properties of the triangle, the ray will be blocked, passed or partially passed and partially reflected. In example embodiments, the traversal coprocessor 138 does not have access to texture properties of triangles and so does not attempt to determine visualization with respect to those properties.

Textures or Other Surface Modifications

Figure 6A:
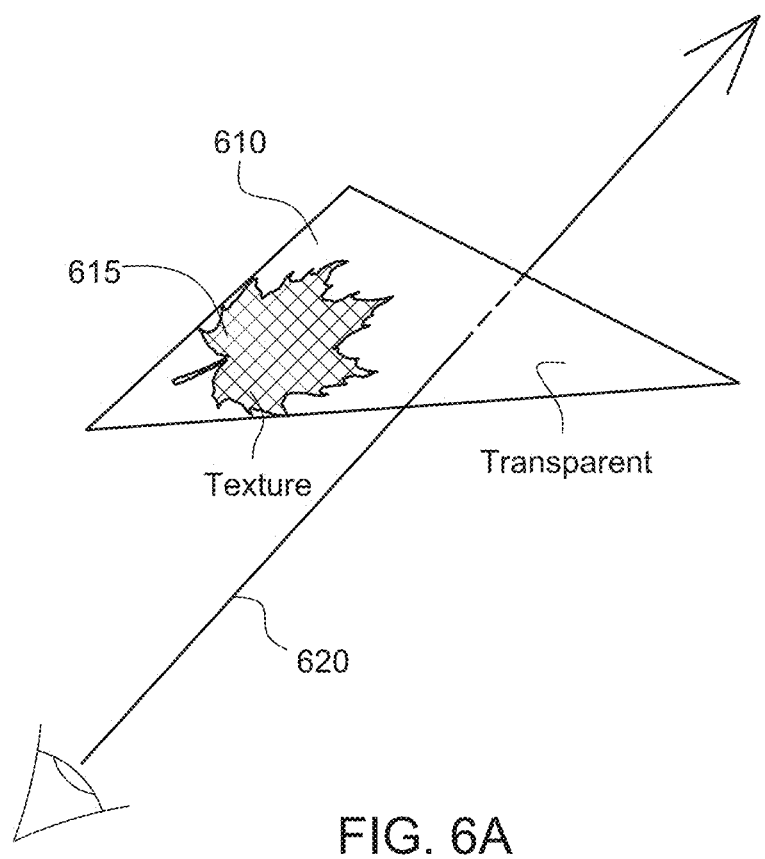
FIGS. 6A and 6B show an example of how texture mapping can impact ray-primitive intersection results.
Figure 6B:
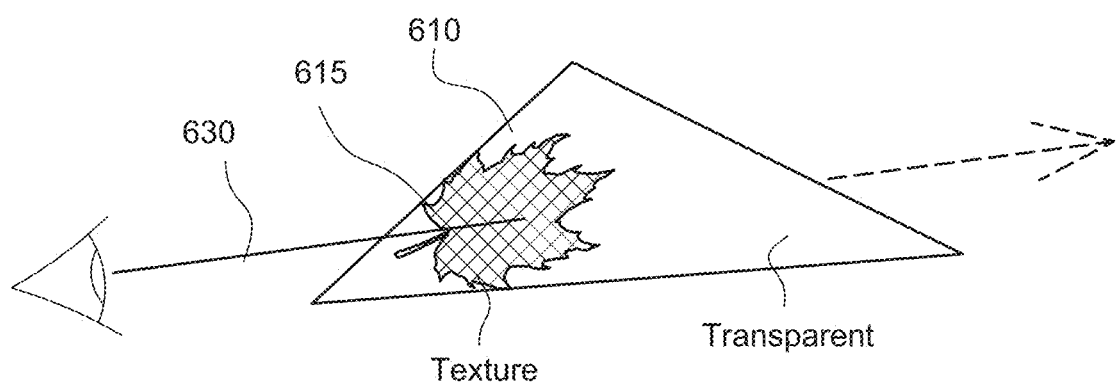

For example, FIGS. 6A and 6B show a transparent triangle 610 with a texture 615 of a leaf applied to the triangle. One could think of a triangle made of Plexiglas with a decal of a leaf applied to it. As shown in FIG. 6A, the ray 620 intersects the transparent triangle 610 at a point that is outside the applied texture 615. Because the ray 620 intersects the triangle outside the applied texture 615, the texture will not block the ray 620 and the ray will pass through the transparent triangle 610 without obstruction. This is like being able to see through the parts of the Plexiglas triangle that are not covered by the leaf decal. Note that in one example embodiment, the SM 132 makes the visibility determination since the traversal coprocessor 138 does not necessarily have access to information concerning the leaf decal. The traversal coprocessor 138 helps the SM 132 by returning to the SM the identification of the triangle that the ray intersects along with information concerning the properties of that triangle.

In FIG. 6B, the ray 630 intersects the transparent triangle where the texture 615 is applied. SM 132 will determine whether subsequent traversal by the traversal coprocessor 138 is necessary or not based on whether the texture 615 will block the ray 630 or allow the ray 630 to pass through. If the ray 630 is blocked by the texture 615, other triangles behind the transparent triangle 610, which may have otherwise been intersected by the ray 630, will be obstructed by the texture and not contribute to visualization along the ray. In the example non-limiting embodiments herein, the traversal coprocessor 138 does not have access to texture information and so it does not attempt to accelerate this determination. Traversal coprocessor 138 may for example return to the requesting SM 132 all intersections between the ray and the various triangles within the object, and the SM may then use the graphics primitive engine 134 to make further ray tracing visualization determinations. In other example embodiments, traversal coprocessor 138 could accelerate some or all of these tests by interacting with the texture mapping unit and other portions of the 3D graphics pipeline within graphics primitive engine 134 to make the necessary visualization determinations.

Coordinate Transforms

FIGS. 2A-3C involve only a single object, namely a teapot. Just as the room you are in right now contains multiple objects, most 3D scenes contain many objects. For example, a 3D scene containing a teapot will likely also contain a cup, a saucer, a milk pitcher, a spoon, a sugar bowl, etc. all sitting on a table. In 3D graphics, each of these objects is typically modelled independently. The graphics system 100 then uses commands from the processor 120 to put all the models together in desired positions, orientations and sizes into the common scene for purposes of visualization (just as you will set and arrange the table for serving tea). What this means is that the SM 132 may command traversal processor 138 to analyze the same ray with respect to multiple objects in the scene. However, the fact that each of these objects will be transformed in position, orientation and size when placed into the common scene is taken into account and accelerated by the traversal coprocessor 138. In non-limiting example embodiments, the transform from world-to-object space is stored in the world space BVH along with a world-space bounding box. The traversal coprocessor 138 accelerates the transform process by transforming the ray from world (scene) space into object space for purposes of performing the tests shown in FIG. 4. In particular, since the transformation of the geometry from object space into world (scene) space is computationally intensive, that transformation is left to the graphics pipeline graphics primitive engine 134 and/or raster engine 136 to perform as part of rasterization. The traversal coprocessor 138 instead transforms a given ray from world space to the coordinate system of each object defined by an acceleration data structure and performs its tests in object space.

Figure 7A:
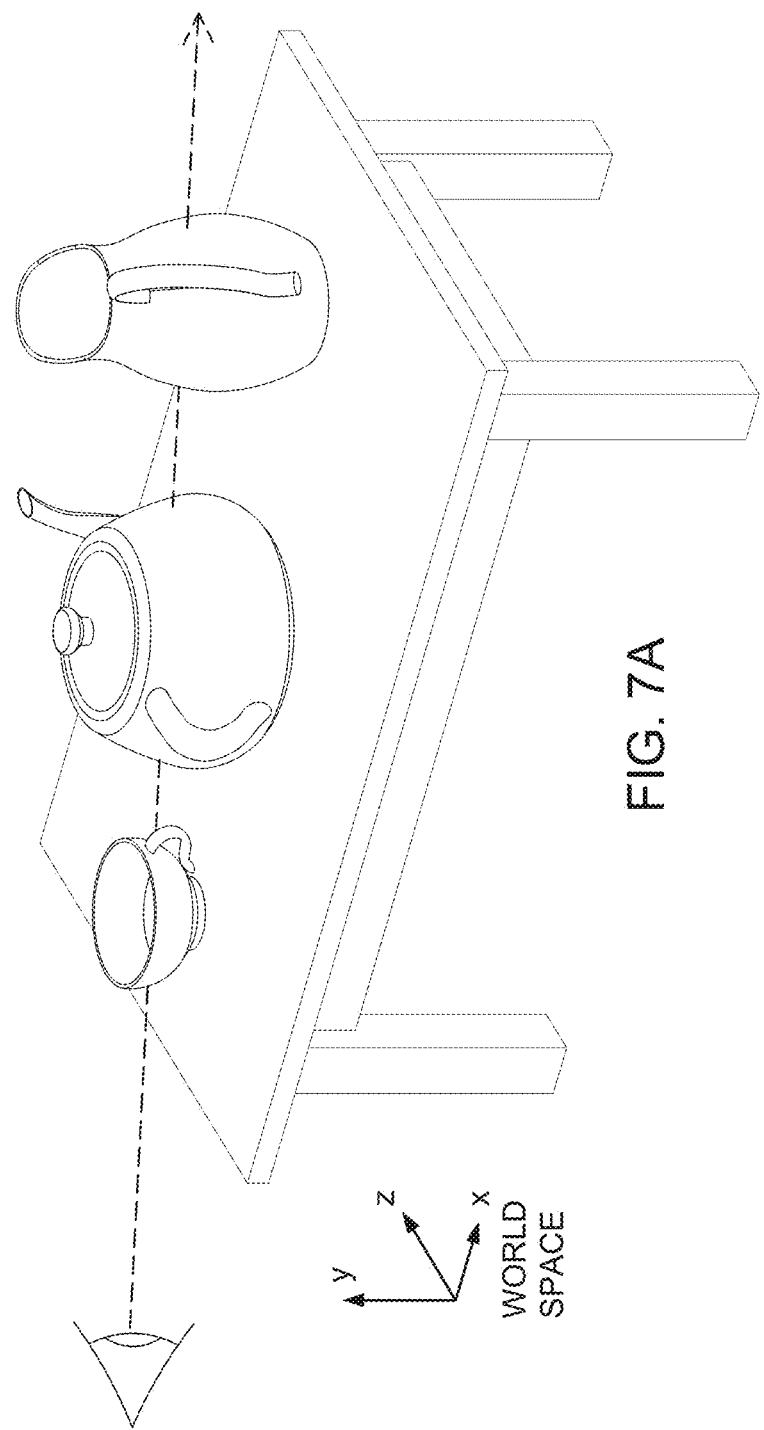
FIGS. 7A and 7B illustrate ray instance transforms.
Figure 7B:
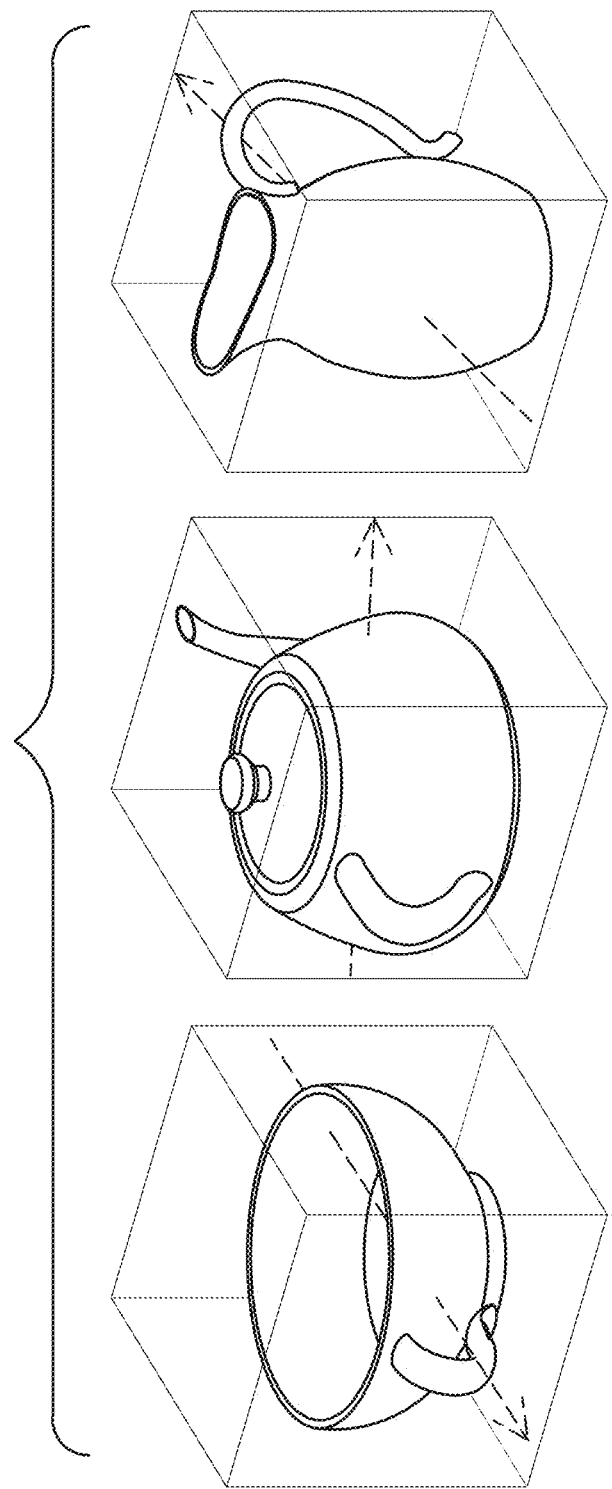

FIGS. 7A and 7B illustrates how the traversal coprocessor 138 transforms the same ray into three different object spaces. FIG. 7A shows three objects on a table: a cup, a teapot and a pitcher. These three objects and a table comprise a scene, which exists in world space. A ray that also is defined in world space emanates from the viewpoint and intersects each of the three objects.

FIG. 7B shows each of the three objects as defined in object spaces. Each of these three objects is defined by a respective model that exists in a respective object space. The traversal coprocessor 138 in example non-limiting embodiments transforms the ray into the object space of each object before performing the intersection tests for that object. This "instance transform" saves the computational effort of transforming the geometry of each object and the associated volumetric subdivisions of the acceleration data structure from object space to world space for purposes of the traversal coprocessor 138 performing intersection tests.

The requesting SM 132 keeps track of which objects are in front of which other objects with respect to each individual ray and resolves visibility in cases where one object hides another object, casts a shadow on another object, and/or reflects light toward another object. The requesting SM 132 can use the traversal processor 138 to accelerate each of these tests.

Example Tree BVH Acceleration Data Structure

Figure 8A:
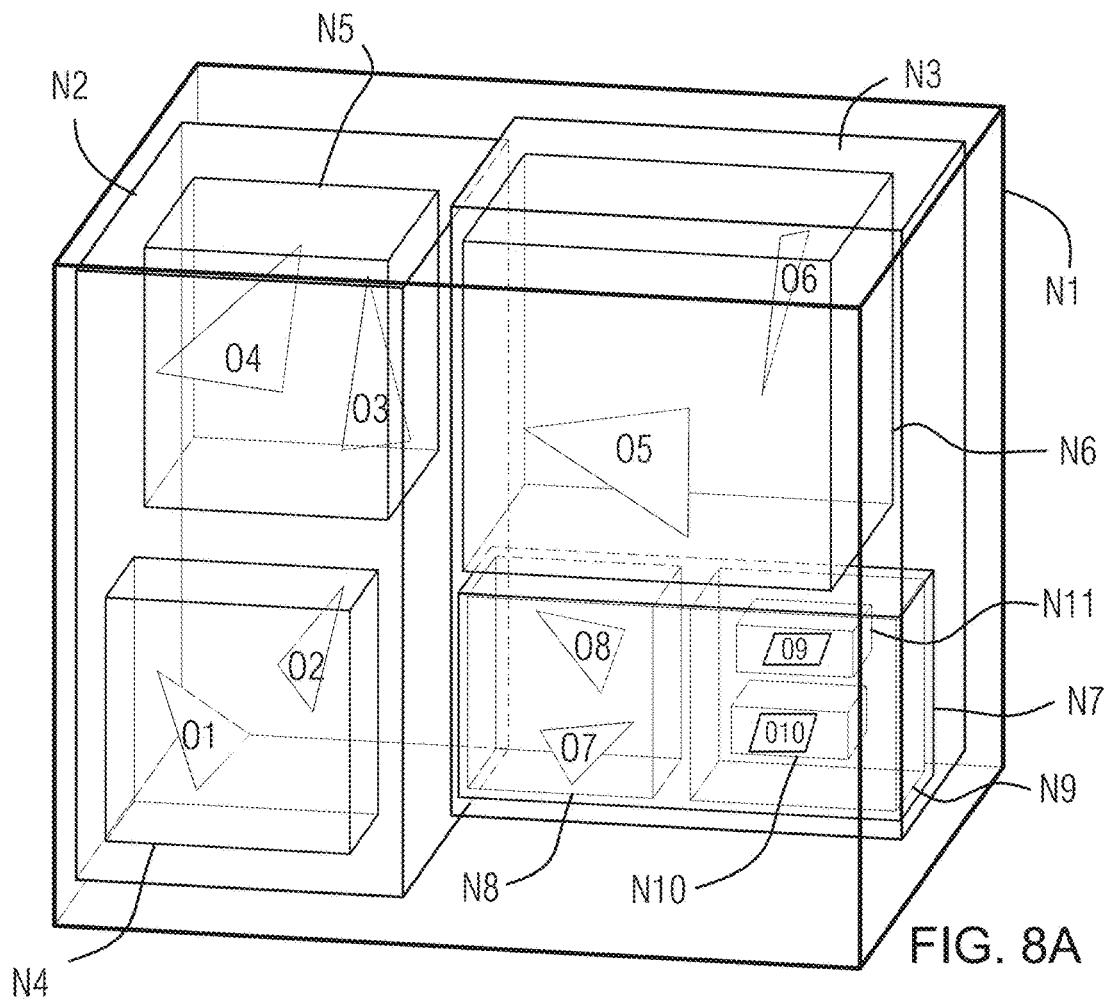
FIG. 8A illustrates an example non-limiting bounding volume hierarchy (BVH).
Figure 8B:
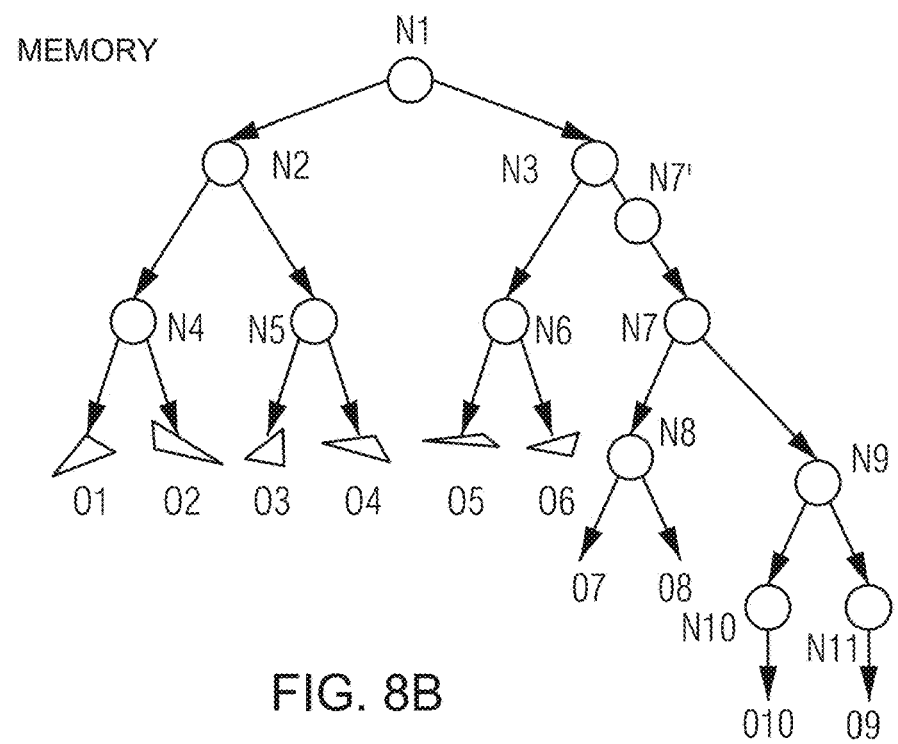
FIG. 8B shows an example acceleration data structure in the form of a graph or tree.

FIGS. 8A and 8B show a recursively-subdivided bounding volume of a 3D scene (FIG. 8A) and a corresponding tree data structure (FIG. 8B) that may be accessed by the traversal coprocessor 138 and used for hardware-accelerated operations performed by traversal coprocessor. The division of the bounding volumes may be represented in a hierarchical tree data structure with the large bounding volume shown in FIG. 2B represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure may be stored in memory outside of the traversal coprocessor 138 and retrieved based on queries the SMs 132 issue to the traversal coprocessor 138. The tree data structure includes a plurality of nodes arranged in a hierarchy. The root nodes N1 of the tree structure correspond to bounding volume N1 enclosing all of the triangles O1-O8. The root node N1 may identify the vertices of the bounding volume N1 and children nodes of the root node.

In FIG. 8A, bounding volume N1 is subdivided into bounding volumes N2 and N3. Children nodes N2 and N3 of the tree structure of FIG. 8B correspond to and represent the bounding volumes N2 and N3 shown in FIG. 8A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 8B tree structure correspond to and represent the FIG. 8A bounding volumes N4, N5, N6, N8, N10 and N11 in space.

The FIG. 8B tree is only three to six levels deep so that volumes N4, N5, N6, N8, N10 and N11 constitute "leaf nodes"—that is, nodes in the tree that have no child nodes. FIG. 8A shows that each of leaf node bounding volumes N4, N5, N6, and N8, contains two triangles of the geometry in the scene. For example, volumetric subdivision N4 contains triangles O1 & O2; volumetric subdivision N5 contains triangles O3 & O4; volumetric subdivision N6 contains trials O5 & O6; and volumetric subdivision N8 contains triangles O7 & O8. The tree structure shown in FIG. 8B represents these leaf nodes N4, N5, N6, and N7 by associating them with the appropriate ones of triangles O1-O8 of the scene geometry. To access this scene geometry, the traversal coprocessor 138 traverses the tree data structure of FIG. 8B down to the leaf nodes. In general, different parts of the tree can and will have different depths and contain different numbers of triangles. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).

The Internal Structure and Operation of Traversal Coprocessor 138

FIG. 9 shows an example simplified block diagram of traversal coprocessor 138 including hardware configured to perform accelerated traversal operations as described above (a still more detailed implementation of this traversal coprocessor 138 is described below). Because the traversal coprocessor 138 shown in FIG. 9 is adapted to traverse tree-based acceleration data structures such as shown in FIGS. 8A, 8B, it may also be called a "tree traversal unit" or "TTU" 700 (the 700 reference number is used to refer to the more detailed non-limiting implementation of traversal coprocessor 138 shown in FIG. 1). Tree traversal operations may include, for example, determining whether a ray intersects bounding volumes and/or primitives of a tree data structure (e.g., a BVH tree), which tests may involve transforming the ray into object space.

The TTU 700 includes dedicated hardware to determine whether a ray intersects bounding volumes and dedicated hardware to determine whether a ray intersects primitives of the tree data structure. In some embodiments, the TTU 700 may perform a depth-first traversal of a bounding volume hierarchy using a short stack traversal with intersection testing of supported leaf node primitives and mid-traversal return of alpha primitives and unsupported leaf node primitives (items). The intersection of primitives will be discussed with reference to triangles, but other geometric primitives may also be used.

In more detail, TTU 700 includes an intersection management block 722, a ray management block 730 and a stack management block 740. Each of these blocks (and all of the other blocks in FIG. 9) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 700. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 700. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 700 including one or more ray-complet test blocks 710 and one or more traversal logic blocks 712. A complet specifies root or interior nodes of a bounding volume. Thus, a complet may define one or more bounding volumes for the ray-complet test. The ray-complet test path of the TTU 700 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 700 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (e.g., short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 700 may request the BVH data structure identified in the query to be retrieved from memory outside of the TTU 700. Retrieved portions of the BVH data structure may be cached in the level-zero (L0) cache 750 within the TTU 700 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 700 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 612. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 700 may return intermediate as well as final results to the SM 132.

The intersected leaf nodes identify primitives that may or may not be intersected by the ray. One option is for the TTU 700 to provide e.g., a range of geometry identified in the intersected leaf nodes to the SM 132 for further processing. For example, the SM 132 may itself determine whether the identified primitives are intersected by the ray based on the information the TTU 700 provides as a result of the TTU traversing the BVH. To offload this processing from the SM 132 and thereby accelerate it using the hardware of the TTU 700, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 710 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 710.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture (see FIGS. 6A and 6B) and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 700 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection can be fully determined in the TTU 700 because the area of the opaque triangle blocks the ray from going past the surface of the triangle. For transparent triangles, ray intersections cannot in some embodiments be fully determined in the TTU 700 because TTU 700 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 710 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 700 (e.g., shortening the ray if the ray is blocked by the texture) based on this determination.

In one embodiment, the TTU 700 may be configured to return all triangles determined to intersect the ray to the SM 132 for further processing. Because returning every triangle intersection to the SM 132 for further processing is costly in terms of interface and thread synchronization, the TTU 700 may be configured to hide triangles which are intersected but are provably capable of being hidden without a functional impact on the resulting scene. For example, because the TTU 700 is provided with triangle type information (e.g., whether a triangle is opaque or transparent), the TTU 700 may use the triangle type information to determine intersected triangles that are occluded along the ray by another intersecting opaque triangle and which thus need not be included in the results because they will not affect the visibility along the ray. As discussed above with reference to FIGS. 5A-5C, if the TTU 700 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 700 and/or modify the query (e.g., shorten the ray if the ray is blocked by the texture) based on this determination.

Example Ray Tracing Shading Pipeline

Figure 10A:
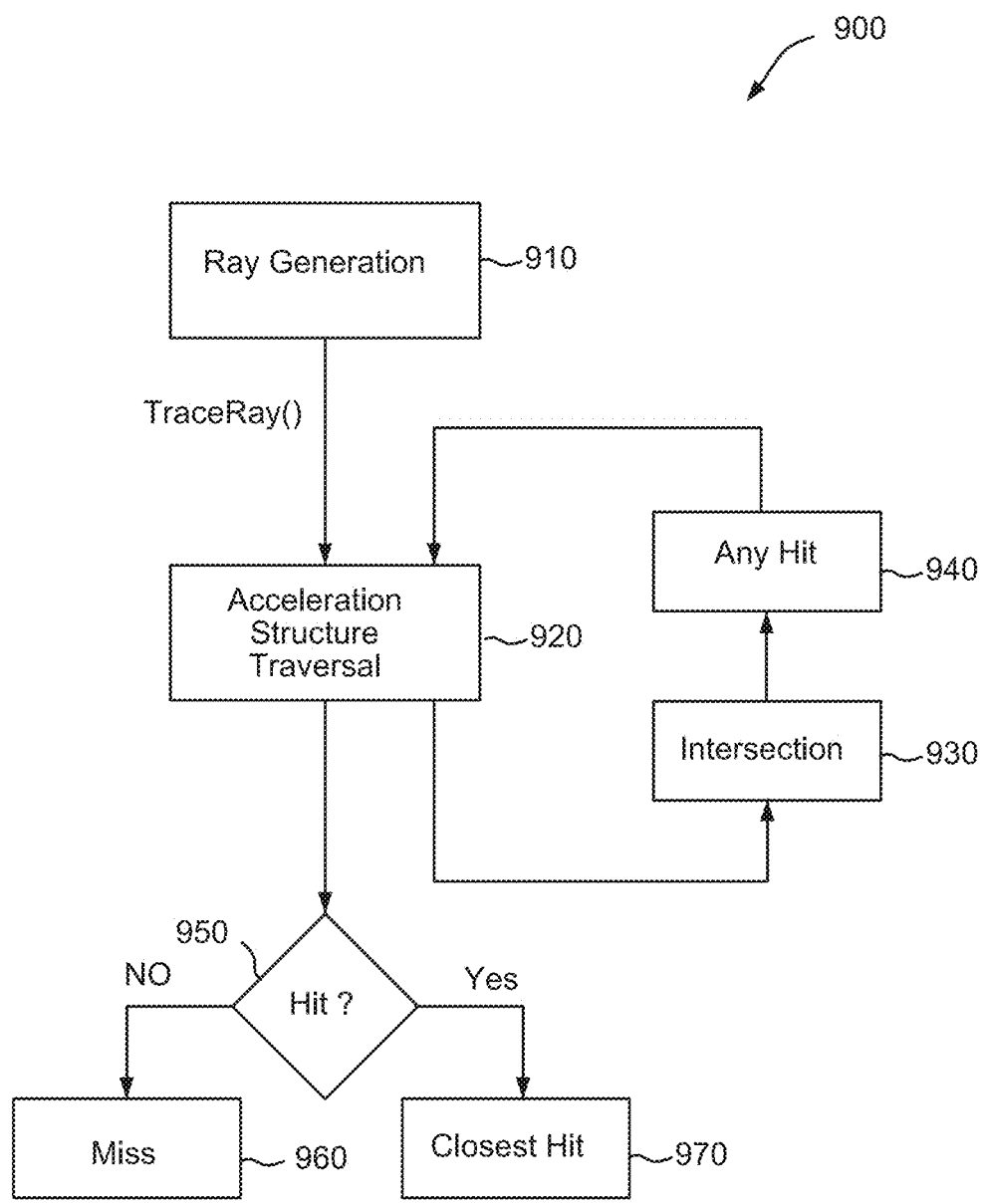
FIG. 10A illustrates an example non-limiting ray tracing shading pipeline flowchart.

FIG. 10A shows an exemplary ray tracing shading pipeline 900 that may be performed by SM 132 and accelerated by TTU 700. The ray tracing shading pipeline 900 starts by an SM 132 invoking ray generation 910 and issuing a corresponding ray tracing request to the TTU 700. The ray tracing request identifies a single ray cast into the scene and asks the TTU 700 to search for intersections with an acceleration data structure the SM 132 also specifies. The TTU 700 traverses (FIG. 10A block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 700 ray-primitive test block 720 performs an intersection 930 process to determine whether the ray intersects the primitives. The TTU 700 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 700 may return multiple intersections with different geometry in the scene in arbitrary order.

Alternatively, primitives that the TTU 700 determines are intersected may be further processed to determine 950 whether they should be shaded as a miss 960 or as a closest hit 970. The SM 132 can for example instruct the TTU 700 to report a closest hit in the specified geometry, or it may instruct the TTU to report all hits in the specified geometry. For example, it may be up to the SM 132 to implement a "miss" shading operation for a primitive the TTU 700 determines is intersected based on implemented environment lookups (e.g., approximating the appearance of a reflective surface by means of a precomputed texture image) such as shown in FIGS. 6A & 6B. The SM 132 may perform a closest hit shading operation to determine the closest intersected primitive based on material evaluations and texture lookups in response to closest hit reports the TTU 700 provided for particular object geometry.

Figure 10B:
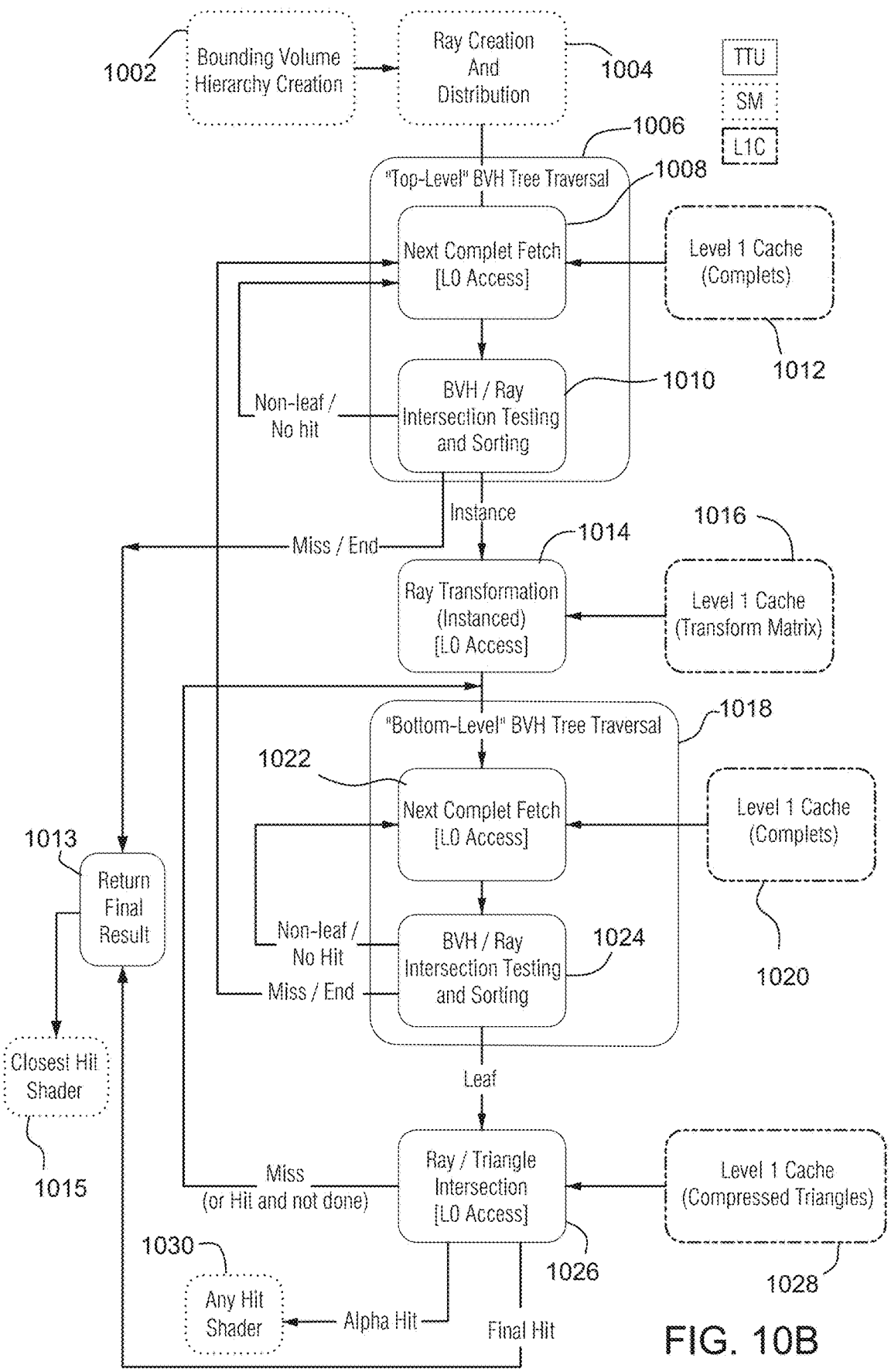
FIGS. 10B and 10C illustrate more detailed ray tracing pipelines.

The FIG. 10B more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 10B is essentially software-defined (which in example embodiments means it is determined by the SMs 132) but makes extensive use of hardware acceleration by TTU 700. Key components include the SM 132 (and the rest of the compute pipeline), the TTU 700 (which serves as a coprocessor to SM), and the L1 cache and downstream memory system, from which the TTU fetches BVH and triangle data.

The pipeline shown in FIG. 10B shows that bounding volume hierarchy creation 1002 can be performed ahead of time by a development system. It also shows that ray creation and distribution 1004 are performed or controlled by the SM 132 or other software in the example embodiment, as is shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 700. These do not have to be performed in the order shown, as handshaking between the TTU 700 and the SM 132 determines what the TTU 700 does and in what order.

The SM 132 presents one or more rays to the TTU 700 at a time. Each ray the SM 132 presents to the TTU 700 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 700 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 700 will process the query when the query intersects the bounding volume of a specific type or intersects a primitive of a specific primitive type. The mode flags the SM 132 provides to the TTU 700 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 700 to control various aspects of traversal behavior, back-face culling, and handling of the various child node types, subject to a pass/fail status of an optional RayOp test. RayOp tests add flexibility to the capabilities of the TTU 700, at the expense of some complexity. The TTU 700 reserves a "ray slot" for each active ray it is processing, and may store the ray flags, mode flags and/or the RayOp information in the corresponding ray slot buffer within the TTU during traversal.

In the example shown in FIG. 10B, the TTU 700 performs a top level tree traversal 1006 and a bottom level tree traversal 1018. In the example embodiment, the two level traversal of the BVH enables fast ray tracing responses to dynamic scene changes.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

In some embodiments, the top level traversal (in world space) is made in a BVH that may be dynamically recalculated (e.g., by SM 132) in response to changes in the scene, and the bottom level traversal is made in a BVH of bounding volumes that remain static or substantially static even when changes in the scene occur. The bounding volumes in the BVH used for the bottom level tree traversal 1018 (in object space) may encompass more detailed information regarding the scene geometry than the respective bounding volumes used in the top level tree traversal 1006, thereby avoiding or at least reducing the modification of the bottom level traversal BVH in response to scene changes. This helps to speed up ray tracing of dynamic scenes.

The top level tree traversal 1006 by TTU 700 receives complets from the L1 cache 1012, and provides an instance to the ray transformation 1014 for transformation or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

Figure 10C:
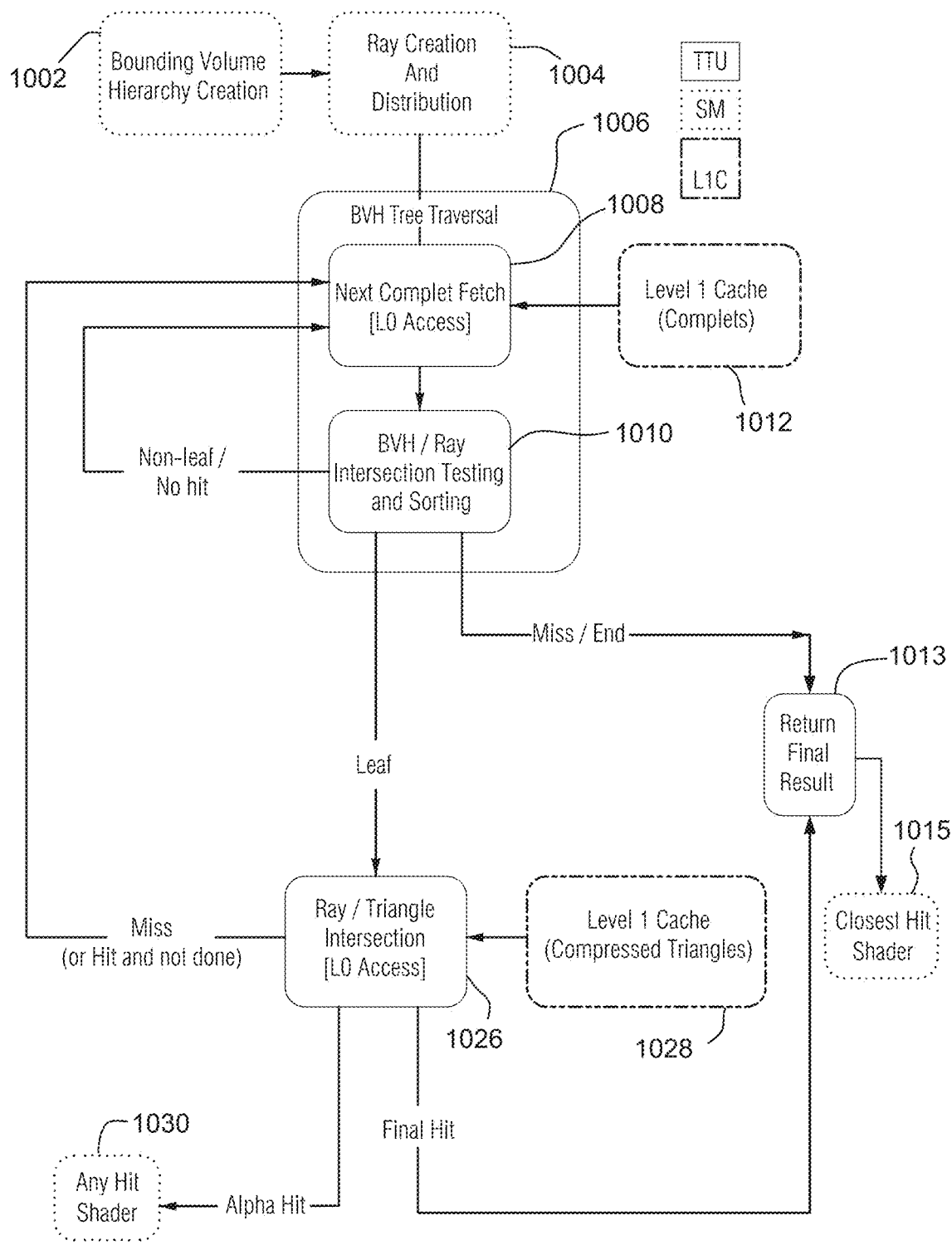

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 700, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 700 shown in FIG. 10C, the TTU does not execute a "bottom" level tree traversal 1018 and noninstanced tree BVH traversals are performed by blocks 1008, 1010 e.g., using only one stack. The TTU 700 can switch between the FIG. 10B instanced operations and the FIG. 10C non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018.

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 700. The ray/triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Watertight Ray Triangle Intersection", U.S. application Ser. No. 16/101,066 entitled "Method for Continued Bounding Volume Hierarchy Traversal on Intersection without Shader Intervention" and U.S. application Ser. No. 16/101,196 entitled "Method for Handling of Out-of-Order Opaque and Alpha Ray/Primitive Intersections", which are hereby incorporated by reference in their entireties.

While the above disclosure is framed in the specific context of computer graphics and visualization, ray tracing and the disclosed traversal coprocessor could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

Example Multiprocessor-Coprocessor Interface

The aspect of the TTU 700 accelerating the ray tracing shading pipeline 900 performed by SM 132, as described above, is the acceleration of the intersection detection between rays and BVHs in response to TTU queries made by SM 132. TTU 700 receives ray information and a BVH (or a portion of a BVH) for intersection testing from SM 132. The instruction that triggers TTU 700 to perform the accelerated intersection detection ("TTU query") may require many operands to specify the ray information and the BVH information to TTU 700. For example, in an embodiment, the input provided to TTU 700 for the accelerated intersection detection includes a ray specified using 8 floating point numbers (e.g., the ray origin and direction each requiring 3 floating point numbers, and ray start and end positions each requiring 1 floating point number) and a stack specified with the equivalent of 8 floats (e.g., 1-8 stack entries) for a total of at least 16 floats. The corresponding result output by TTU 700 includes at least an identifier for each intersected primitive/item and a t-value (e.g., current length of the ray) each requiring 1 floating point number, coordinates of each intersection requiring 2 floating point numbers, and the updated stack requiring the equivalent of 8 floats for a total of at least 12 floating point numbers. Still further, certain configurable controls over the BVH traversal performed by TTU 700, as described for example in U.S. application Ser. No. 16/101,180 titled "Query-Specific Behavioral Modification of Tree Traversal", may require further additional input parameters to be specified in the instruction triggering TTU 700 to perform the accelerated intersection detection. In this manner, whereas some typical instructions may include an opcode identifying the operation to be performed and 2-4 operands (e.g., immediates, register identifiers and/or memory addresses) specifying input/output parameters, an example TTU query instruction may require a large number (e.g., more than 4) of operands to be specified.

Ideally, a TTU query to determine ray-BVH intersections on TTU 700 would be initiated with a single instruction that takes several destination registers ("Rd0" etc.), several source registers ("Rs0" etc.), and a request specifier ("Imm") as an immediate: "TTU Rd0, Rd1, Rd2, . . . , Rs0, Rs1, Rs2, . . . , Imm". But this isn't practical in many systems because there may be no space in the instruction encoding to accommodate the many registers needed to completely specify the required input and output. Moreover, the number of registers required to be specified in the instruction may be variable.

Accommodating instructions that contain a large number of operands may lead to inefficiencies in a system. Wide communication paths, large queues and long durations between instructions are some of the reasons for potential inefficiencies. For example, communication paths between processors and/or between a processor and a memory may have to be designed specifically to accommodate wide instructions, whereas such wide communication paths may be wider than required for most instructions. Instruction queues/buffers may require substantial amounts of memory. Additionally, many multiprocessors are RISC-based and have relatively narrow fixed-size instructions. Moreover, a high number of input and output parameters in an instruction may result in relatively long per instruction completion times due at least in part to large numbers of stores and loads, thereby restricting the system's ability to implement instruction-level preemption of threads.

In example embodiments, instead of using a single wide instruction to cause TTU 700 to execute a query traversal of a BVH, methods and systems are provided by which a corresponding sequence of narrower instructions can be used to command TTU 700 to execute the traversal. Although the corresponding sequences of instructions are described in this document primarily in relation to the interface between SM 132 and TTU 700, the teachings with respect to the sequences of instructions are also applicable to interfaces between other multiprocessors and coprocessors. Moreover, the type of coprocessor operation facilitated by a sequence of instructions according to embodiments is not limited to traversals of a BVH, and may include any type of operation a coprocessor is configured to perform. Thus, example embodiments include a multi-instruction sequence of narrower instructions (e.g., instructions with 2-4 operands) for commanding a coprocessor operation, as an alternative to a single wider instruction (e.g., instructions with more than 4 operands) for commanding that same coprocessor operation.

A "multiprocessor", as used in this document, is a processor that is capable of maintaining microarchitectural state for multiple concurrent threads of execution, irrespective of organization or number of execution units. Example multiprocessors may include multi-core CPUs with or without support for simultaneous multithreading (SMT), single-core CPUs with support for SMT, and individual multiprocessors in parallel processing units (e.g., SMs in NVIDIA GPUs). Each SM in a NVIDIA GPU, for example, can maintain microarchitectural state for tens of warps and/or hundreds of concurrent threads.

A multiprocessor may support a variety of operations of different kinds, for arithmetic, control flow, data movement, etc., each exposed via an instruction in the multiprocessor's instruction set. The embodiments described herein primarily concern operations that are impractical to expose via a single instruction, for one or more reasons such as, but not limited to, the following: (1) the operation takes its input from registers or other memory locations but requires a large quantity of inputs for which the register names or memory addresses cannot be encoded in a single instruction, (2) the operation produces output in registers or in other memory locations but produces a large quantity of outputs for which the register names or memory addresses cannot be encoded in a single instruction, and (3) the operation requires execution resources that are limited and is of sufficiently high latency that exposing the operation as a single instruction would negatively impact achievable performance or complicate instruction scheduling. For example, with respect to (1) and (2) above, the supported instruction widths in the multiprocessor instruction set architecture (ISA) may not be sufficient to encode the required number of input registers and/or output registers as operands for the operation. The width of an instruction, as used herein, refers to the number of bits required to encode the instruction, i.e. narrow instructions require fewer bits for encoding when compared to wide instructions.

The hardware unit that implements/executes such an operation is herein referred to as a "coprocessor," irrespective of the degree to which it is integrated into the multiprocessor. Many embodiments below are described in relation to TTU 700 which operates as a coprocessor of the SM 132 by, among other things, accelerating the BVH traversal process for the SMs. However, it is not required that the coprocessor is a TTU, or even that the coprocessor is independent of the multiprocessor to a similar extent as the TTU 700 is independent of the SM 132. For example, although TTU 700 is substantially independent of SM 132 in that TTU 700 can detect many types of ray-BVH intersections without further communication with SM 132 after the ray and BVH information is received, the multiprocessors and coprocessors in example embodiments are not limited to any particular level of intercommunication between the multiprocessor and the coprocessor during the execution of the coprocessor operation.

The embodiments described herein incorporate one or more of three techniques to provide at least a portion of a multiprocessor-coprocessor interface. In some embodiments, the techniques may provide a part of the ISA of a GPU or other PPU for the purpose of interfacing a coprocessor such as the TTU to the SM of the GPU. However, although the multiprocessor-coprocessor interface according to embodiments, is described in this document primarily in the context of interfacing the TTU to the SM in a GPU, the teachings are not limited thereto, and are more generally applicable to many other types of multiprocessor-coprocessor interfaces.

The three techniques, described broadly, include: (1) programmatically initiating a coprocessor query using a multi-instruction sequence in a way that satisfies several non-trivial requirements, (2) a mechanism for fusing the sequence of instructions that constitute a coprocessor query into a single "macro-instruction," guaranteed to execute without interruption, and (3) an optimization that allows a subset of the coprocessor resources reserved for a given query to be freed before the entire query completes. Technique (1) enables the multiprocessor to interact with the coprocessor using a multi-instruction sequence without the need for wide instructions with numerous operands, technique (2) modifies the multi-instruction sequence such that the multiprocessor instruction-level preemption is made more efficient, and technique (3) improves the speed of processing and utilization of coprocessor resources.

Multi-Instruction Sequence for Coprocessor Operation

Some example embodiments provide a multi-instruction sequence of narrower instructions to cause a coprocessor to perform a particular operation, which may, in a system that accommodates very wide instructions, have been caused by a single wide instruction having many operands. As noted above, in example embodiments, the relatively large numbers of input and/or output registers and/or memory addresses required for efficient execution of certain multiprocessor operations is provided to the coprocessor by multiples of write instructions (also referred to as "store instructions") and read instructions (also referred to as "load instructions") before and after, respectively, the operation.

The multi-instruction sequence according to embodiments comprises several instructions that are part of the multiprocessor's instruction set architecture, including coprocessor connection open/close instructions (e.g., "CP_OPEN"/"CP_CLOSE"), a coprocessor wait instruction (e.g., "CP_WAIT"), a write to coprocessor instruction (e.g., "CP_WRITE"), a read from coprocessor instruction (e.g., "CP_READ"), and coprocessor command instruction (e.g., "CP_COMMAND"). It will be understood by persons skilled in the art that the names, identifiers and opcodes, etc. used herein are examples only, and do not limit the embodiments.

Figure 11A:
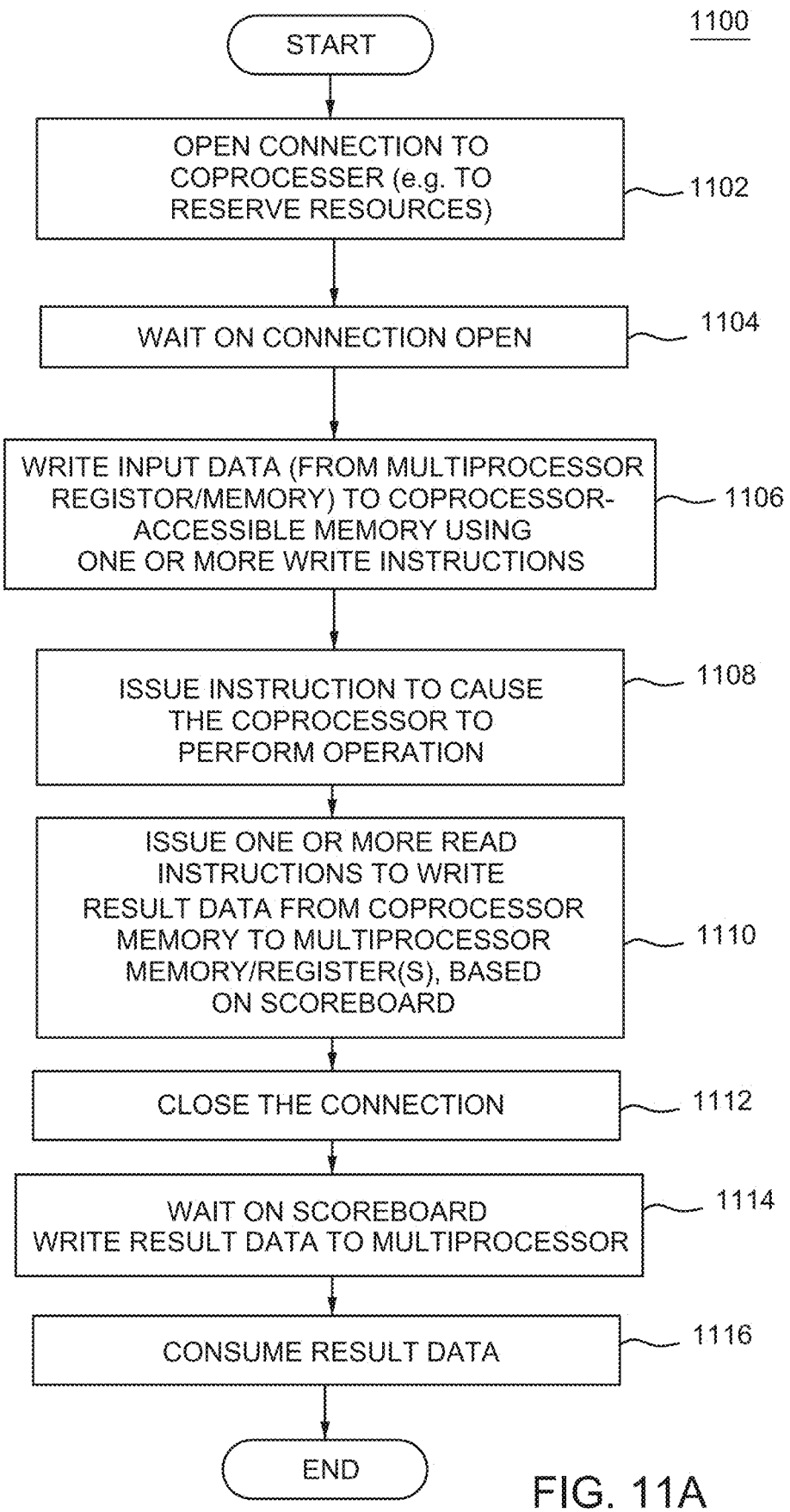
FIG. 11A illustrates an example process by which a multiprocessor (e.g. a streaming multiprocessor of a GPU) uses a multiprocessor-coprocessor interface to execute a target operation on a coprocessor (e.g., a traversal accelerator), according to some example embodiments.

FIG. 11A illustrates an example process 1100 by which a multiprocessor uses a multi-instruction sequence according to an example embodiment to execute a target operation on a coprocessor. The coprocessor connected to the multiprocessor executes the target operation and another process, described below as process 1120, in response to process 1100. According to some embodiments, a multiprocessor such as multiprocessor 1502 and coprocessor such as coprocessor 1504 may execute process 1100 and process 1120, respectively.

In some example embodiments, SM 132 and TTU 700 may execute process 1100 and process 1120, respectively. For example, in a real-time ray tracing application as that described above in relation to FIG. 1, an application executing on CPU 120 may form a ray tracing query or similar request to the GPU 130 using a multi-instruction sequence of the above described narrow instructions. Within GPU 130, the multi-instruction sequence may be executed on SM 132, with SM 132 causing TTU 700 to perform the querying of a BVH in accordance with the multi-instruction sequence.

The example multi-instruction sequence used in process 1100 may be as follows:

```
CP_OPEN
CP_WAIT
CP_WRITE cp[0x100] R2, R3
CP_WRITE cp[0x208] R4, R5
CP_WRITE cp[0x300] R10, R11
CP_COMMAND 0x1
CP_READ R12, R13, cp[0x400] &release_when_complete(sb0)
CP_READ R16, R17, cp[0x460] &release_when_complete(sb1)
CP_CLOSE
# ...
# ... (optional arbitrary intervening instructions)
# ...
WAIT_ON_SCOREBOARD sb0
WAIT_ON_SCOREBOARD sb1
...
# Consume results (e.g., storing results to memory):
STORE [R7], R12
# ...
```

At step 1102, after entering process 1100, the multiprocessor begins issuing instructions of the above multi-instruction sequence in order to execute a particular target operation (e.g., a predetermined operation which the coprocessor is configured to execute; e.g., a TTU query described above) on the coprocessor on behalf of a particular thread or group of threads (e.g., a warp) as scheduled on the SM. At step 1102, the multiprocessor requests a connection to the coprocessor by, for example, issuing a connection open instruction (e.g., CP_OPEN). The request may be made for one or more threads on the multiprocessor. In some embodiments, the request is made for a group of threads (e.g., a warp) corresponding to the active SIMD lanes in the multiprocessor.

A "connection" in the context of the multiprocessor-coprocessor interface is a session during which certain resources are reserved for use in the service of the particular target operation for which the connection was established. For example, upon a connection request being received, the coprocessor may reserve resources such as memory, one or more execution slots on the coprocessor processing pipeline, etc. The resources and how much of a resource to be reserved may be implementation specific, and may be determined by the coprocessor based on predetermined information (e.g., preconfigured information for each thread in the thread group) or based on one or more operands specified with the connection open request.

At step 1104, the multiprocessor blocks until the connection open request is responded to by the coprocessor. For example, the multiprocessor issues an instruction (e.g., CP_WAIT in the above sequence) to block the requesting thread(s) until connection setup is completed. Thus, after CP_OPEN, the multiprocessor can process further operations to execute the particular target operation only after the resources required for the connection have been acquired and/or reserved in the coprocessor, and it has been notified that connection establishment has completed.

At step 1106, one or more write instructions (e.g., CP_WRITE) are issued writing input data from the multiprocessor to memory and/or registers accessible to the coprocessor. The source data for the CP_WRITE may be from multiprocessor registers and/or from a memory. The destination for the CP_WRITE may be coprocessor internal memory, coprocessor registers and/or another memory accessible to the coprocessor. The input data includes, and in some embodiments may only include, data necessary for the particular operation. That is, at least in some embodiments, the input data specified by the one or more write instructions collectively is the entire set of input data used by the particular target operation executed on the coprocessor.

At step 1108, a command instruction (e.g., CP_COMMAND) is issued to cause the coprocessor to perform the particular target operation. In some embodiments, the command instruction may not include any operands, such as when the coprocessor is a specialized processor configured to execute only a single coprocessor operation (e.g., only a query to detect ray-BVH intersections) and therefore any call to the coprocessor can be interpreted as being a request to execute the single target operation. In some embodiments, an operand (e.g., an immediate) can be specified identifying one of a plurality of predefined coprocessor-executable operations.

At step 1110, one or more read instructions (e.g., CP_READ) are issued to read the result data from the target operation performed by the coprocessor. The read instructions copies the result data from coprocessor-accessible memory and/or registers to multiprocessor registers and/or memory. According to some embodiments, the one or more read instructions collectively includes the entirety of the result data being provided from the coprocessor to the multiprocessor.

Since the multi-instruction sequence is configured to block only at connection establishment, the instructions in the multi-instruction sequence after the connection open instruction up to and including connection close instruction can be issued by the multiprocessor in a back-to-back (i.e., issuing the instruction without waiting for a previously issued instruction to complete) manner. Although such back-to-back issue may enhance the speed of execution, it may also lead to the read instructions being received by the coprocessor before the particular coprocessor operation initiated by the command instruction has completed (i.e., coprocessor operation still in flight), and thus before the result data is even available to be written out to the multiprocessor.

Accordingly, each of the read instructions may configure a scoreboard entry (or other similar technique) to generate a signal to the multiprocessor when the result data is actually written to the multiprocessor.

Scoreboarding is one example of a technique that may be used to monitor as to when the data write associated with the read instruction can be performed, and embodiments are not limited thereto. Scoreboarding is a well-known technique that was previously used in devices such as the CDC 6600 computer for executing instructions. A scoreboard may be configured to track the data dependencies of every instruction, and releases an instruction when it is determined that no conflicts exist with previously issued and yet incomplete instructions. In example embodiments, each read instruction may configure a respective scoreboard entry so that the availability of the result data to be written to the multiprocessor can be monitored before actually copying the data from the source location in the coprocessor-accessible memory and/or register to multiprocessor memory and/or registers.

At step 1112, after the one or more read instructions are issued, the multiprocessor issues a connection close instruction. The connection close causes the multiprocessor to close the connection to the coprocessor because the particular operation has been completely specified at this point.

Between steps 1112 and 1114, the multiprocessor may optionally issue one or more other instructions. This capability enables the multiprocessor thread or thread group to continue performing processing or other operations while the coprocessor is performing the particular operation as commanded by the multiprocessor. In some embodiments, another multi-instruction sequence for a particular coprocessor target operation may be issued in between steps 1112 and 1114. This capability to continue performing other processing before the results from an earlier issued coprocessor target operation are received improves efficiency and latency hiding.

At step 1114, the thread or thread group waits on the scoreboard. One or more wait instructions may be issued to cause the thread or warp to block on the scoreboard. As described above, each read instruction may configure a scoreboard entry to be triggered when a particular result data location in the coprocessor is ready (e.g., the particular operation executed on the coprocessor writes the result data to the coprocessor-accessible memory and/or register). When the scoreboard entry is triggered due to the monitored data location being available to read, that result data is copied from the coprocessor-accessible memory to the designated multiprocessor-accessible memory location(s) and/or register(s).

At step 1116, after each of the one or more wait instructions that block on the scoreboard have been cleared, the multiprocessor can consume the result data written to its accessible memory locations and/or registers. For example, the thread or thread group may consume the result data from a particular operation performed by the coprocessor by writing the result data from the multiprocessor registers to memory.

Figure 11B:
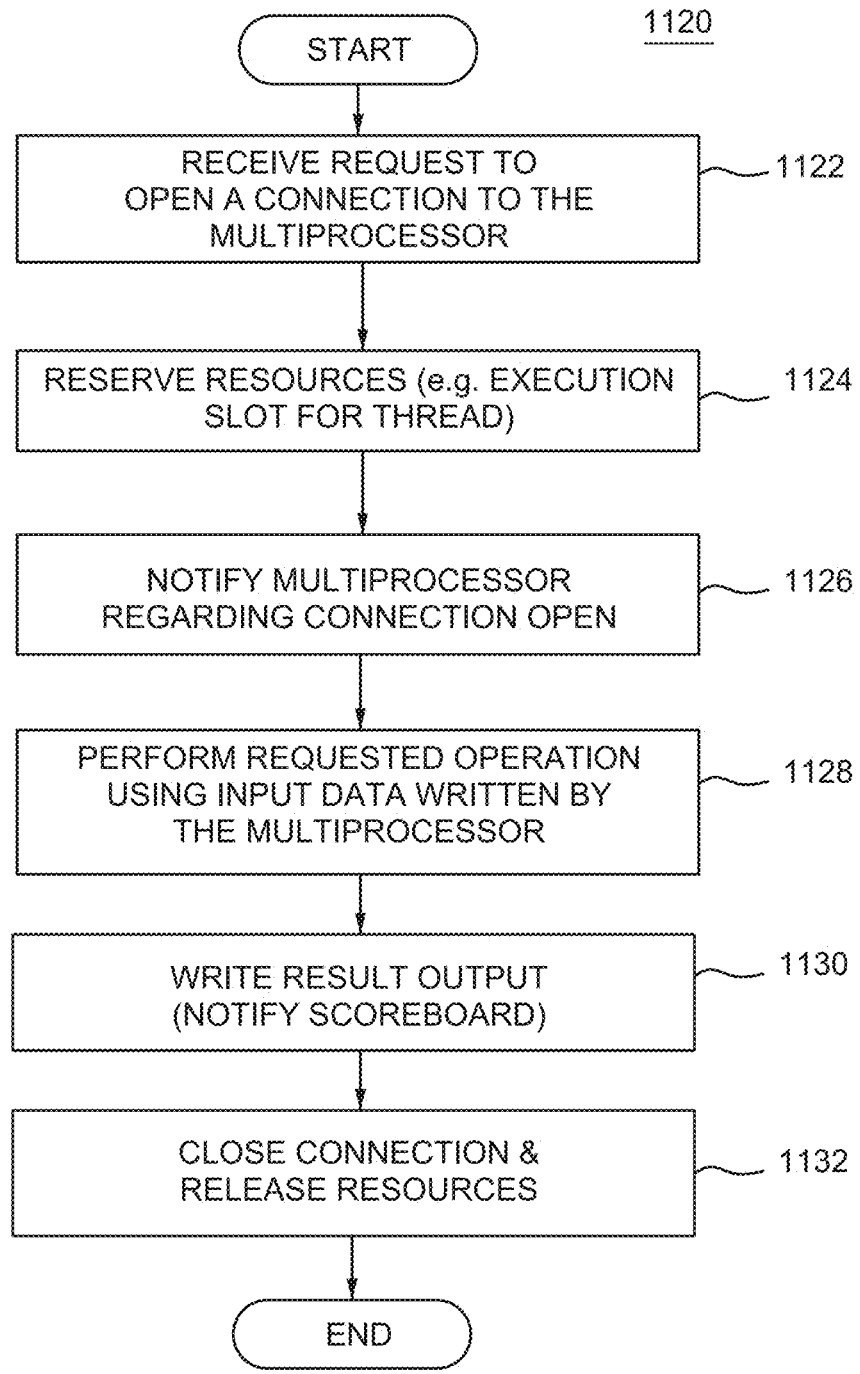
FIG. 11B illustrates a flowchart for a process that may be performed on the coprocessor in response to a process performed by the multiprocessor of FIG. 11A.

FIG. 11B illustrates a flowchart for a process 1120 that may be performed on the coprocessor, as described above, in response to process 1100 performed by the multiprocessor.

The coprocessor receives notification of a connection open request at step 1122.

At step 1124 resources are reserved. The resources may include memory storage, registers and/or processing pipeline slots. The resources reserved for executing the particular operation for a thread or thread group may collectively be referred to as an execution slot. The number of execution slots that can be in active use at a time may depend on the resource capacities and availabilities.

As described above, the multiprocessor thread or thread group issuing the connection open instruction blocks after the instruction is issued. This ensures that there is only a single pending request for a connection open for a particular thread or thread group at a time. In some embodiments, this also ensures that the coprocessor has allocated the resources required to store the data sent by the subsequent CP_WRITEs.

At step 1126, the coprocessor notifies the multiprocessor regarding connection open. After the coprocessor successfully reserves the execution slot(s) in response to the connection request, the multiprocessor is notified of the resource acquisition being successfully completed.

At operation 1128, the coprocessor executes the requested target operation using input data written to coprocessor accessible memory and/or registers. The target operation may be one of a plurality of operations for which the coprocessor hardware is specially configured. In one example embodiment, as described above the coprocessor may be TTU 700 which may include hardware that is custom built for BVH traversal. In some other embodiments, a coprocessor such as coprocessor 1504 may include hardware optimized for certain other types of target operations.

At step 1130, the coprocessor writes result data to memory. The memory locations may be monitored by a scoreboard or the like implemented in the multiprocessor. As respective memory locations are written to, the scoreboard may trigger the multiprocessor to (in step 1114, for example)

copy the result data from the memory locations written by the coprocessor to multiprocessor memory and/or registers.

At step 1132, after the coprocessor writes the result data to memory, the connection is closed on the coprocessor and the reserved resources are released.

Figure 12:
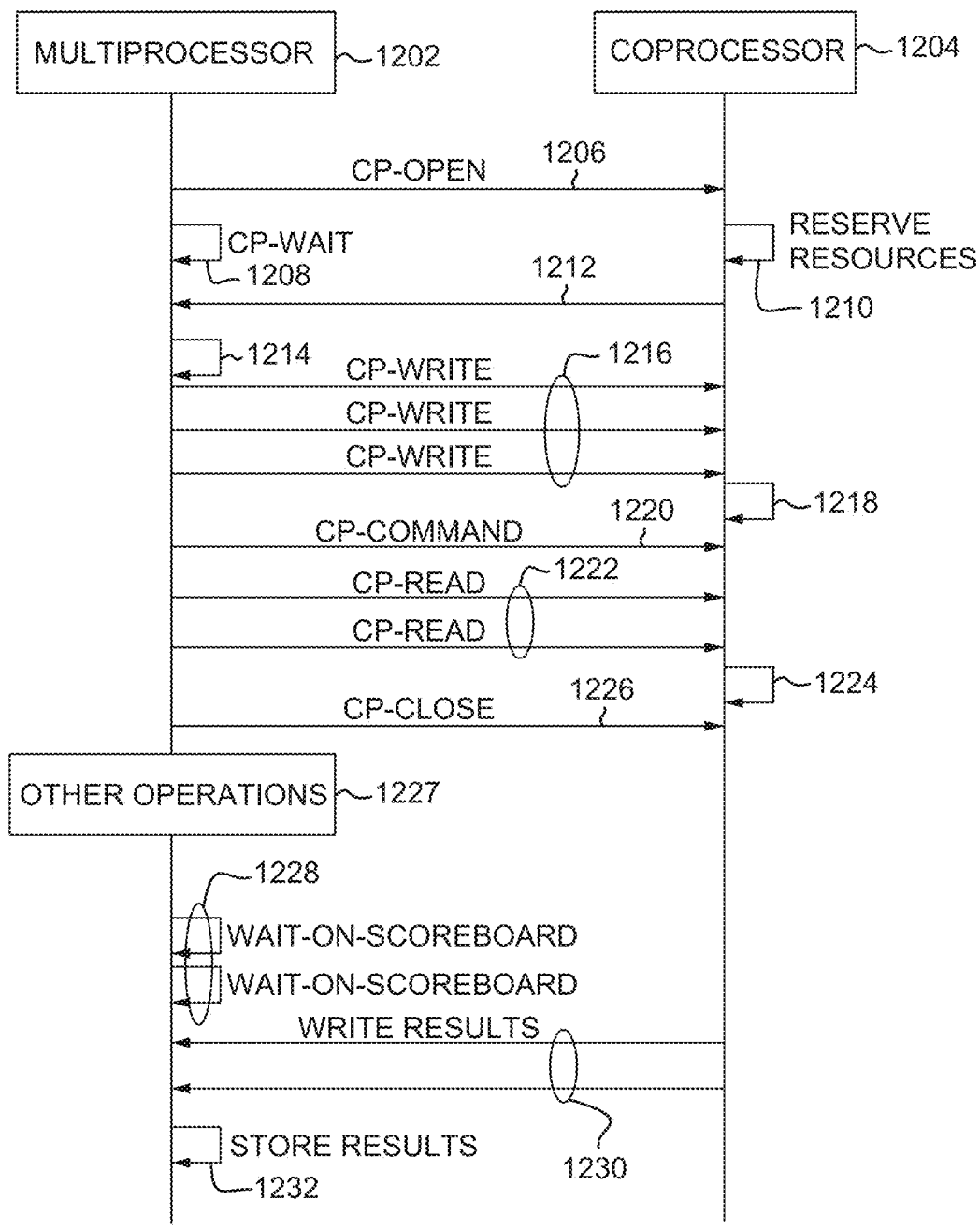
FIG. 12 shows an activity flow diagram that further illustrates temporal relationships between the instructions and performed actions on the multiprocessor and the coprocessor when the multi-instruction sequence described in relation to FIG. 11A is used, according to some example embodiments.

FIG. 12 shows an activity flow diagram 1200 that further illustrates temporal relationships between the instructions and performed actions on multiprocessor 1202 and coprocessor 1204 when the multi-instruction sequence described above in relation to FIG. 11A is executed on the multiprocessor 1202. Process 1200 may represent a particular example implementation of processes 1100 and 1120 described above.

At a high level, the instruction sequence shown above provides for the multiprocessor to reserve resources in the coprocessor, to specify input parameters, to execute the operation in the coprocessor using the specified input parameters, and cause the writing of results to registers or memory accessible by the multiprocessor. The following provides a description of the semantics of each instruction in the above multi-instruction sequence (e.g., as used in the process 1200 when a multiprocessor, such as, for example, SM 132, accelerates ray intersection operations for a particular thread or group of threads), according to some embodiments.

The "CP_OPEN [optional resource specifier(s)]" instruction 1206 causes multiprocessor 1202 to open a connection to the coprocessor 1204 and reserve sufficient resources to complete the particular operation. In some embodiments, particularly in embodiments in which the coprocessor is configured to perform only one type of target operation (e.g., such as a coprocessor configured to only perform accelerated traversal of a BVH), the types and quantities of the resources to be received may not be explicitly specified. In such embodiments, the multiprocessor may determine the required resources based on implicit aspects such as, for example, the type of thread and/or number of the currently active SIMD lanes in the multiprocessor. For example, when the multiprocessor performs ray tracing and each thread in a group of threads represents a respective ray, and when n SIMD lanes in the multiprocessor are currently active, the multiprocessor may determine to reserve memory for storing n rays or to initially request only portion of that required memory to be reserved. In some embodiments, such as, for example, embodiments in which the coprocessor is configured for more than one acceleration function, the CP_OPEN instruction may optionally accommodate one or more operands (e.g., specified as immediates) which may be used to specify the particular coprocessor operation being invoked by the multi-instruction sequence and/or resource types and quantities to be reserved. In some embodiments, the multiprocessor may determine the required resources based on one or more of the operands of the CP_OPEN and may make a request for resource reservation to the coprocessor in accordance with its determination of resources.

In some embodiments, based on the request received from the multiprocessor, the coprocessor determines the types and quantities of the resources to be reserved. For example, based on the type of coprocessor operation to be performed and/or a number of active SIMD lanes as signaled from the multiprocessor, the coprocessor may determine the memory, registers and/or processing pipeline slots to reserve. Based on its determination of required resources and/or based on information provided by the multiprocessor, the coprocessor reserves 1210 resources. The reserving may include ensuring that the particular resources are currently available and are not assigned for use by a currently incomplete operation in the coprocessor. The coprocessor may be configured to keep track of what resources are allocated to each target operation that is either being performed or is to be performed in response to an issued CP_COMMAND instruction.

The "CP_WAIT" instruction 1208 causes the thread or group of threads on the multiprocessor to wait for acknowledgment 1212 from the coprocessor that the requested resources have been allocated and the connection has been opened. That is, in an example embodiment, the wait state (e.g., blocking state) for the thread or thread group is released 1214 only when the acknowledgment 1212 is received from the coprocessor. The blocking may be implemented by setting a flag (e.g., "CP_WAIT_FLAG" 1516 in FIG. 15) which is required to be checked by the multiprocessor before issuing any coprocessor instruction. In example embodiments, the multiprocessor does not issue connection open instructions for other threads or thread groups if it already waiting in a blocked state due to one thread or thread group. That is, in some example embodiments, only a single connection open may be pending on the coprocessor.

As an example, consider that the coprocessor resources requested by CP_OPEN consist of a single "execution slot" per particular target operation that is to be performed in response to CP_COMMAND. The above described multi-instruction sequence and execution scheme are agnostic to the number of coprocessor execution slots provided by the implementation, as well as the maximum number of concurrent threads supported by the multiprocessor. In a degenerate case of this example, thousands of threads can safely share a single execution slot without risk of deadlock. This follows from the configuration in embodiments that a thread that has executed CP_OPEN and received acknowledgment that an execution slot has been granted is guaranteed to execute the remainder of the sequence (up through CP_CLOSE) irrespective of what any other thread is doing, given that basic assumptions such as fairness in scheduling is included in the multiprocessor and coprocessor. Likewise, once the connection has been closed via CP_CLOSE, the coprocessor is guaranteed to complete the operation and free associated resources without further intervention from the thread or thread group, given that all allowed operations are themselves guaranteed to terminate.

The "CP_WRITE <coprocessor destination address>, <source register(s)>" instruction 1216 causes the multiprocessor to write input data to a coprocessor "address" from one or more multiprocessor registers or memory. The specified coprocessor address may specify a physical location in a data RAM internal to the coprocessor and/or otherwise accessible to the coprocessor. In some embodiments, the specified coprocessor address may include an abstract specification of the way the data is interpreted and/or transformed when written to the coprocessor to affect the overall operation. In the example ray tracing acceleration, the CP_WRITE instructions 1216 and, optionally, a subsequent coprocessor copy 1218, stores input data including one or more rays, one or more stacks for use in exchanging information between the co-processor and multiprocessor is written to coprocessor-accessible memory and/or registers.

The "CP_COMMAND [optional command specifier]" instruction 1220 initiates the particular target operation, acting on the input data provided by the preceding CP_WRITE instructions 1216 and/or input data copied 1218 from the memory written by the CP_WRITE instruction 1216 to coprocessor registers by the coprocessor. In some embodiments, such as in embodiments in which the coprocessor is configurable to perform a selected one or a plurality of coprocessor operations, the particular coprocessor operation 1224 to be performed may be specified by an optional operand (e.g., a command specifier). In the current example, of the ray tracing acceleration, the multiprocessor uses the coprocessor to accelerate the traversal of the BVH to determine ray-BVH intersections via a coprocessor executed BVH traversal operation.

The "CP_READ <destination register(s)>, <coprocessor source address>" instruction 1222 causes the multiprocessor to read output data from a coprocessor "address" and write it to one or more registers of the multiprocessor. The specified coprocessor address may specify a physical location in a data RAM internal to the coprocessor and/or otherwise accessible to the coprocessor. In some embodiments, the specified coprocessor address may include an abstract specification of the way the result data is to be interpreted and/or transformed when written to the multiprocessor. In the example ray tracing acceleration, one or more CP_READ may be used to return the detected ray-BVH intersection(s) and continuation stack from the coprocessor to the multiprocessor.

According to example embodiments, the CP_READ instruction 1222 is non-blocking, and the operation initiated by the preceding CP_COMMAND 1220 need not have completed when CP_READ executes. In effect, CP_READ 1222 is a promise to eventually write the output data to the specified destination location(s).

Example embodiments provide for the thread or group of threads to be notified when the result data is in registers and/or other memory location accessible to the multiprocessor, and is ready to be consumed. As described above, in some embodiments, a scoreboard is used to notify the multiprocessor when the result data from the particular operation performed by the coprocessor is written 1230 by the coprocessor to the location read by the multiprocessor. That is, the multiprocessor associates an explicit named scoreboard with a CP_READ instruction via a "release when complete" annotation. The thread or thread group then waits for the scoreboard to be released immediately before consuming the results, which allows additional work to be performed while the operation is still in progress.

The "CP_CLOSE" instruction 1226 causes the multiprocessor to close the connection to the coprocessor. At this point, specification of the particular coprocessor operation (including destination registers for the output result data) is complete, but the target operation being performed by the coprocessor may still be in flight.

The only blocking instruction in the {CP_OPEN, . . . , CP_CLOSE} sequence is CP_WAIT, which waits on resources. All subsequent instructions may execute back-to-back, to the extent allowed by the implementation. In fact, it is valid for the "arbitrary intervening instructions" 1227 that follow CP_CLOSE in the example to include another {CP_OPEN, . . . , CP_CLOSE} sequence, which indicates that multiple coprocessor operations can be in flight at once, on behalf of a single thread of execution.

In some example embodiments, each connection is independent. That is, the coprocessor is stateless in the sense that a given operation (specified via a {CP_OPEN, . . . , CP_CLOSE} sequence) cannot affect later occurring coprocessor operations (i.e. a later occurring particular coprocessor commands specified by CP_COMMAND instructions) unless its output result data is directly or indirectly used by the thread or thread group to affect the input of that later occurring coprocessor operation, such as, for example, by passing such result data to the later occurring particular coprocessor operation via CP_WRITE.

The WAIT_ON_SCOREBOARD instruction(s) 1228 are blocking instructions that causes the thread or thread group to wait on a particular scoreboard entry setup by a preceding CP_READ 1226. As described above, the scoreboard is used to keep track of defined dependencies and is used to notify the thread or thread group when each of the CP_READ instruction(s) writes result data output by the coprocessor to multiprocessor registers and/or memory.

Activity 1230 illustrates the coprocessor writing, as a result of the particular target operation initiated by CP_COMMAND 1220 being executed on the coprocessor, result data. In some example embodiments, the coprocessor may write the result data to a coprocessor-accessible memory, from which the multiprocessor obtains the result data by specifying the "coprocessor source address" specified in the CP_READ 1222 instruction(s).

After the last WAIT_ON_SCOREBOARD 1228 has unblocked, the thread or thread group may consume the result data. In the example ray tracing acceleration, when the last WAIT_ON_SCOREBOARD is unblocked, all the stack information being returned from the coprocessor would have completed writing to multiprocessor registers and/or memory. The further processing of the thread or thread group may then proceed with by storing (STORE RESULTS 1232) or otherwise consuming the result data. In the example ray tracing acceleration, the consuming may include using the returned ray-BVH intersection information and continuation stack in one or more of determining image characteristics, and determining another portion of the BVH to be processed by the coprocessor.

Instruction-Level Preemption in the Multi-Instruction Sequence

In order to improve application performance, multiprocessors such as SM 132 may be configured to preempt a thread or thread group at an individual instruction level. In some example embodiments, SM 132 may be configured to support a thread or thread group being preempted at any point, or at least during a substantial portion of the thread's or thread group's run duration. In order to preempt the thread or thread group on SM 132 in a manner that it can be subsequently restored with consistency, the state of the coprocessor in relation to the thread or thread group must be saved and subsequently restored. Another advantage of the above scheme including the multi-instruction sequence is that it can be made to be consistent with instruction-level preemption requirements of high performance multiprocessors.

This is accomplished in example embodiments by reserving a range of coprocessor addresses that provide access to coprocessor state for use by the trap handler(s) responsible for saving off and subsequently restoring thread state and further requiring that any target operation that has already been initiated on the coprocessor with CP_COMMAND be allowed to complete before the thread or thread group is preempted.

Figure 13:
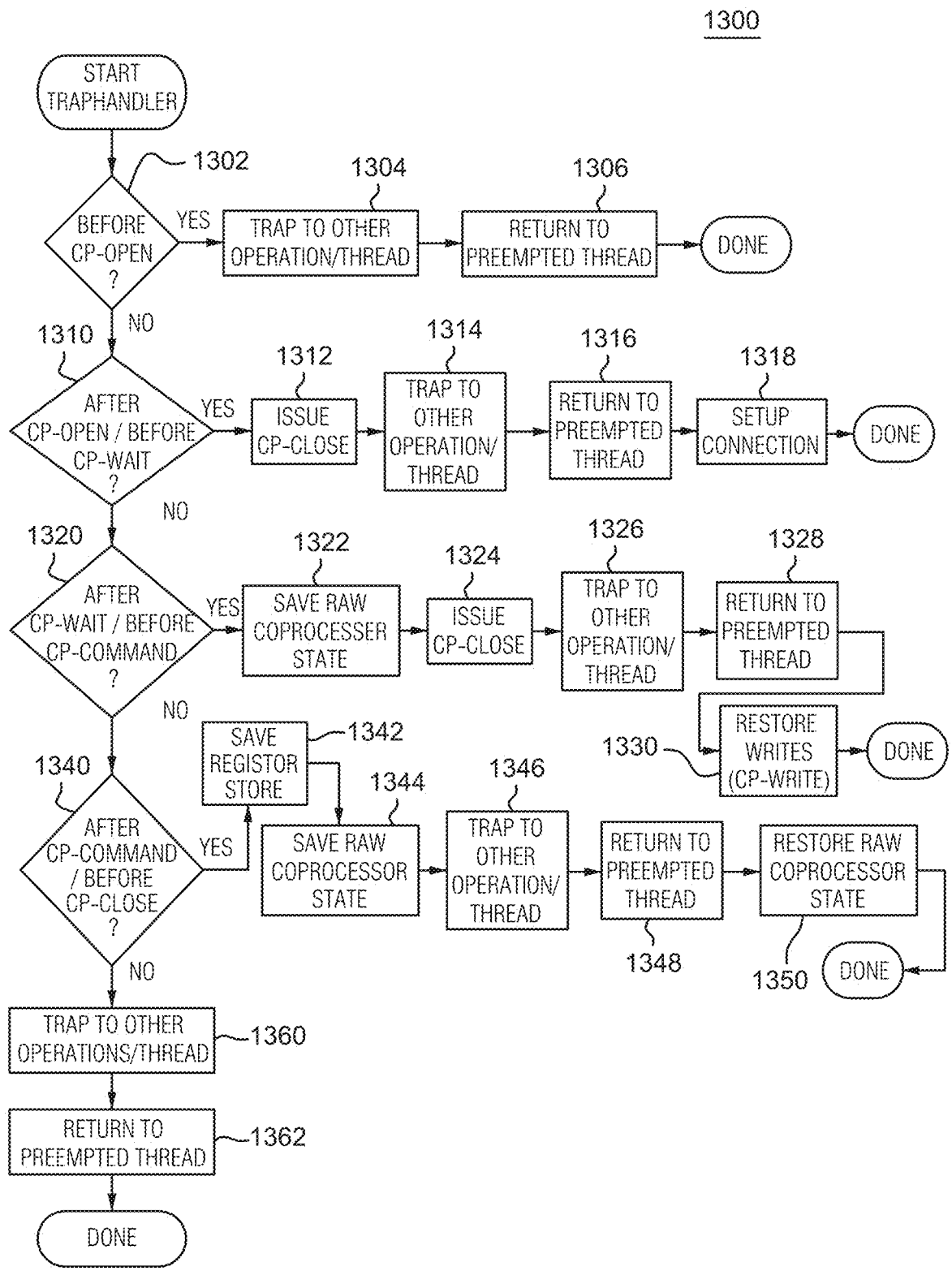
FIG. 13 is a flowchart illustrating instruction-level preemption at a multiprocessor-coprocessor interface, according to some example embodiments

FIG. 13 includes a flowchart illustrating the instruction-level preemption at the multiprocessor-coprocessor interface according to some example embodiments. The flowchart illustrates how preemption is handled by a trap handler 1300 executing on the multiprocessor when traps occur at various locations in the thread's or thread group's execution of the multi-instruction sequence described in relation to FIG. 11A.

Trap handler 1300 may be invoked in response to interrupts occurring on the multiprocessor or elsewhere in the system. When trap handler 1300 is invoked, it determines the current position in the multi-instruction sequence being executed by currently executing thread or thread group. The currently executing thread or thread group is referred to below as the "first thread", and the thread or thread group that causes the preemption is called "second thread".

If the current position of the first thread is before CP_OPEN 1302 then the trap handler does not perform any processing or state saving with respect to the coprocessor because no connection is open between the multiprocessor and coprocessor for the first thread. Therefore, the trap handler proceeds to preempt 1304 the first thread and to switch to the second thread, and subsequently switches back 1306 to the first thread after the second thread completes, its time slice expires, or the like.

If the current position in the first thread is between CP_OPEN and CP_WAIT 1310, then the trap handler may note that a CP_OPEN for the first thread was pending, but may then close the connection immediately by issuing a CP_CLOSE 1312. The trap handler then proceeds to preempt 1314 the first thread and to switch to the second thread, and subsequently switches back 1316 to the first thread. When restoring thread state for the first thread, the trap handler may reopen a connection on behalf of the first thread by a CP_OPEN 1316.

If the current position of the first thread is between CP_WAIT and CP_COMMAND 1320, any number of CP_WRITE instructions may have been executed by the first thread. So the trap handler 1300 may save off coprocessor state by a series of CP_READ instructions 1322 before closing the connection by issuing a CP_CLOSE 1324. The trap handler then proceeds to preempt 1326 the first thread and to switch to the second thread, and subsequently switches back 1328 to the first thread. When restoring thread state for the first thread 1330, the trap handler reopens a connection on behalf of the first thread via CP_OPEN and then restores the coprocessor state via a series of one or more CP_WRITE instructions.

If the current position of the first thread is between CP_COMMAND and CP_CLOSE 1340, at that position in the sequence any number of CP_READ instructions may have been executed by the first thread. Given that the target operation initiated by CP_COMMAND has been allowed to complete before the trap handler is executed, the already-executed CP_READ instructions will have had their results written to registers, which may be saved off 1342 by the trap handler in the conventional way. In order for any subsequent CP_READ instructions to produce the correct results, the trap handler must save 1344 and restore 1350 the coprocessor state. In a similar manner to step 1330, to restoring thread state for the first thread 1350, the trap handler reopens a connection on behalf of the first thread via CP_OPEN and then restores the coprocessor state via a series of one or more CP_WRITE instructions.

If the current position of the multi-instruction sequence is after CP_CLOSE 1360, then currently there is no connection open for the first thread between the multiprocessor and the coprocessor, and thus the trap handler does not perform saving/restoring of coprocessor state in the process of preempting and restoring the first thread. Therefore, the trap handler proceeds to preempt 1360 the first thread and to switch to the second thread, and subsequently switches back 1362 to the first thread after the second thread completes, its time slice expires, or the like.

The characteristic that preemption at arbitrary points can be handled robustly in this way is a non-trivial property of the example embodiments, as can be seen by considering seemingly minor perturbations. For example, consider what would happen if the CP_COMMAND instruction were omitted in favor of making initiation of the operation a side effect of CP_CLOSE. In such a scheme, it would not be possible to service CP_READ instructions that have already executed, since the coprocessor operation itself would not yet have been initiated, assuming preemption prior to the CP_CLOSE. Depending on details of the multiprocessor, replaying those CP_READ instructions might be infeasible or involve substantial added complexity. Simply saving off the destination register name as part of the coprocessor state is not a solution by itself, for example, since multi-threaded processors generally virtualize registers such that a given register name could correspond to any of a number of physical locations in the register file, and the name-to-physical mapping for a given thread might change depending on details of how it is preempted and restored.

Moreover, some variations on the above scheme that are basically cosmetic in nature may be adopted by an implementation in some example embodiments in order to reduce the length of a typical multi-instruction sequence by one or more instructions. A first variation may include, if there is space in the instruction encoding (as is likely to be the case when the number of supported commands is small), CP_COMMAND may be combined with the final CP_WRITE in the sequence to form a combined "CP_WRITE AND COMMAND" instruction. A second variation includes, similar to the first variation, CP_CLOSE may be combined with the final CP_READ to form a combined "CP_READ AND CLOSE" instruction.

Simplified Instruction-Level Preemption with a Macro-Instruction

The multi-instruction sequence described in relation to FIGS. 11-13 above is illustrative of how the multiprocessor-coprocessor interaction in example embodiments is made robust even in the presence of preemption. A variation on this basic interface is adapted in certain example embodiments in order to eliminate the need for raw access to coprocessor state, as used by the trap handler 1300. This adaptation may reduce design and verification complexity, and may also be more suitable for coprocessors that are shared between two or more multiprocessors.

The idea implemented by the inventors in the adaptation is to fuse the complete {CP_OPEN, . . . , CP_CLOSE} instruction subsequence within the multi-instruction sequence described in relation to FIG. 11A into a single "macro-instruction" by disabling interrupts for the duration of the subsequence. Moreover, the macro-instruction is implemented in a way that cannot be abused or accidentally misused to keep interrupts disabled indefinitely. This is done with a macro initiation instruction (e.g. "CP_MACRO_FUSE") that takes an explicit count of instructions that the multiprocessor is configured to execute without interruption. In the description here, the convention that the count excludes the CP_MACRO_FUSE instruction itself is adopted, but embodiments are not limited thereto.

A macro-instruction consisting of three "micro-instructions" would then have the following general form:
CP_MACRO_FUSE 3
MICRO_INST_A
MICRO_INST_B
MICRO_INST_C That is, the macro-instruction for the three micro-instructions consists of a macro initiation instruction (CP_MACRO_FUSE) followed by the three micro-instructions. When applied to the multiprocessor-coprocessor interface described in relation to FIGS. 11A, 11B and-12, CP_MACRO_FUSE is combined with CP_WAIT to form a new CP_MACRO_FUSE instruction in order for it to have the desired effect of fusing the full coprocessor instruction subsequence (with the exception of CP_OPEN) while also eliminating the possibility of a thread disabling interrupts and then waiting an indeterminate length of time for coprocessor resources to be allocated and a connection to be opened, as could happen if CP_OPEN were included in the macro-instruction.

With this enhancement, the example multi-instruction sequence described in relation to FIGS. 11-12 is adapted to be:

```
CP_OPEN
CP_MACRO_FUSE 7
CP_WRITE cp[0x100] R2, R3
CP_WRITE cp[0x208] R4, R5
CP_WRITE cp[0x300] R10, R11
CP_COMMAND 0x1
CP_READ R12, R13, cp[0x400] &release_when_complete(sb0)
CP_READ R16, R17, cp[0x460] &release_when_complete(sb1)
CP_CLOSE
# ...
# ... (optional arbitrary intervening instructions)
# ...
WAIT_ON_SCOREBOARD sb0
WAIT_ON_SCOREBOARD sb1
...
# Consume results (e.g., storing results to memory):
STORE [R7], R12
# ...
```

The adapted multi-instruction sequence as shown above includes the "CP_MACRO_FUSE 7" instruction specifying that the next 7 instructions in the sequence are to be issued while interrupts are disabled. The next 7 instructions include all the CP_WRITE, CP_COMMAND, CP_READ and CP_CLOSE instructions in the sequence as specified. Enabling of interrupts can be done only after the 7 instructions. Therefore, in the adapted multi-instruction sequence, the entire subsequence {CP_OPEN . . . CP_CLOSE} is guaranteed to execute without preemption.

Conventional techniques can be used to disable interrupts, and to subsequently enable interrupts.

Figure 14A:
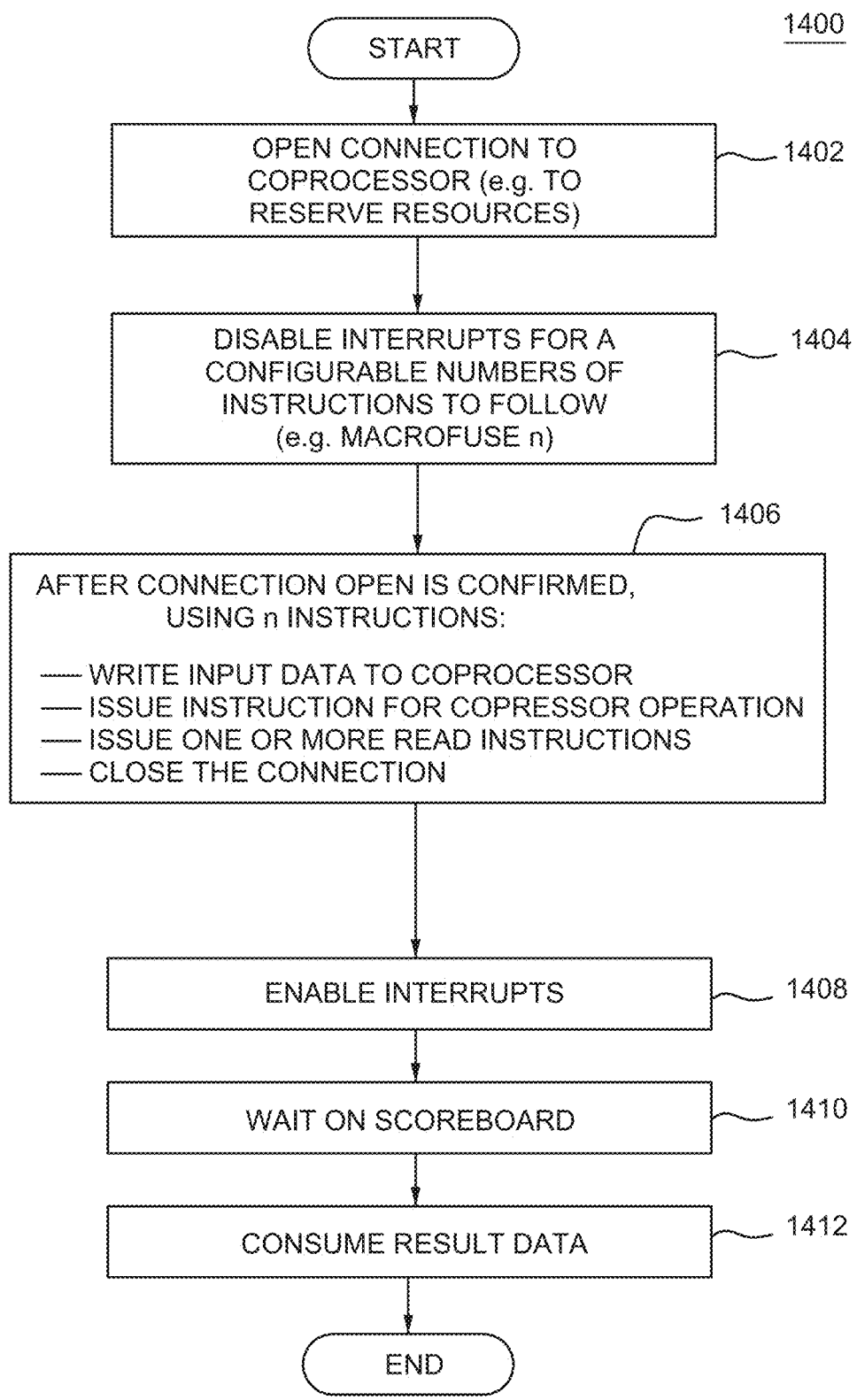
FIG. 14A is a flowchart of a process which issues an adapted form of the multi-instruction sequence described in relation to FIG. 11A, according to some example embodiments.

FIG. 14A includes a flowchart of a process 1400 which issues the adapted multi-instruction sequence (i.e., including the CP_MACRO_FUSE instruction) according to some example embodiments. The only changes from the process 1100 described in relation to FIG. 11A are the CP_MACRO_FUSE instruction issued (and the associated disabling of interrupts) at step 1404 after the CP_OPEN 1402 and the enabling of interrupts at step 1408. Thus, in FIG. 14A, step 1402 corresponds to step 1102 as described in relation to FIG. 11A, step 1406 corresponds to steps 1104-1112 as described in relation to FIG. 11A, step 1408 corresponds to step 1114 as described in relation to FIG. 11A, and step 1410 corresponds to step 1116 as described in relation to FIG. 11A.

Note that it is still possible for the thread or thread group executing the multi-instruction sequence to be preempted between the CP_OPEN and CP_MACRO_FUSE instruction. Therefore, the trap handler is configured to check for this possibility (e.g., via a dedicated instruction) and then open a new connection on behalf of the thread via CP_OPEN before returning control to the restored thread. This may be the only remaining responsibility of the trap handler as far as the coprocessor interface is concerned. Also note that while the trap handler must initiate opening of a connection via CP_OPEN, it need not wait for coprocessor resources to be allocated or for the connection to be actually opened, since that is accomplished by the restored thread waiting at CP_MACRO_FUSE (e.g., which includes CP_WAIT on connection open).

The CP_MACRO_FUSE instruction enables the implementation, in effect, of a coprocessor instruction that is a variable length "macro-instruction," accomplished via a series of simpler micro-instructions. The implementation in example embodiments satisfy several high-level requirements, including the following: (1) the macro-instruction must be considered a single instruction for the purpose of compute instruction-level preemption (CILP); (2) preemption latency must remain bounded for all possible macro-instructions that can be expressed in the ISA, and in particular, hardware must guarantee that the macro-instruction mechanism cannot be abused to hold off traps indefinitely; and (3) the macro-instruction must be considered a single instruction for the purpose of single-step debugging.

As described in relation to FIG. 11A, CP_OPEN requests allocation of the coprocessor resources required for the query. The resources may include a "ticket" for the connection and either one or more "execution slots" per thread or thread group. CP_OPEN is non-blocking, but it has the side-effect of setting a flag in SM that is associated with the thread or thread group, which is referred to as the "CP_WAIT_FLAG" bit. Note that CP_OPEN is not part of the coprocessor macro-instruction.

The macro-instruction begins with the macro initiation instruction "CP_MACRO_FUSE." This micro-instruction is not eligible to issue until CP_WAIT_FLAG clears. Once it does, the next N micro-instructions are also guaranteed to complete before the SM can trap, where N is specified as an immediate operand of the CP_MACRO_FUSE instruction.

The only instructions allowed within a macro are CP_MACRO_FUSE (which must begin the macro), CP_WRITE, CP_COMMAND, CP_READ and CP_CLOSE instructions.

CP_MACRO_FUSE is ineligible to issue until the CP_WAIT_FLAG bit clears (i.e., until SM receives an acknowledgment from coprocessor that a ticket has been allocated for that thread or thread group).

Improved Concurrency with Partial Result Return

A coprocessor that is capable of executing multiple operations in parallel (on behalf of one or more threads) requires some amount of resources for each in flight operation. Example required resources may include internal working memory and space for results to be stored before they are returned to the host processor. Unless they are overprovisioned (at the expense of area on the coprocessor), such resources are likely to limit the number of operations that can be in flight at once and thus overall throughput in cases where latency of the operations results in idle execution units (in the coprocessor and/or in the multiprocessor, due to threads waiting for coprocessor operations to complete).

In order to alleviate such inefficiencies, some example embodiments allocate coprocessor resources for a particular coprocessor target operation at a finer granularity than a single "execution slot". For example, a target operation might consist of a larger number of sub-operations or "work items" that are independent of each other. In a SIMD multiprocessor, such work items might correspond to SIMD lanes that are active when the thread initiated the operation.

In this scenario, because work items are independent, it is possible to, and some example embodiments are configured to, write back result data to registers for only a subset of work items and free any associated coprocessor resources before the complete set of items (and thus the target operation) completes. Thus, according to some embodiments, some coprocessor resources (e.g., execution slot) that hold result data can be cleared before the connection associated with a thread or thread group is closed, thereby enabling reuse of such resources as and when they are freed. This takes advantage of storage in the register file in the multiprocessor, corresponding to the destination registers of CP_WRITE instructions that would otherwise be sitting empty. Note that it is not necessary that all data for a given CP_WRITE be written back at once; for example, in the case where the destination registers are vector registers (with one register per SIMD lane), it may be advantageous to write back results for only a subset of lanes at a time. The only requirement, at least in some embodiments, is that the program not consume the results from a given CP_WRITE until all results for that CP_WRITE are present in the multiprocessor register file. In embodiments where readiness is indicated by a scoreboard, this implies that the scoreboard should not be released until all results have been written back.

Figure 14B:
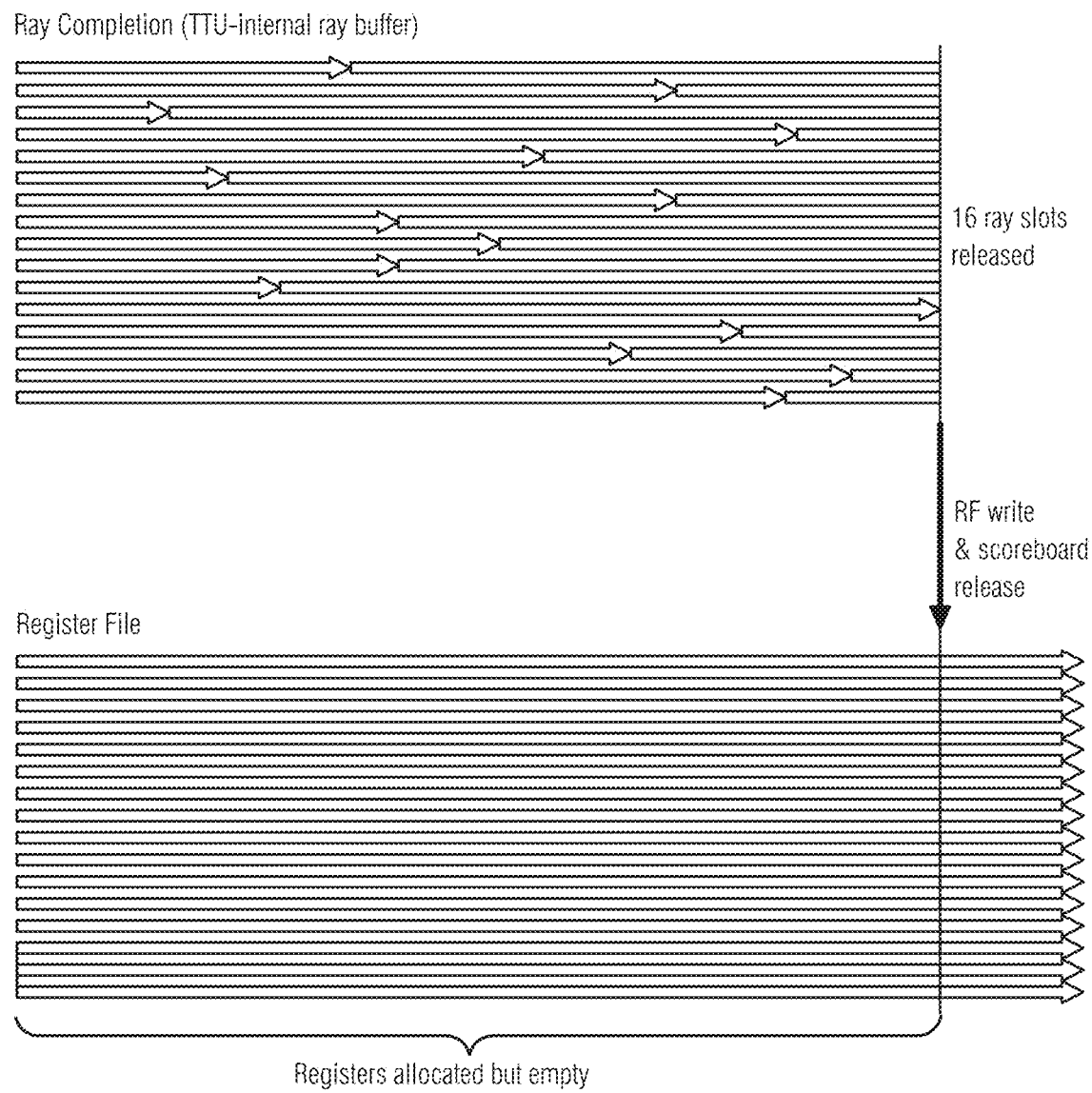
FIG. 14B and FIG. 14C show the result output from a coprocessor for a group of threads being returned in sub groups threads to the multiprocessor registers, according to some example embodiments.
Figure 14C:
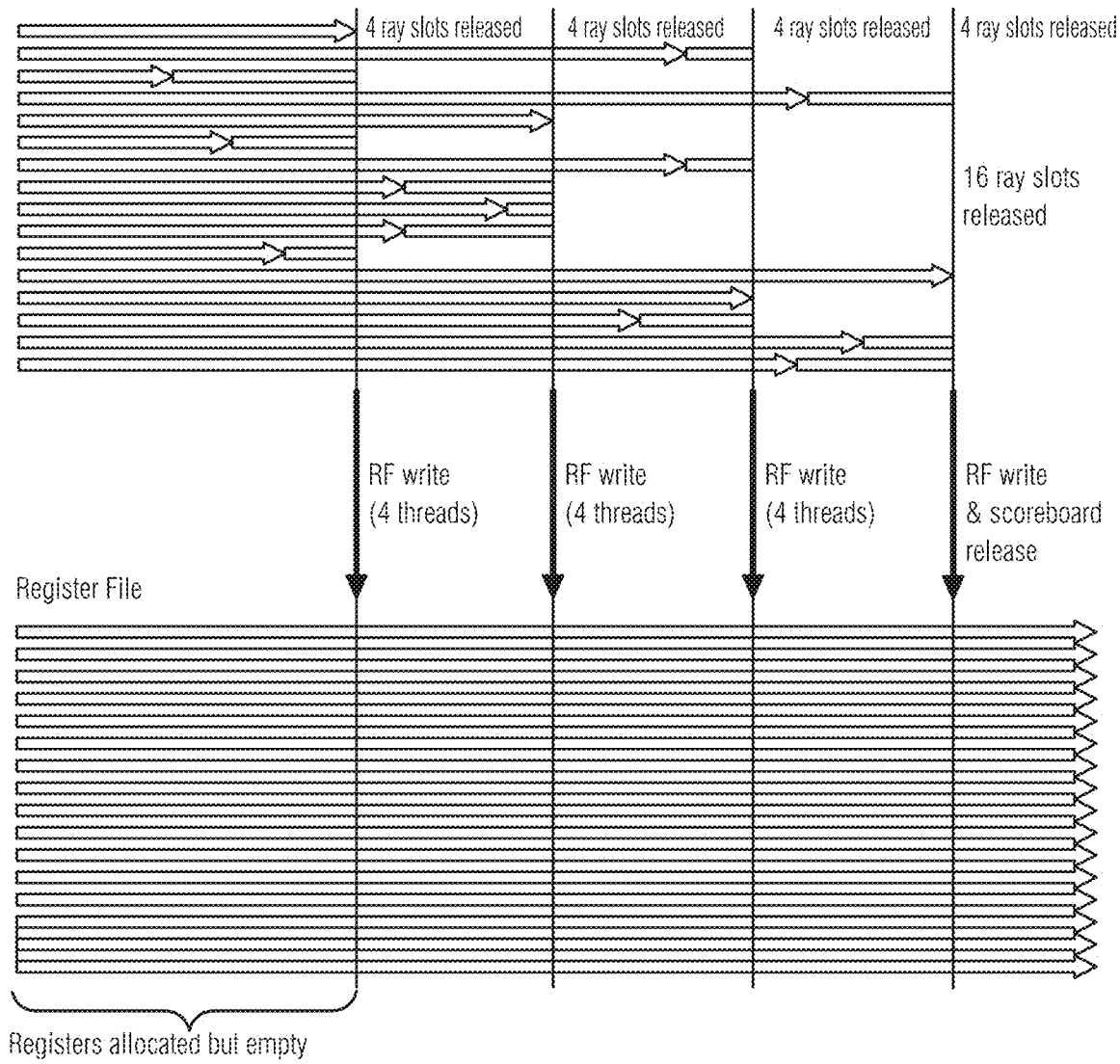

In an example embodiment, the multiprocessor-coprocessor interface enables the multiprocessor to command the coprocessor to execute a coprocessor operation (e.g., ray traversal of BVH, a "TTU query") on up to 32 work items (e.g., corresponding to the 32 lanes or "threads" in a warp). Work items in this example embodiment may include rays. The coprocessor target operation (e.g., "TTU query") can write ray intersection results back at configurable granularity, where the default granularity may be 8 rays. FIG. 14B and FIG. 14C show the result output from the coprocessor for a 16 thread group of threads being returned in groups of 4 threads to the multiprocessor registers, thus freeing up the respective execution slots reserved on the coprocessor for respective ones of the group of threads as the target operation completes for each respective thread. As illustrated in FIG. 14B, when the entire group of 16 threads write results to multiprocessor registers at the same time, the coprocessor memory used by each of the 16 threads remain occupied and all the register files in the multiprocessor, even if allocated, remains idle. In contrast, FIG. 14C illustrates, the group of 16 threads being allowed to return results to the multiprocessor registers in groups of 4 threads. The time staggered return of results as each subgroup of threads completes its processing on the coprocessor improves the utilization of the already allocated registers in the multiprocessor while more quickly freeing valuable coprocessor memory as and when respective sub groups of the threads complete their respective uses of the coprocessor. This significantly (e.g., by tens of percent) improves performance at processor fixed area requirement, or from another perspective, reduces area at fixed performance.

General Multiprocessor-Coprocessor Interface

Figure 15:
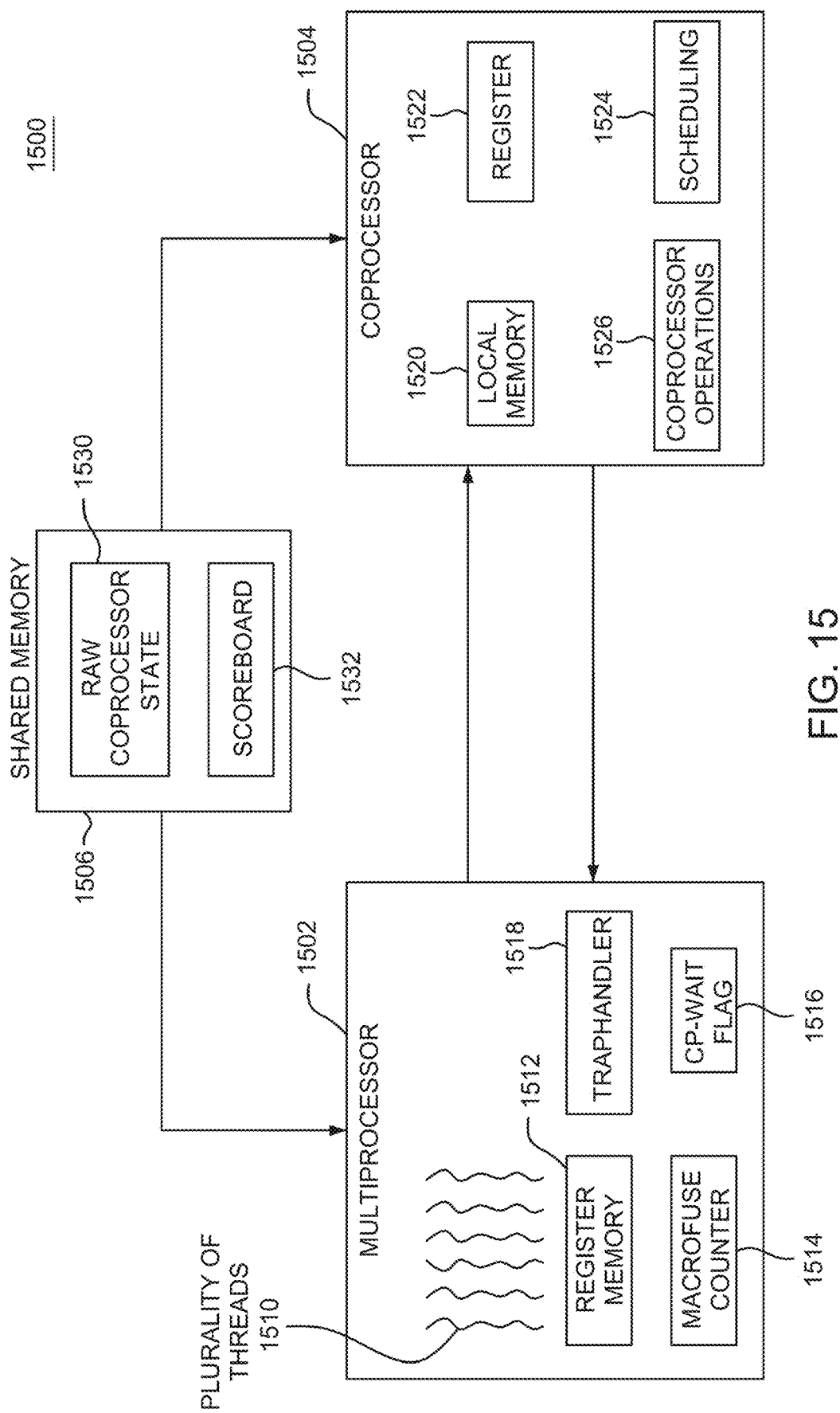
FIG. 15 shows a system including an interface between a multiprocessor and a coprocessor, according to some example embodiments.

As described above, embodiments are not limited to a multiprocessor-coprocessor interface that corresponds to the interface between SM 132 and TTU 700. FIG. 15 shows a system 1500 including an interface between a multiprocessor 1502 which may be different type of multiprocessor than SM 132 and a coprocessor 1504 which may be a different type of coprocessor than TTU 700. Multiprocessor 1502 and coprocessor 1504 may communicate directly over a communication bus 1505, and both may have access to a shared memory 1506. The shared memory 1506, although shown as being located outside the coprocessor 1504 and multiprocessor 1502, is not limited thereto. In some embodiments, the shared memory 1506 may be located inside the coprocessor 1502, separately or integrated with a local memory 1520 of the coprocessor. In some embodiments, shared memory 1506 may be cache memory (e.g., such as L0/L1 cache of the TTU 700) or other memory to which the coprocessor has only read access.

Multiprocessor 1502 is configured to concurrently execute a plurality of threads 1510, and may be further configured to command the coprocessor 1504 to perform one or more of coprocessor operations 1526 to accelerate the processing of one or a group of the plurality of threads 1510. As described above, in a SIMD multiprocessor a group of threads (e.g., a warp) may be scheduled to execute concurrently.

The coprocessor 1504 may include its own scheduling 1524 that can ensure fair scheduling for work items (i.e. threads) submitted by the multiprocessor to the coprocessor. The coprocessor may also include its local memory (e.g., RAM) 1520 and registers 1522.

The multiprocessor 1502 according to one or more embodiments described above may include trap handler 1518 that operates, for example, in accordance with process 1300 described above. Multiprocessor 1502 may also include CP_WAIT_FLAG 1516 which a flag/bit is set upon execution of the CP_WAIT instruction or the CP_MACRO-FUSE instruction and is cleared when the multiprocessor is notified that the requested coprocessor connection is established. The multiprocessor maybe configured to check the CP_WAIT_FLAG 1516 before scheduling threads in order to ensure that a particular thread or thread group proceeds to the coprocessor operations only if the required coprocessors are available, and to ensure that a given thread or thread group has no more than one pending connection open at any given time.

The multiprocessor may also include a MACROFUSE counter 1514 which may be used as a counter for use in determining when to re-enable interrupts after they are disabled by the CP_MACRO_FUSE instruction. For example, when the CP_MACRO_FUSE instruction in a multi-instruction sequence specifies that n instructions are to be executed without allowing preemption, counter 1514 may be set as a countdown timer with a value of n. The counter is then decremented for each instruction issued until it reaches 0.

Shared memory 1506 may include memory locations that are used to exchange data between multiprocessor 1502 and coprocessor 1504. In some embodiments, the coprocessor may not have write access to shared memory 1506. In some embodiments, shared memory 1506 may include one or more levels of cache memory to which the coprocessor has only read access.

In some embodiments, shared memory 1506 may have raw coprocessor state 1530 and a scoreboard 1532. The raw coprocessor state 1530, in some embodiments, may be in coprocessor local memory 1520. When raw coprocessor state 1530 is in the coprocessor local memory 1520, the multiprocessor may still access it as needed by, for example, a series of CP_READs issued by a trap handler executing on the multiprocessor. The raw coprocessor state 1530 comprises the state of the coprocessor memory and registers at the time of a preemption of the thread or thread group executing on the multiprocessor.

The scoreboard 1532 is used to notify the multiprocessor when a target operation, which may execute asynchronously, completes its result output and the results are written to the multiprocessor's registers or memory.

As described above, request data is passed via registers and/or shared memory to the coprocessor with the command for triggering the coprocessor target operation for a thread or group of threads. The coprocessor carries out the target operation and eventually writes the results back to a shared memory or set of registers. The multiprocessor then writes the results data from the locations written by the coprocessor to multiprocessor memory and/or registers while decrementing a scoreboard to indicate that the results are ready to be consumed. In some example embodiments where the results are not written to a shared memory, the coprocessor may send one or more packets containing the results across an interface to the multiprocessor, where they are written to registers in the multiprocessor. The last packet servicing a given CP_READ may include a field indicating that a scoreboard should be released. The last packet may also include the index for the scoreboard entry because that index may be provided by the multiprocessor to the coprocessor as part of the given CP_READ.

Example Image Generation Pipeline Including Ray Tracing

Figure 16:
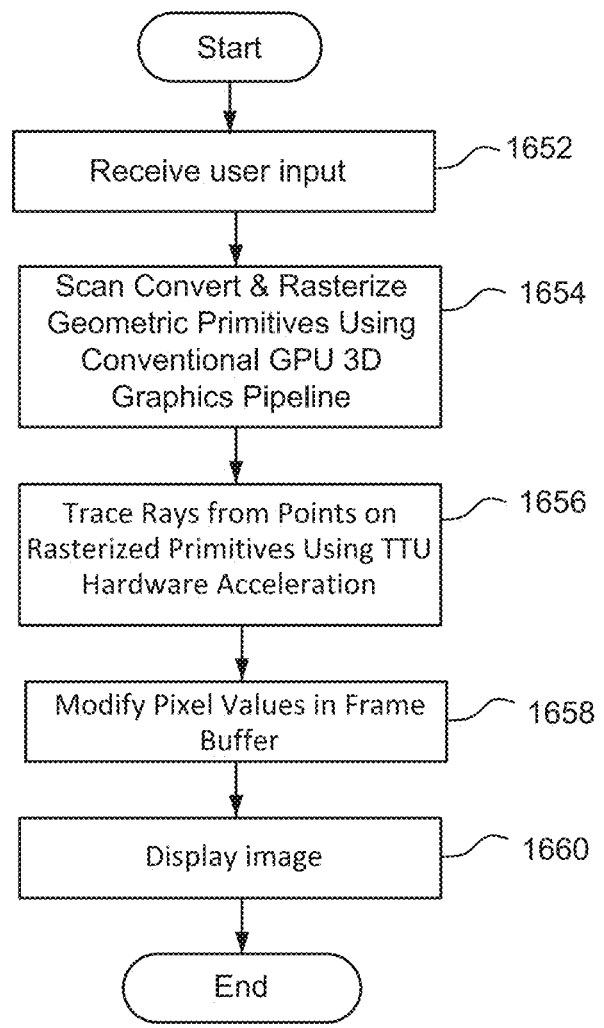
FIG. 16 illustrates an example flowchart for generating an image.

The ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 1). FIG. 16 illustrates an example flowchart for processing primitives to provide image pixel values of an image, in accordance with an embodiment.

As FIG. 16 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art and discussed below in connection with FIG. 20. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described in relation to FIGS. 17-19, 21, 22, 23 and/or 24, and ray tracing may be implemented by the SM's 132 using the TTU architecture described in relation to FIG. 9, to add further visualization features (e.g., specular reflection, shadows, etc.). FIG. 16 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

Example Parallel Processing Architecture Including Ray Tracing

The TTU structure described above can be implemented in, or in association with, an example non-limiting parallel processing system architecture such as that described below in relation to FIGS. 17-24. Such a parallel processing architecture can be used for example to implement the GPU 130 of FIG. 1.

Example Parallel Processing Architecture

Figure 17:
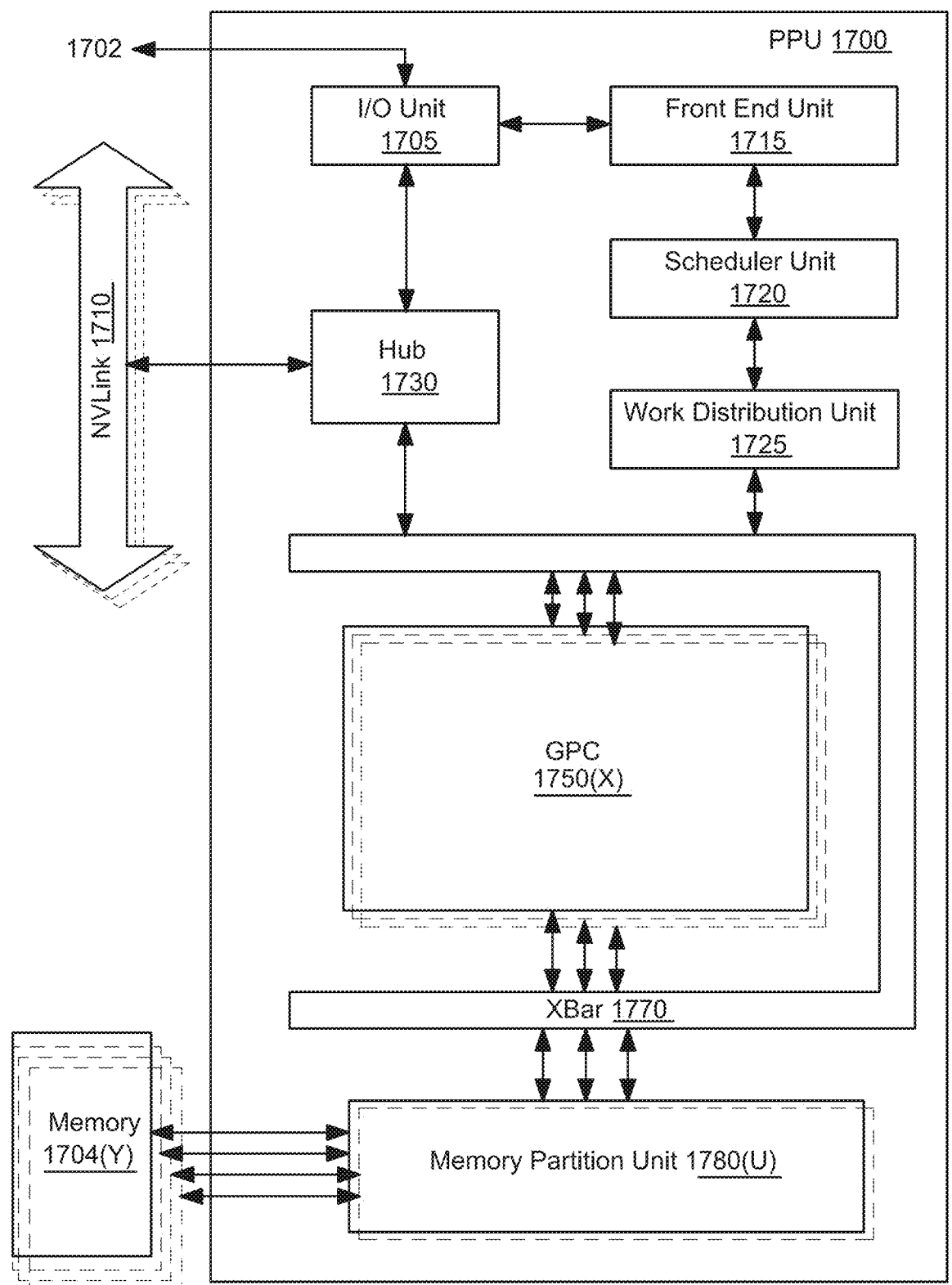
FIG. 17 illustrates an example parallel processing unit (PPU).

FIG. 17 illustrates an example non-limiting parallel processing unit (PPU) 1700. In an embodiment, the PPU 1700 is a multi-threaded processor that is implemented on one or more integrated circuit devices. The PPU 1700 is a latency hiding architecture designed to process many threads in parallel. A thread (i.e., a thread of execution) is an instantiation of a set of instructions configured to be executed by the PPU 1700. In an embodiment, the PPU 1700 is configured to implement a graphics rendering pipeline for processing three-dimensional (3D) graphics data in order to generate two-dimensional (2D) image data for display on a display device such as a liquid crystal display (LCD) device, an organic light emitting diode (OLED) device, a transparent light emitting diode (TOLED) device, a field emission display (FEDs), a field sequential display, a projection display, a head mounted display or any other desired display. In other embodiments, the PPU 1700 may be utilized for performing general-purpose computations. While one exemplary parallel processor is provided herein for illustrative purposes, it should be noted that such processor is set forth for illustrative purposes only, and that any processor may be employed to supplement and/or substitute for the same.

For example, one or more PPUs 1700 may be configured to accelerate thousands of High Performance Computing (HPC), data center, and machine learning applications. The PPU 1700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

The PPU 1700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1700 is embodied on a single semiconductor substrate. In another embodiment, the PPU 1700 is included in a system-on-a-chip (SoC) along with one or more other devices such as additional PPUs 1700, the memory 1704, a reduced instruction set computer (RISC) CPU, a memory management unit (MMU), a digital-to-analog converter (DAC), and the like.

In an embodiment, the PPU 1700 may be included on a graphics card that includes one or more memory devices 1704. The graphics card may be configured to interface with a PCIe slot on a motherboard of a desktop computer. In yet another embodiment, the PPU 1700 may be an integrated graphics processing unit (iGPU) or parallel processor included in the chipset of the motherboard.

As shown in FIG. 17, the PPU 1700 includes an Input/Output (I/O) unit 1705, a front end unit 1715, a scheduler unit 1720, a work distribution unit 1725, a hub 1730, a crossbar (Xbar) 1770, one or more general processing clusters (GPCs) 1750, and one or more partition units 1780. The PPU 1700 may be connected to a host processor or other PPUs 1700 via one or more high-speed NVLink 1710 interconnect. The PPU 1700 may be connected to a host processor or other peripheral devices via an interconnect 1702. The PPU 1700 may also be connected to a local memory comprising a number of memory devices 1704. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1710 interconnect enables systems to scale and include one or more PPUs 1700 combined with one or more CPUs, supports cache coherence between the PPUs 1700 and CPUs, and CPU mastering. Data and/or commands may be transmitted by the NVLink 1710 through the hub 1730 to/from other units of the PPU 1700 such as one or more copy engines, a video encoder, a video decoder, a power management unit, etc. (not explicitly shown). The NVLink 1710 is described in more detail in conjunction with FIG. 23.

The I/O unit 1705 is configured to transmit and receive communications (i.e., commands, data, etc.) from a host processor (not shown) over the interconnect 1702. The I/O unit 1705 may communicate with the host processor directly via the interconnect 1702 or through one or more intermediate devices such as a memory bridge. In an embodiment, the I/O unit 1705 may communicate with one or more other processors, such as one or more of the PPUs 1700 via the interconnect 1702. In an embodiment, the I/O unit 1705 implements a Peripheral Component Interconnect Express (PCIe) interface for communications over a PCIe bus and the interconnect 1702 is a PCIe bus. In alternative embodiments, the I/O unit 1705 may implement other types of well-known interfaces for communicating with external devices.

The I/O unit 1705 decodes packets received via the interconnect 1702. In an embodiment, the packets represent commands configured to cause the PPU 1700 to perform various operations. The I/O unit 1705 transmits the decoded commands to various other units of the PPU 1700 as the commands may specify. For example, some commands may be transmitted to the front end unit 1715. Other commands may be transmitted to the hub 1730 or other units of the PPU 1700 such as one or more copy engines, a video encoder, a video decoder, a power management unit, etc. (not explicitly shown). In other words, the I/O unit 1705 is configured to route communications between and among the various logical units of the PPU 1700.

In an embodiment, a program executed by the host processor encodes a command stream in a buffer that provides workloads to the PPU 1700 for processing. A workload may comprise several instructions and data to be processed by those instructions. The buffer is a region in a memory that is accessible (i.e., read/write) by both the host processor and the PPU 1700. For example, the I/O unit 1705 may be configured to access the buffer in a system memory connected to the interconnect 1702 via memory requests transmitted over the interconnect 1702. In an embodiment, the host processor writes the command stream to the buffer and then transmits a pointer to the start of the command stream to the PPU 1700. The front end unit 1715 receives pointers to one or more command streams. The front end unit 1715 manages the one or more streams, reading commands from the streams and forwarding commands to the various units of the PPU 1700.

The front end unit 1715 is coupled to a scheduler unit 1720 that configures the various GPCs 1750 to process tasks defined by the one or more streams. The scheduler unit 1720 is configured to track state information related to the various tasks managed by the scheduler unit 1720. The state may indicate which GPC 1750 a task is assigned to, whether the task is active or inactive, a priority level associated with the task, and so forth. The scheduler unit 1720 manages the execution of a plurality of tasks on the one or more GPCs 1750.

The scheduler unit 1720 is coupled to a work distribution unit 1725 that is configured to dispatch tasks for execution on the GPCs 1750. The work distribution unit 1725 may track a number of scheduled tasks received from the scheduler unit 1720. In an embodiment, the work distribution unit 1725 manages a pending task pool and an active task pool for each of the GPCs 1750. The pending task pool may comprise a number of slots (e.g., 32 slots) that contain tasks assigned to be processed by a particular GPC 1750. The active task pool may comprise a number of slots (e.g., 4 slots) for tasks that are actively being processed by the GPCs 1750. As a GPC 1750 finishes the execution of a task, that task is evicted from the active task pool for the GPC 1750 and one of the other tasks from the pending task pool is selected and scheduled for execution on the GPC 1750. If an active task has been idle on the GPC 1750, such as while waiting for a data dependency to be resolved, then the active task may be evicted from the GPC 1750 and returned to the pending task pool while another task in the pending task pool is selected and scheduled for execution on the GPC 1750.

The work distribution unit 1725 communicates with the one or more GPCs 1750 via XBar 1770. The XBar 1770 is an interconnect network that couples many of the units of the PPU 1700 to other units of the PPU 1700. For example, the XBar 1770 may be configured to couple the work distribution unit 1725 to a particular GPC 1750. Although not shown explicitly, one or more other units of the PPU 1700 may also be connected to the XBar 1770 via the hub 1730.

The tasks are managed by the scheduler unit 1720 and dispatched to a GPC 1750 by the work distribution unit 1725. The GPC 1750 is configured to process the task and generate results. The results may be consumed by other tasks within the GPC 1750, routed to a different GPC 1750 via the XBar 1770, or stored in the memory 1704. The results can be written to the memory 1704 via the partition units 1780, which implement a memory interface for reading and writing data to/from the memory 1704. The results can be transmitted to another PPU 1704 or CPU via the NVLink 1710. In an embodiment, the PPU 1700 includes a number U of partition units 1780 that is equal to the number of separate and distinct memory devices 1704 coupled to the PPU 1700. A partition unit 1780 will be described in more detail below in conjunction with FIG. 18.

In an embodiment, a host processor (e.g., processor 120 of FIG. 1) executes a driver kernel that implements an application programming interface (API) that enables one or more applications executing on the host processor to schedule operations for execution on the PPU 1700. In an embodiment, multiple compute applications are simultaneously executed by the PPU 1700 and the PPU 1700 provides isolation, quality of service (QoS), and independent address spaces for the multiple compute applications. An application may generate instructions (i.e., API calls) that cause the driver kernel to generate one or more tasks for execution by the PPU 1700. The driver kernel outputs tasks to one or more streams being processed by the PPU 1700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 21.

Example Memory Partition Unit

The MMU 1890 provides an interface between the GPC 1750 and the partition unit 1780. The MMU 1890 may provide translation of virtual addresses into physical addresses, memory protection, and arbitration of memory requests. In an embodiment, the MMU 1890 provides one or more translation lookaside buffers (TLBs) for performing translation of virtual addresses into physical addresses in the memory 1704.

Figure 18:
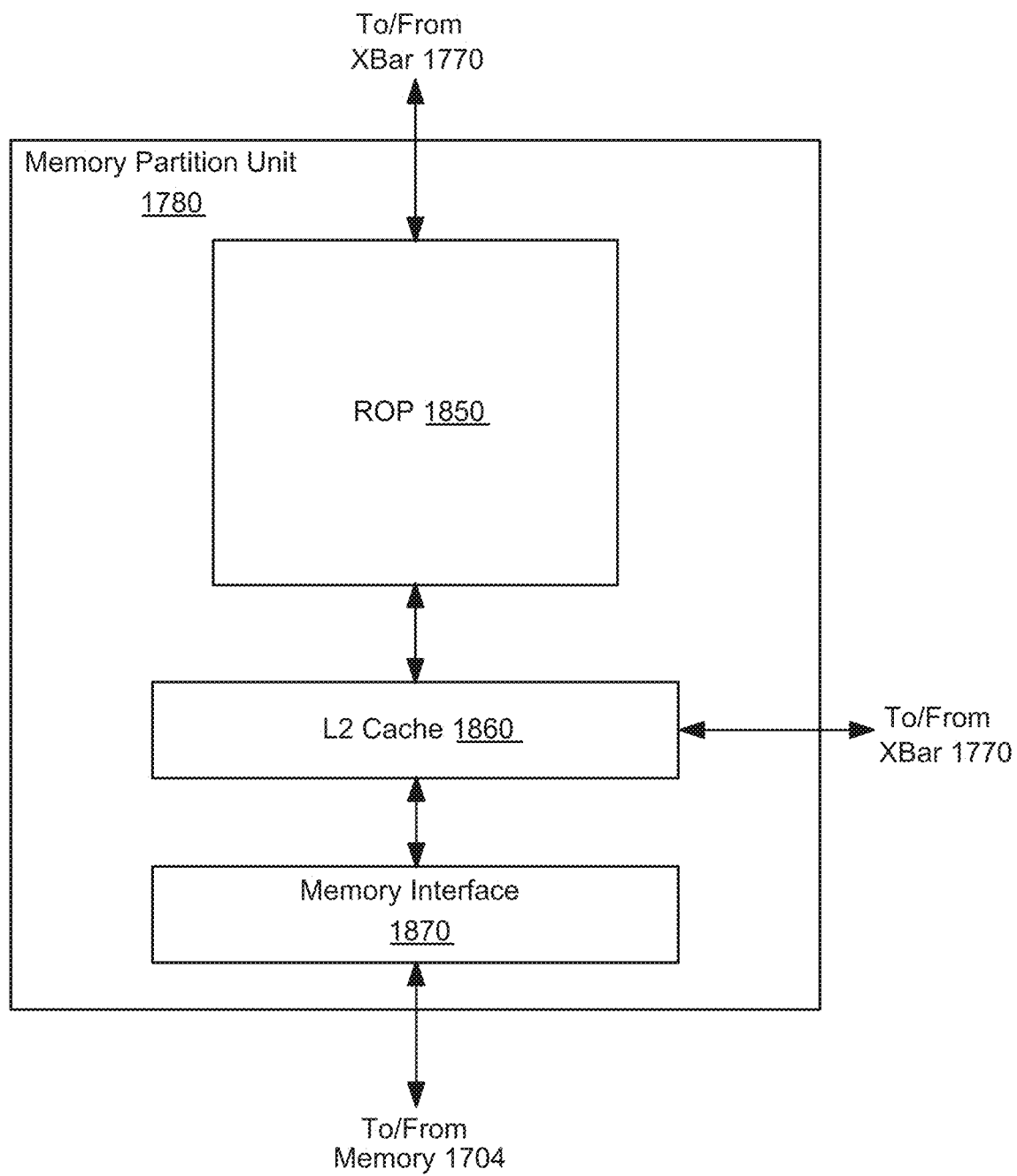
FIG. 18 illustrates an example memory partition unit.

FIG. 18 illustrates a memory partition unit 1780 of the PPU 1700 of FIG. 17, in accordance with an embodiment. As shown in FIG. 18, the memory partition unit 1780 includes a Raster Operations (ROP) unit 1850, a level two (L2) cache 1860, and a memory interface 1870. The memory interface 1870 is coupled to the memory 1704. Memory interface 1870 may implement 32, 64, 128, 1024-bit data buses, or the like, for high-speed data transfer. In an embodiment, the PPU 1700 incorporates U memory interfaces 1870, one memory interface 1870 per pair of partition units 1780, where each pair of partition units 1780 is connected to a corresponding memory device 1704. For example, PPU 1700 may be connected to up to Y memory devices 1704, such as high bandwidth memory stacks or graphics double-data-rate, version 5, synchronous dynamic random access memory, or other types of persistent storage.

In an embodiment, the memory interface 1870 implements an HBM2 memory interface and Y equals half U. In an embodiment, the HBM2 memory stacks are located on the same physical package as the PPU 1700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1700 process very large datasets and/or run applications for extended periods.

In an embodiment, the PPU 1700 implements a multi-level memory hierarchy. In an embodiment, the memory partition unit 1780 supports a unified memory to provide a single unified virtual address space for CPU and PPU 1700 memory, enabling data sharing between virtual memory systems. In an embodiment the frequency of accesses by a PPU 1700 to memory located on other processors is traced to ensure that memory pages are moved to the physical memory of the PPU 1700 that is accessing the pages more frequently. In an embodiment, the NVLink 1710 supports address translation services allowing the PPU 1700 to directly access a CPU's page tables and providing full access to CPU memory by the PPU 1700.

In an embodiment, copy engines transfer data between multiple PPUs 1700 or between PPUs 1700 and CPUs. The copy engines can generate page faults for addresses that are not mapped into the page tables. The memory partition unit 1780 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1704 or other system memory may be fetched by the memory partition unit 1780 and stored in the L2 cache 1860, which is located on-chip and is shared between the various GPCs 1750. As shown, each memory partition unit 1780 includes a portion of the L2 cache 1860 associated with a corresponding memory device 1704. Lower level caches may then be implemented in various units within the GPCs 1750. For example, each of the SMs 1840 may implement a level one (L1) cache. The L1 cache is private memory that is dedicated to a particular SM 1840. Data from the L2 cache 1860 may be fetched and stored in each of the L1 caches for processing in the functional units of the SMs 1840. The L2 cache 1860 is coupled to the memory interface 1870 and the XBar 1770.

The ROP unit 1850 performs graphics raster operations related to pixel color, such as color compression, pixel blending, and the like. The ROP unit 1850 also implements depth testing in conjunction with the raster engine 1825, receiving a depth for a sample location associated with a pixel fragment from the culling engine of the raster engine 1825. The depth is tested against a corresponding depth in a depth buffer for a sample location associated with the fragment. If the fragment passes the depth test for the sample location, then the ROP unit 1850 updates the depth buffer and transmits a result of the depth test to the raster engine 1825. It will be appreciated that the number of partition units 1780 may be different than the number of GPCs 1750 and, therefore, each ROP unit 1850 may be coupled to each of the GPCs 1750. The ROP unit 1850 tracks packets received from the different GPCs 1750 and determines which GPC 1750 that a result generated by the ROP unit 1850 is routed to through the Xbar 1770. Although the ROP unit 1850 is included within the memory partition unit 1780 in FIG. 18, in other embodiment, the ROP unit 1850 may be outside of the memory partition unit 1780. For example, the ROP unit 1850 may reside in the GPC 1750 or another unit.

Example General Processing Clusters

Figure 19:
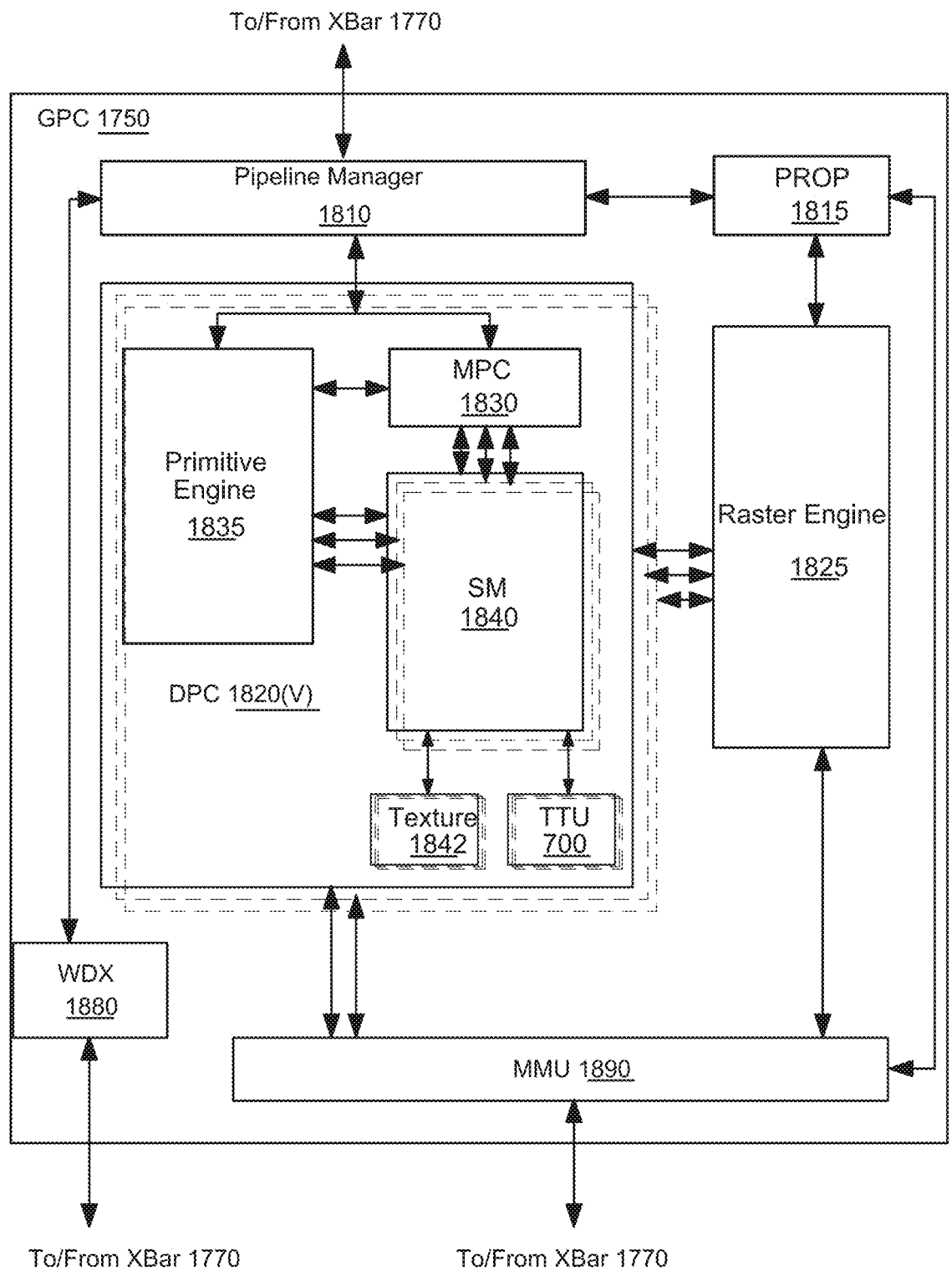
FIG. 19 illustrates an example general processing cluster (GPC) within the parallel processing unit of FIG. 17.

FIG. 19 illustrates a GPC 1750 of the PPU 1700 of FIG. 17, in accordance with an embodiment. As shown in FIG. 19, each GPC 1750 includes a number of hardware units for processing tasks. In an embodiment, each GPC 1750 includes a pipeline manager 1810, a pre-raster operations unit (PROP) 1815, a raster engine 1825, a work distribution crossbar (WDX) 1880, a memory management unit (MMU) 1890, and one or more Data Processing Clusters (DPCs) 1820. It will be appreciated that the GPC 1750 of FIG. 19 may include other hardware units in lieu of or in addition to the units shown in FIG. 19.

In an embodiment, the operation of the GPC 1750 is controlled by the pipeline manager 1810. The pipeline manager 1810 manages the configuration of the one or more DPCs 1820 for processing tasks allocated to the GPC 1750. In an embodiment, the pipeline manager 1810 may configure at least one of the one or more DPCs 1820 to implement at least a portion of a graphics rendering pipeline.

Each DPC 1820 included in the GPC 1750 includes an M-Pipe Controller (MPC) 1830, a primitive engine 1835, one or more SMs 1840, one or more Texture Units 1842, and one or more TTUs 700. The SM 1840 may be structured similarly to SM 132 described above. The MPC 1830 controls the operation of the DPC 1820, routing packets received from the pipeline manager 1810 to the appropriate units in the DPC 1820. For example, packets associated with a vertex may be routed to the primitive engine 1835, which is configured to fetch vertex attributes associated with the vertex from the memory 1704. In contrast, packets associated with a shader program may be transmitted to the SM 1840.

When configured for general purpose parallel computation, a simpler configuration can be used compared with graphics processing. Specifically, the fixed function graphics processing units shown in FIG. 17, are bypassed, creating a much simpler programming model. In the general purpose parallel computation configuration, the work distribution unit 1725 assigns and distributes blocks of threads directly to the DPCs 1820. The threads in a block execute the same program, using a unique thread ID in the calculation to ensure each thread generates unique results, using the SM 1840 to execute the program and perform calculations, shared memory/L1 cache 1970 to communicate between threads, and the LSU 1954 to read and write global memory through the shared memory/L1 cache 1970 and the memory partition unit 1780. When configured for general purpose parallel computation, the SM 1840 can also write commands that the scheduler unit 1720 can use to launch new work on the DPCs 1820. The TTU 700 can be used to accelerate spatial queries in the context of general purpose computation.

Graphics Rendering Pipeline

A DPC 1820 may be configured to execute a vertex shader program on the programmable streaming multiprocessor (SM) 1840 which may accelerate certain shading operations with TTU 700. The pipeline manager 1810 may also be configured to route packets received from the work distribution unit 1725 to the appropriate logical units within the GPC 1750. For example, some packets may be routed to fixed function hardware units in the PROP 1815 and/or raster engine 1825 while other packets may be routed to the DPCs 1820 for processing by the primitive engine 1835 or the SM 1840. In an embodiment, the pipeline manager 1810 may configure at least one of the one or more DPCs 1820 to implement a neural network model and/or a computing pipeline.

The PROP unit 1815 is configured to route data generated by the raster engine 1825 and the DPCs 1820 to a Raster Operations (ROP) unit, described in more detail in conjunction with FIG. 18. The PROP unit 1815 may also be configured to perform optimizations for color blending, organize pixel data, perform address translations, and the like.

The raster engine 1825 includes a number of fixed function hardware units configured to perform various raster operations. In an embodiment, the raster engine 1825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1825 comprises fragments to be processed, for example, by a fragment shader implemented within a DPC 1820

In more detail, the PPU 1700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1700 can be configured to process the graphics primitives to generate a frame buffer (i.e., pixel data for each of the pixels of the display) using for example TTU 700 as a hardware acceleration resource.

An application writes model data for a scene (i.e., a collection of vertices and attributes) to a memory such as a system memory or memory 1704. The model data defines each of the objects that may be visible on a display. The model data may also define one or more BVH's as described above. The application then makes an API call to the driver kernel that requests the model data to be rendered and displayed. The driver kernel reads the model data and writes commands to the one or more streams to perform operations to process the model data. The commands may reference different shader programs to be implemented on the SMs 1840 of the PPU 1700 including one or more of a vertex shader, hull shader, domain shader, geometry shader, a pixel shader, a ray generation shader, a ray intersection shader, a ray hit shader, and a ray miss shader (these correspond to the shaders defined by the DirectX Raytracing (DXR) API, ignoring any distinction between "closest-hit" and "any-hit" shaders; see https://devblogs.nvidia.com/introduction-nvidia-rtx-diretx-ray-tracing/). For example, one or more of the SMs 1840 may be configured to execute a vertex shader program that processes a number of vertices defined by the model data. In an embodiment, the different SMs 1840 may be configured to execute different shader programs concurrently. For example, a first subset of SMs 1840 may be configured to execute a vertex shader program while a second subset of SMs 1840 may be configured to execute a pixel shader program. The first subset of SMs 1840 processes vertex data to produce processed vertex data and writes the processed vertex data to the L2 cache 1860 and/or the memory 1704 (see FIG. 18). After the processed vertex data is rasterized (i.e., transformed from three-dimensional data into two-dimensional data in screen space) to produce fragment data, the second subset of SMs 1840 executes a pixel shader to produce processed fragment data, which is then blended with other processed fragment data and written to the frame buffer in memory 1704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 20:
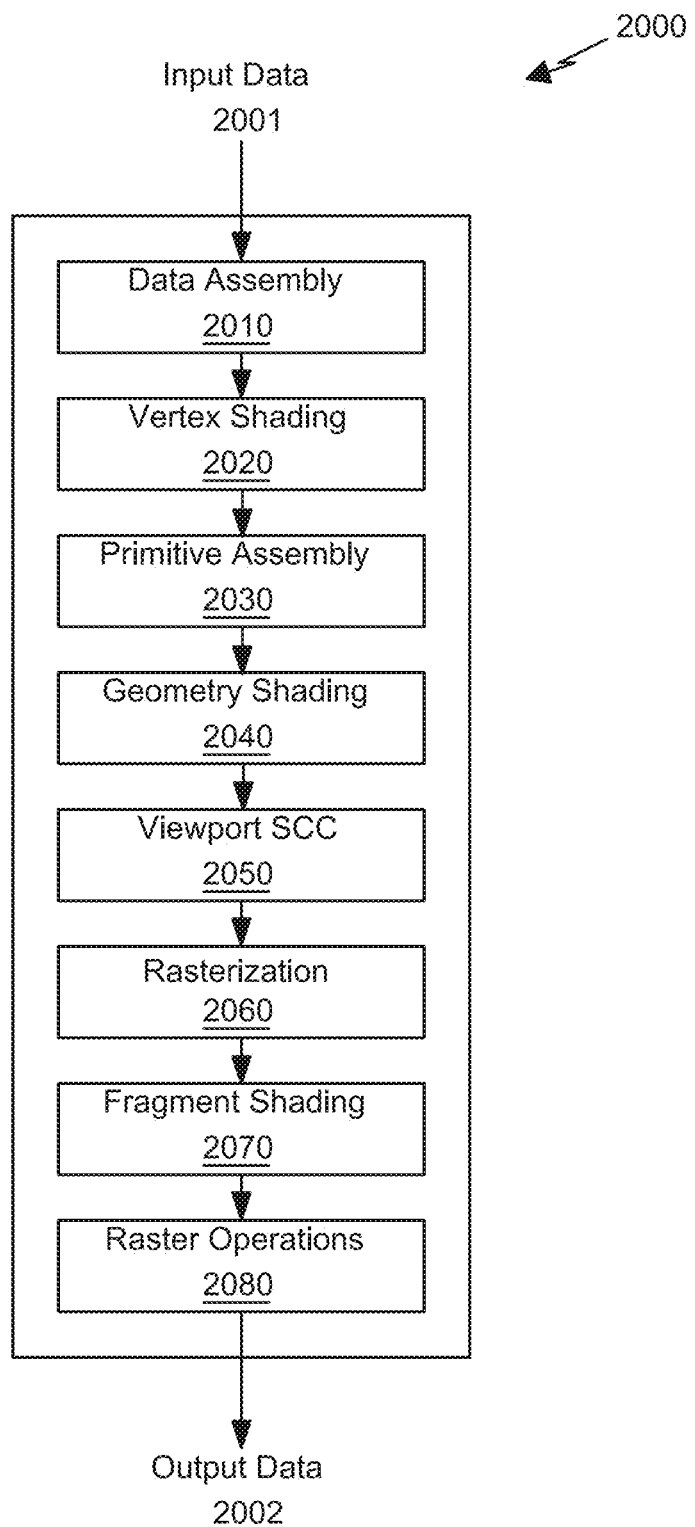
FIG. 20 is a conceptual diagram of a graphics processing pipeline implemented by the GPC of FIG. 19.

FIG. 20 is a conceptual diagram of a graphics processing pipeline 2000 implemented by the PPU 1700 of FIG. 17. The graphics processing pipeline 2000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2000 receives input data 2001 that is transmitted from one stage to the next stage of the graphics processing pipeline 2000 to generate output data 2002. In an embodiment, the graphics processing pipeline 2000 may represent a graphics processing pipeline defined by the OpenGL® API. As an option, the graphics processing pipeline 2000 may be implemented in the context of the functionality and architecture of the previous Figures and/or any subsequent Figure(s). As discussed above with reference to FIG. 16, the ray tracing may be used to improve the image quality generated by rasterization of geometric primitives. In some embodiments, ray tracing operations and TTU structure disclosed in this application may be applied to one or more states of the graphics processing pipeline 2000 to improve the subjective image quality.

As shown in FIG. 20, the graphics processing pipeline 2000 comprises a pipeline architecture that includes a number of stages. The stages include, but are not limited to, a data assembly stage 2010, a vertex shading stage 2020, a primitive assembly stage 2030, a geometry shading stage 2040, a viewport scale, cull, and clip (VSCC) stage 2050, a rasterization stage 2060, a fragment shading stage 2070, and a raster operations stage 2080. In an embodiment, the input data 2001 comprises commands that configure the processing units to implement the stages of the graphics processing pipeline 2000 and geometric primitives (e.g., points, lines, triangles, quads, triangle strips or fans, etc.) to be processed by the stages. The output data 2002 may comprise pixel data (i.e., color data) that is copied into a frame buffer or other type of surface data structure in a memory.

The data assembly stage 2010 receives the input data 2001 that specifies vertex data for high-order surfaces, primitives, or the like. The data assembly stage 2010 collects the vertex data in a temporary storage or queue, such as by receiving a command from the host processor that includes a pointer to a buffer in memory and reading the vertex data from the buffer. The vertex data is then transmitted to the vertex shading stage 2020 for processing.

The vertex shading stage 2020 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 2020 may manipulate individual vertex attributes such as position, color, texture coordinates, and the like. In other words, the vertex shading stage 2020 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 2020 generates transformed vertex data that is transmitted to the primitive assembly stage 2030.

The primitive assembly stage 2030 collects vertices output by the vertex shading stage 2020 and groups the vertices into geometric primitives for processing by the geometry shading stage 2040. For example, the primitive assembly stage 2030 may be configured to group every three consecutive vertices as a geometric primitive (i.e., a triangle) for transmission to the geometry shading stage 2040. In some embodiments, specific vertices may be reused for consecutive geometric primitives (e.g., two consecutive triangles in a triangle strip may share two vertices). The primitive assembly stage 2030 transmits geometric primitives (i.e., a collection of associated vertices) to the geometry shading stage 2040.

The geometry shading stage 2040 processes geometric primitives by performing a set of operations (i.e., a geometry shader or program) on the geometric primitives. Tessellation operations may generate one or more geometric primitives from each geometric primitive. In other words, the geometry shading stage 2040 may subdivide each geometric primitive into a finer mesh of two or more geometric primitives for processing by the rest of the graphics processing pipeline 2000. The geometry shading stage 2040 transmits geometric primitives to the viewport SCC stage 2050.

In an embodiment, the graphics processing pipeline 2000 may operate within a streaming multiprocessor and the vertex shading stage 2020, the primitive assembly stage 2030, the geometry shading stage 2040, the fragment shading stage 2070, a ray tracing shader, and/or hardware/software associated therewith, may sequentially perform processing operations. Once the sequential processing operations are complete, in an embodiment, the viewport SCC stage 2050 may utilize the data. In an embodiment, primitive data processed by one or more of the stages in the graphics processing pipeline 2000 may be written to a cache (e.g. L1 cache, a vertex cache, etc.). In this case, in an embodiment, the viewport SCC stage 2050 may access the data in the cache. In an embodiment, the viewport SCC stage 2050 and the rasterization stage 2060 are implemented as fixed function circuitry.

The viewport SCC stage 2050 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 2060.

The rasterization stage 2060 converts the 3D geometric primitives into 2D fragments (e.g. capable of being utilized for display, etc.). The rasterization stage 2060 may be configured to utilize the vertices of the geometric primitives to setup a set of plane equations from which various attributes can be interpolated. The rasterization stage 2060 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 2060 generates fragment data (i.e., interpolated vertex attributes associated with a particular sample location for each covered pixel) that are transmitted to the fragment shading stage 2070.

The fragment shading stage 2070 processes fragment data by performing a set of operations (i.e., a fragment shader or a program) on each of the fragments. The fragment shading stage 2070 may generate pixel data (i.e., color values) for the fragment such as by performing lighting operations or sampling texture maps using interpolated texture coordinates for the fragment. The fragment shading stage 2070 generates pixel data that is transmitted to the raster operations stage 2080.

The raster operations stage 2080 may perform various operations on the pixel data such as performing alpha tests, stencil tests, and blending the pixel data with other pixel data corresponding to other fragments associated with the pixel. When the raster operations stage 2080 has finished processing the pixel data (i.e., the output data 2002), the pixel data may be written to a render target such as a frame buffer, a color buffer, or the like.

It will be appreciated that one or more additional stages may be included in the graphics processing pipeline 2000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 2040). Other types of graphics processing pipelines are contemplated as being within the scope of the present disclosure. Furthermore, any of the stages of the graphics processing pipeline 2000 may be implemented by one or more dedicated hardware units within a graphics processor such as PPU 200. Other stages of the graphics processing pipeline 2000 may be implemented by programmable hardware units such as the SM 1840 of the PPU 1700.

The graphics processing pipeline 2000 may be implemented via an application executed by a host processor, such as a CPU 120. In an embodiment, a device driver may implement an application programming interface (API) that defines various functions that can be utilized by an application in order to generate graphical data for display. The device driver is a software program that includes a plurality of instructions that control the operation of the PPU 1700. The API provides an abstraction for a programmer that lets a programmer utilize specialized graphics hardware, such as the PPU 1700, to generate the graphical data without requiring the programmer to utilize the specific instruction set for the PPU 1700. The application may include an API call that is routed to the device driver for the PPU 1700. The device driver interprets the API call and performs various operations to respond to the API call. In some instances, the device driver may perform operations by executing instructions on the CPU. In other instances, the device driver may perform operations, at least in part, by launching operations on the PPU 1700 utilizing an input/output interface between the CPU and the PPU 1700. In an embodiment, the device driver is configured to implement the graphics processing pipeline 2000 utilizing the hardware of the PPU 1700.

Various programs may be executed within the PPU 1700 in order to implement the various stages of the graphics processing pipeline 2000. For example, the device driver may launch a kernel on the PPU 1700 to perform the vertex shading stage 2020 on one SM 1840 (or multiple SMs 1840). The device driver (or the initial kernel executed by the PPU 1800) may also launch other kernels on the PPU 1800 to perform other stages of the graphics processing pipeline 2000, such as the geometry shading stage 2040 and the fragment shading stage 2070. In addition, some of the stages of the graphics processing pipeline 2000 may be implemented on fixed unit hardware such as a rasterizer or a data assembler implemented within the PPU 1800. It will be appreciated that results from one kernel may be processed by one or more intervening fixed function hardware units before being processed by a subsequent kernel on an SM 1840.

Example Streaming Multiprocessor

The SM 1840 comprises a programmable streaming processor that is configured to process tasks represented by a number of threads. Each SM 1840 is multi-threaded and configured to execute a plurality of threads (e.g., 32 threads comprising a warp) from a particular group of threads concurrently. In an embodiment, the SM 1840 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 1840 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Figure 21:
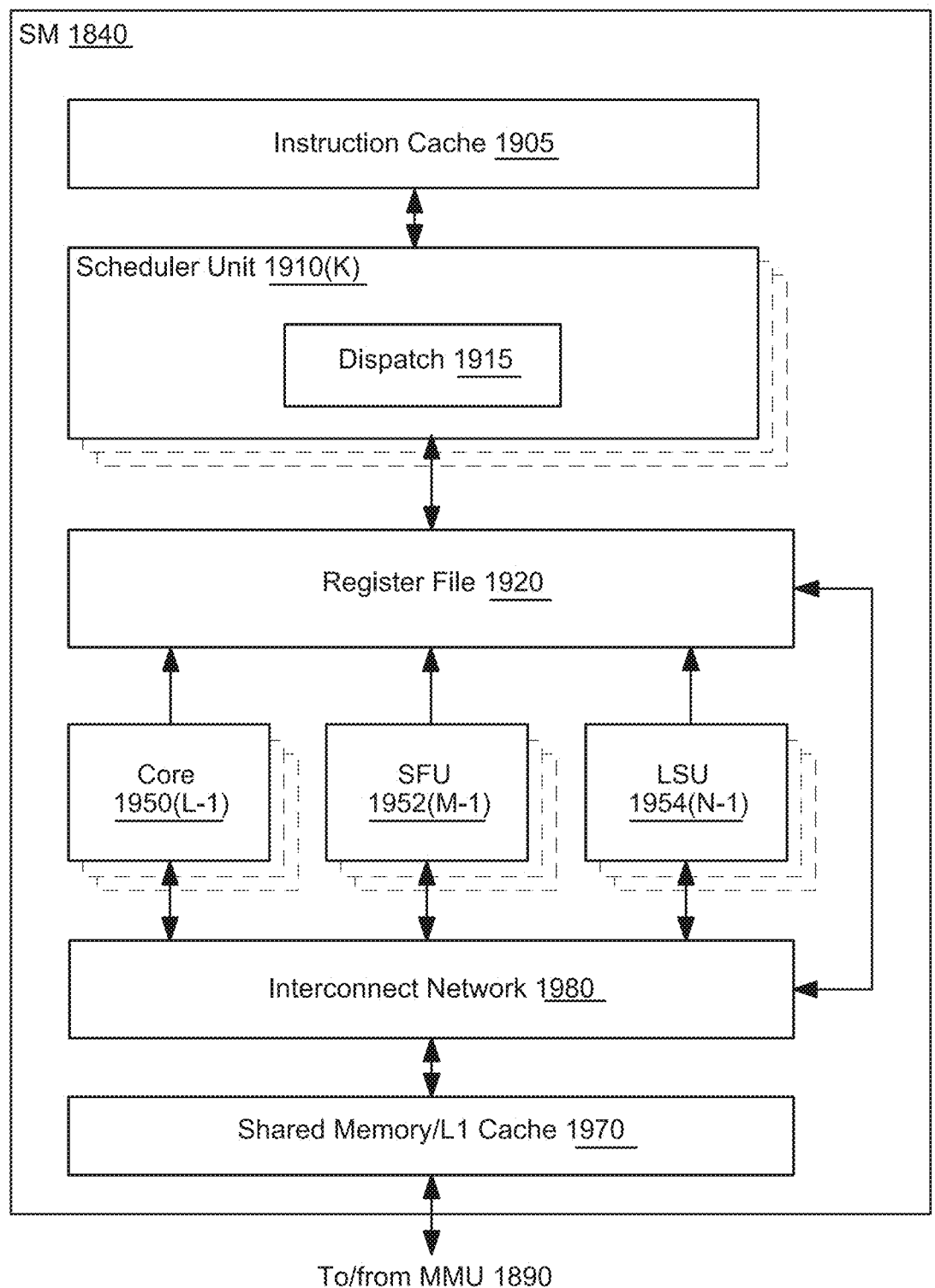
FIGS. 21 and 22 illustrate an example streaming multi-processor.

FIG. 21 illustrates the streaming multi-processor 1840 of FIG. 19, in accordance with an embodiment. As shown in FIG. 21, the SM 1840 includes an instruction cache 1905, one or more scheduler units 1910, a register file 1920, one or more processing cores 1950, one or more special function units (SFUs) 1952, one or more load/store units (LSUs) 1954, an interconnect network 1980, a shared memory/L1 cache 1970.

As described above, the work distribution unit 1725 dispatches tasks for execution on the GPCs 1750 of the PPU 1700. The tasks are allocated to a particular DPC 1820 within a GPC 1750 and, if the task is associated with a shader program, the task may be allocated to an SM 1840. The scheduler unit 1910 receives the tasks from the work distribution unit 1725 and manages instruction scheduling for one or more thread blocks assigned to the SM 1840. The scheduler unit 1910 schedules thread blocks for execution as warps of parallel threads, where each thread block is allocated at least one warp. In an embodiment, each warp executes 32 threads. The scheduler unit 1910 may manage a plurality of different thread blocks, allocating the warps to the different thread blocks and then dispatching instructions from the plurality of different cooperative groups to the various functional units (i.e., cores 1950, SFUs 1952, and LSUs 1954) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1915 is configured to transmit instructions to one or more of the functional units. In the embodiment, the scheduler unit 1910 includes two dispatch units 1915 that enable two different instructions from the same warp to be dispatched during each clock cycle. In alternative embodiments, each scheduler unit 1910 may include a single dispatch unit 1915 or additional dispatch units 1915.

Figure 22:
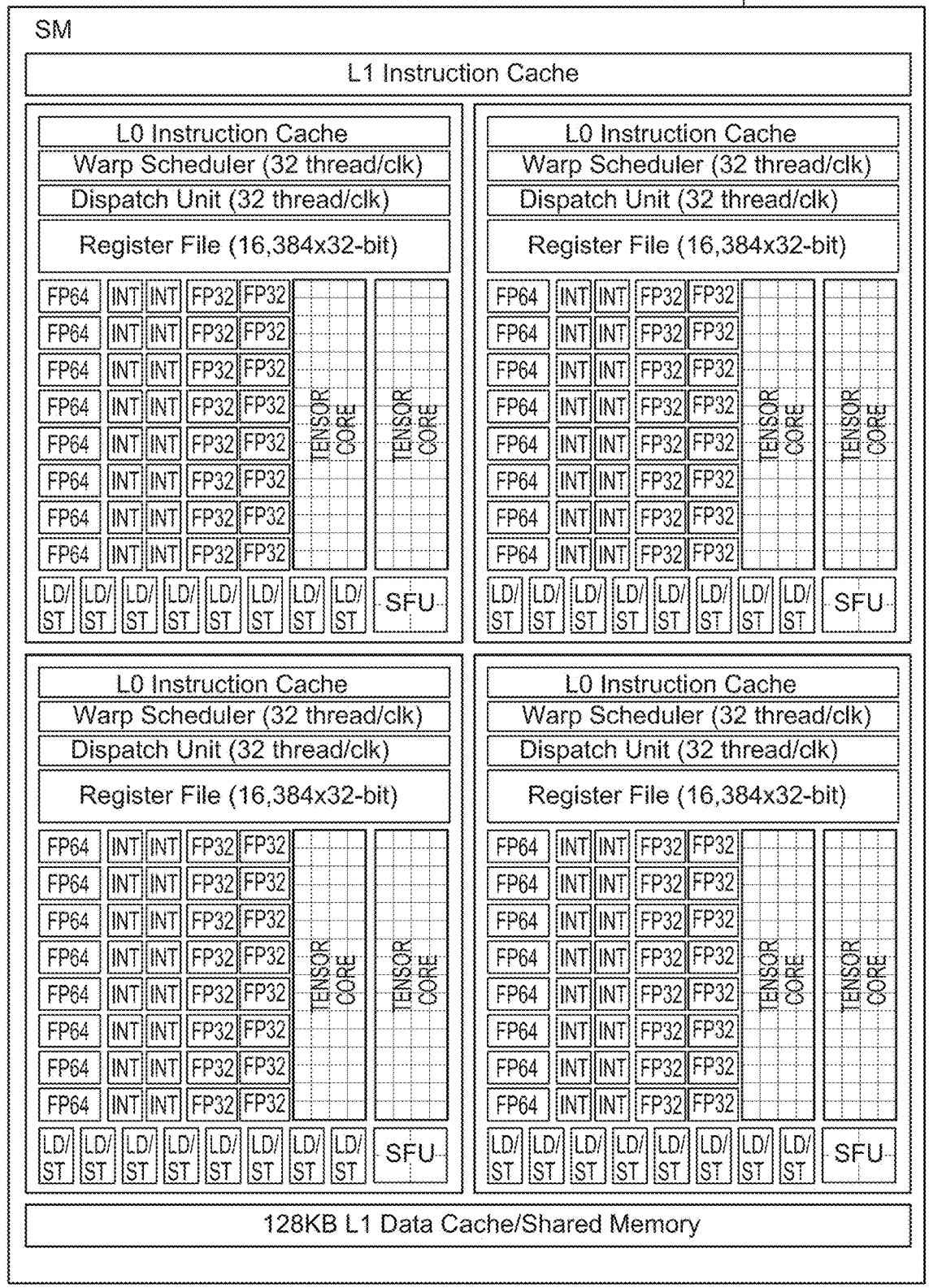

Each SM 1840 includes a register file 1920 that provides a set of registers for the functional units of the SM 1840. In an embodiment, the register file 1920 is divided between each of the functional units such that each functional unit is allocated a dedicated portion of the register file 1920. In another embodiment, the register file 1920 is divided between the different warps being executed by the SM 1840. The register file 1920 provides temporary storage for operands connected to the data paths of the functional units. FIG. 22 illustrates an example configuration of the registers files in the SM 1840.

Each SM 1840 comprises L processing cores 1950. In an embodiment, the SM 1840 includes a large number (e.g., 128, etc.) of distinct processing cores 1950. Each core 1950 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1950 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1950. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1840 also comprises M SFUs 1952 that perform special functions (e.g., attribute evaluation, reciprocal square root, and the like). In an embodiment, the SFUs 1952 may include a tree traversal unit configured to traverse a hierarchical tree data structure. In an embodiment, the SFUs 1952 may include texture unit configured to perform texture map filtering operations. In an embodiment, the texture units are configured to load texture maps (e.g., a 2D array of texels) from the memory 1704 and sample the texture maps to produce sampled texture values for use in shader programs executed by the SM 1840. In an embodiment, the texture maps are stored in the shared memory/L1 cache 1970. The texture units implement texture operations such as filtering operations using mip-maps (i.e., texture maps of varying levels of detail). In an embodiment, each SM 1740 includes two texture units.

Each SM 1840 also comprises N LSUs 1954 that implement load and store operations between the shared memory/L1 cache 1970 and the register file 1920. Each SM 1840 includes an interconnect network 1980 that connects each of the functional units to the register file 1920 and the LSU 1954 to the register file 1920, shared memory/L1 cache 1970. In an embodiment, the interconnect network 1980 is a crossbar that can be configured to connect any of the functional units to any of the registers in the register file 1920 and connect the LSUs 1954 to the register file and memory locations in shared memory/L1 cache 1970.

The shared memory/L1 cache 1970 is an array of on-chip memory that allows for data storage and communication between the SM 1840 and the primitive engine 1835 and between threads in the SM 1840. In an embodiment, the shared memory/L1 cache 1970 comprises 128 KB of storage capacity and is in the path from the SM 1840 to the partition unit 1780. The shared memory/L1 cache 1970 can be used to cache reads and writes. One or more of the shared memory/L1 cache 1970, L2 cache 1860, and memory 1704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1970 enables the shared memory/L1 cache 1970 to function as a high-throughput conduit for streaming data while simultaneously providing high-bandwidth and low-latency access to frequently reused data.

FIG. 22 illustrates one example architecture for the SM 1840. As illustrated in FIG. 19, the SM 1840 may be coupled to one or more Texture Unit 1842 and/or one or more TTUs 700. As a compromise between performance and area, one example non-limiting embodiment may include a single Texture Unit 1842 and/or a single TTU 700 per groups of SMs 1840 (e.g., See FIG. 19). The TTU 700 may communicate with the SMs 1840 via a TTU input/output block in memory input-output and with a L1 cache via a dedicated read interface. In one example embodiment, the TTU 700 only reads from the main memory and does not write to the main memory.

Example More Detailed TTU Architecture

As discussed above, the TTU 700 may be a coprocessor to the SM 1840. Like a texture processor, it is exposed via a set of SM instructions, accesses memory as a read-only client of the L1 cache, and returns results into the SM register file. Unlike some texture processors, the amount of data that may need to be passed into and out of the TTU 700 for a typical query makes it difficult in some embodiments to specify all the source and destination registers in a single instruction (and because most of this data is unique per-thread, there is no TTU analogue of texture headers and samplers). As a consequence, the TTU 700 in some embodiments is programmed via a multi-instruction sequence. This sequence can be conceptualized as a single "macro-instruction" in some implementations.

Also like a Texture Units 1842, the TTU 700 in some implementations may rely on certain read-only data structures in memory that are prepopulated by software. These include:

- One or more BVHs, where each BVH is for example a tree of axis-aligned bounding boxes, stored in a compressed format that greatly reduces memory traffic compared to an uncompressed representation. Each node in the BVH is stored as a complet structure, with size and alignment in some implementations matched to that of an L1 cache line. Child complets of a given parent are preferably stored contiguously in memory and child pointers are stored in compressed form.
- Zero or more instance nodes, which provide a way to connect a leaf of one BVH to the root of another. An instance node may be a data structure that is also aligned. This structure may contain a pointer to the sub-BVH, flags that affect back-face culling behavior in the sub-BVH, and a matrix that corresponds to the first three rows of an arbitrary transformation matrix (in homogeneous coordinates) from the coordinate system of the top-level BVH (commonly "world space") to that of the sub-BVH (commonly "object space"). The final row of the matrix in some embodiments is in some implementations implicitly (0, 0, 0, 1).
- Zero or more triangle or other primitive buffers, containing for example triangles stored either as a triplet of coordinates per vertex or in a lossless compressed format understood by the TTU 700. In addition, an alpha bit may be provided per triangle or other primitive, indicating triangles that require special handling by software to determine whether the triangle is actually intersected by a given ray. Triangle buffers can be organized into blocks. There may also be a per-triangle force-no-cull function bit. When set, that bit indicates that both sides of the triangle should be treated as front-facing or back-facing with respect to culling, i.e., the triangle should not be culled because the ray intersects the "back" instead of the "front". The simplest use case for this is a single triangle used to represent a leaf, where we can still see the leaf if the ray hits it on the back surface.

The TTU 700 in some embodiments is stateless, meaning that no architectural state is maintained in the TTU between queries. At the same time, it is often useful for software running on the SM 1840 to request continuation of a previous query, which implies that relevant state should be written to registers by the TTU 700 and then passed back to the TTU in registers (often in-place) to continue. This state may take the form of a traversal stack that tracks progress in the traversal of the BVH.

A small number of stack initializers may also be provided for beginning a new query of a given type, for example:

- Traversal starting from a complet
- Intersection of a ray with a range of triangles
- Intersection of a ray with a range of triangles, followed by traversal starting from a complet
- Vertex fetch from a triangle buffer for a given triangle
- Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 700 can return to the SM. Example node types are:

- A child complet (i.e., an internal node)

By default, the TTU 700 continues traversal by descending into child complets.

- A triangle range, corresponding to a contiguous set of triangles within a triangle buffer
  - (1) By default, triangle ranges encountered by a ray are handled natively by the TTU 700 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
  - (2) By default, intersected triangles with the alpha bit set are returned to SM 1840 even if traversal has not completed. The returned traversal stack contains the state required to continue traversal if software determines that the triangle was in fact transparent.
  - (3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
- An item range, consisting of an index (derived from a user-provided "item range base" stored in the complet) and a count of items.

By default, item ranges are returned to SM 1840 as an "ItemRange" hit type, consisting of for example an index, a count, and the t-value of the intersection with the leaf bounding box.

An instance node.

The TTU 700 in some embodiments can handle one level of instancing natively by transforming the ray into the coordinate system of the instance BVH. Additional levels of instancing (or every other level of instancing, depending on strategy) may be handled in software. The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 700.

Additional mode flags may be provided for control handling of alpha triangles.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased data transmission between the processing devices.

Figure 23:
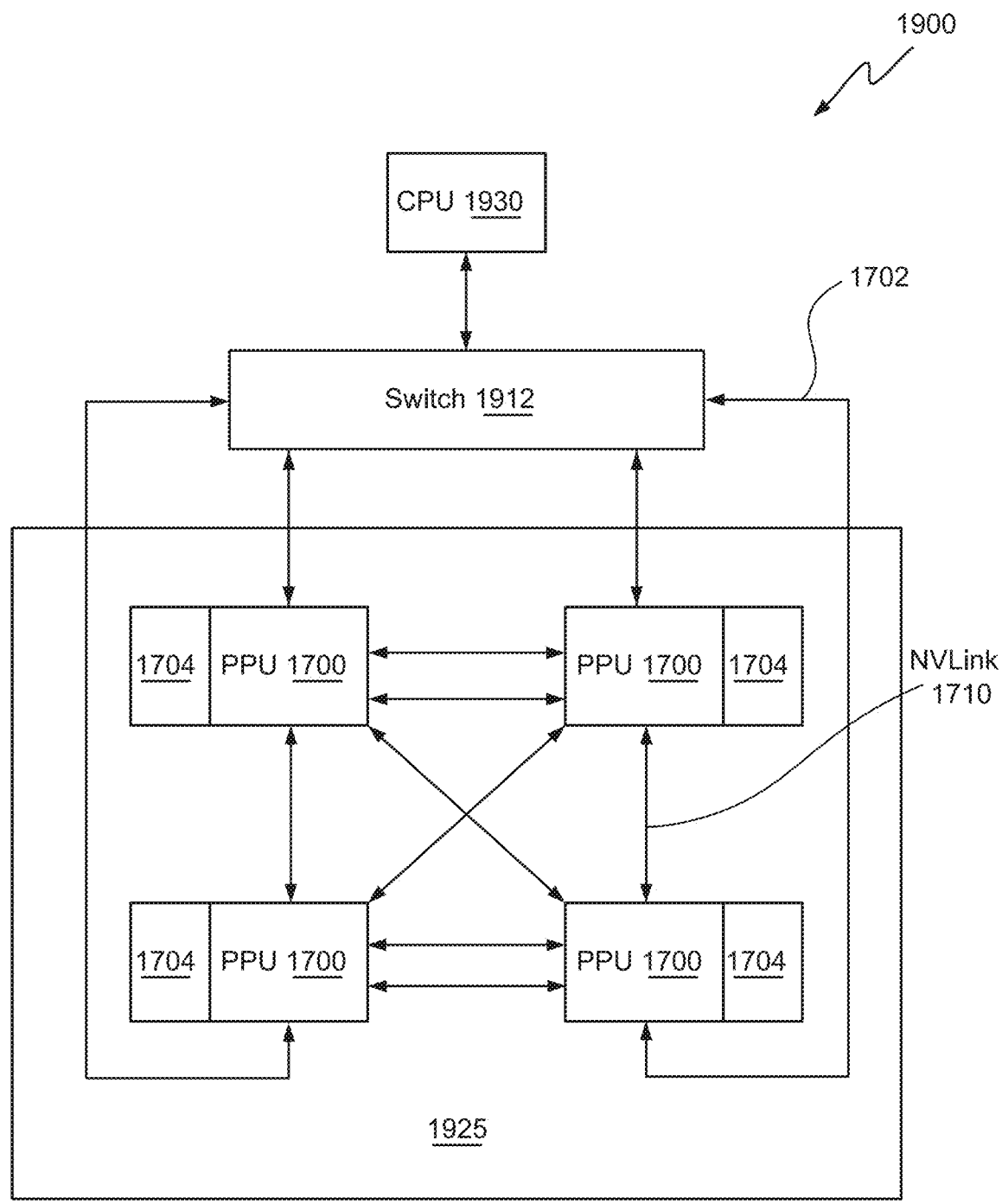
FIG. 23 is a conceptual diagram of a processing system implemented using PPUs of FIG. 17.

FIG. 23 is a conceptual diagram of a processing system 1900 implemented using the PPU 1700 of FIG. 17, in accordance with an embodiment. The exemplary system 1900 may be configured to implement one or more methods disclosed in this application. The processing system 1900 includes a CPU 1930, switch 1912, and multiple PPUs 1700 each and respective memories 1704. The NVLink 1710 provides high-speed communication links between each of the PPUs 1700. Although a particular number of NVLink 1710 and interconnect 1702 connections are illustrated in FIG. 23, the number of connections to each PPU 1700 and the CPU 1930 may vary. The switch 1912 interfaces between the interconnect 1702 and the CPU 1930. The PPUs 1700, memories 1704, and NVLinks 1710 may be situated on a single semiconductor platform to form a parallel processing module 1925. In an embodiment, the switch 1912 supports two or more protocols to interface between various different connections and/or links.

In another embodiment (not shown), the NVLink 1710 provides one or more high-speed communication links between each of the PPUs 1700 and the CPU 1930 and the switch 1912 interfaces between the interconnect 1702 and each of the PPUs 1700. The PPUs 1700, memories 1704, and interconnect 1702 may be situated on a single semiconductor platform to form a parallel processing module 1925. In yet another embodiment (not shown), the interconnect 1702 provides one or more communication links between each of the PPUs 1700 and the CPU 1930 and the switch 1912 interfaces between each of the PPUs 1700 using the NVLink 1710 to provide one or more high-speed communication links between the PPUs 1700. In another embodiment (not shown), the NVLink 1710 provides one or more high-speed communication links between the PPUs 1700 and the CPU 1930 through the switch 1912. In yet another embodiment (not shown), the interconnect 1702 provides one or more communication links between each of the PPUs 1700 directly. One or more of the NVLink 1710 high-speed communication links may be implemented as a physical NVLink interconnect or either an on-chip or on-die interconnect using the same protocol as the NVLink 1710.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1925 may be implemented as a circuit board substrate and each of the PPUs 1700 and/or memories 1704 may be packaged devices. In an embodiment, the CPU 1930, switch 1912, and the parallel processing module 1925 are situated on a single semiconductor platform.

In an embodiment, the signaling rate of each NVLink 1710 is 20 to 25 Gigabits/second and each PPU 1700 includes six NVLink 1710 interfaces (as shown in FIG. 23, five NVLink 1710 interfaces are included for each PPU 1700). Each NVLink 1710 provides a data transfer rate of 25 Gigabytes/second in each direction, with six links providing 1700 Gigabytes/second. The NVLinks 1710 can be used exclusively for PPU-to-PPU communication as shown in FIG. 23, or some combination of PPU-to-PPU and PPU-to-CPU, when the CPU 1930 also includes one or more NVLink 1710 interfaces.

In an embodiment, the NVLink 1710 allows direct load/store/atomic access from the CPU 1930 to each PPU's 1700 memory 1704. In an embodiment, the NVLink 1710 supports coherency operations, allowing data read from the memories 1704 to be stored in the cache hierarchy of the CPU 1930, reducing cache access latency for the CPU 1930. In an embodiment, the NVLink 1710 includes support for Address Translation Services (ATS), allowing the PPU 1700 to directly access page tables within the CPU 1930. One or more of the NVLinks 1710 may also be configured to operate in a low-power mode.

Figure 24:
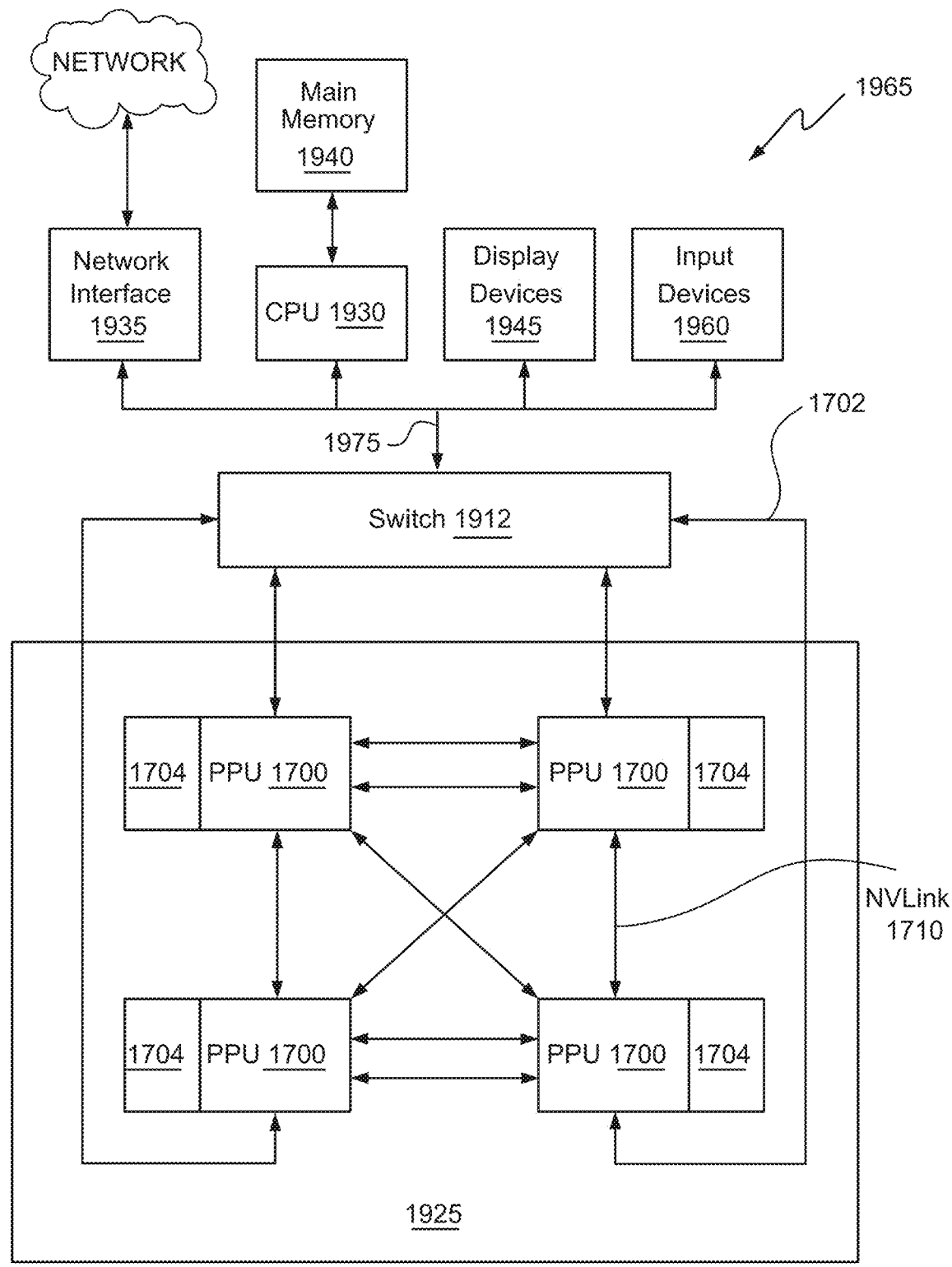
FIG. 24 expands FIG. 23 to show additional interconnected devices.

FIG. 24 illustrates an exemplary system 1965 in which the various architecture and/or functionality of the various previous embodiments may be implemented. The exemplary system 1965 may be configured to implement one or more methods disclosed in this application.

As shown, a system 1965 is provided including at least one central processing unit 1930 that is connected to a communication bus 1975. The communication bus 1975 may be implemented using any suitable protocol, such as PCI (Peripheral Component Interconnect), PCI-Express, AGP (Accelerated Graphics Port), HyperTransport, or any other bus or point-to-point communication protocol(s). The system 1965 also includes a main memory 1940. Control logic (software) and data are stored in the main memory 1940 which may take the form of random access memory (RAM).

The system 1965 also includes input devices 1960, the parallel processing system 1925, and display devices 1945, i.e. a conventional CRT (cathode ray tube), LCD (liquid crystal display), LED (light emitting diode), plasma display or the like. User input may be received from the input devices 1960, e.g., keyboard, mouse, touchpad, microphone, and the like. Each of the foregoing modules and/or devices may even be situated on a single semiconductor platform to form the system 1965. Alternately, the various modules may also be situated separately or in various combinations of semiconductor platforms per the desires of the user.

Further, the system 1965 may be coupled to a network (e.g., a telecommunications network, local area network (LAN), wireless network, wide area network (WAN) such as the Internet, peer-to-peer network, cable network, or the like) through a network interface 1935 for communication purposes.

The system 1965 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1940 and/or the secondary storage. Such computer programs, when executed, enable the system 1965 to perform various functions. The memory 1940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Machine Learning

Deep neural networks (DNNs) developed on processors, such as the PPU 1700 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1700. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1700 is a computing platform capable of delivering performance required for deep neural network-based artificial intelligence and machine learning applications.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method performed by a multiprocessor in a graphics processing unit to execute an operation on a communicatively coupled coprocessor, the graphics processing unit comprising the multiprocessor and the coprocessor and being communicatively coupled to a central processing unit, the method comprising:
  transmitting a request for a connection to the coprocessor to cause the coprocessor to reserve resources on the coprocessor for the operation;
  responsive to receiving a response to the request from the coprocessor indicating that resources for the operation have been reserved on the coprocessor, issuing a plurality of write instructions to write input data for the operation into coprocessor-accessible storage locations in said reserved resources;
  after issuing the plurality of write instructions, issuing an operation instruction to cause the coprocessor to execute the operation using said input data;
  issuing a plurality of read instructions to read result data of the operation from the coprocessor-accessible storage locations to multiprocessor-accessible storage locations; and
  closing the connection.

2. The method according to claim 1, further comprising blocking on said issuing the plurality of write instructions until said response to the requested connection is received.

3. The method according to claim 2, wherein said blocking is the only blocking instruction between said requesting and said closing.

4. The method according to claim 2, further comprising:
  after the closing, waiting on said result data to be written to one or more of said multiprocessor-accessible storage locations; and
  following said waiting, consuming said result data in the multiprocessor-accessible storage locations.

5. The method according to claim 4, further comprising one or more other instructions between said closing and the waiting on said result data to be written.

6. The method according to claim 5, wherein the one or more other instructions include at least another sequence of instructions including an instruction to establish a second connection to the coprocessor and an instruction to close the second connection.

7. The method according to claim 4, wherein the waiting comprises waiting on a scoreboard.

8. The method according to claim 1, wherein the operation instruction is the only processing instruction issued by the multiprocessor to the coprocessor between said plurality of write instructions and the plurality of read instructions.

9. The method according to claim 8, wherein the operation instruction includes an immediate identifying the operation from among a plurality of operations that are executable on the coprocessor.

10. The method according to claim 8, wherein the operation instruction does not include any operands.

11. The method according to claim 2, further comprising issuing a macro initiation instruction, wherein the macro initiation instruction causes disabling of interrupts and execution of a predetermined number of instructions following the macro initiation instruction without intervening preemption.

12. The method according to claim 11, wherein the predetermined number is determined based on an operand of the macro initiation instruction.

13. The method according to claim 11, wherein the macro initiation instruction causes interrupts to be disabled for a predetermined number of subsequent instructions.

14. The method according to claim 11, wherein the macro initiation instruction includes said blocking.

15. The method according to claim 1, wherein the operation causes the coprocessor to execute a plurality of sub-operations, and wherein the method further comprises one or more said multiprocessor-accessible storage locations receiving data from respective ones of said sub-operations in a time staggered manner.

16. The method according to claim 1, wherein said input data is written from registers in the multiprocessor to a local memory of the coprocessor.

17. A graphics processing unit configured to be communicatively coupled to a central processing unit and comprising a multiprocessor and a communicatively coupled coprocessor having thereon coprocessor-accessible storage-locations, wherein the multiprocessor is configured to:
  transmit a request for a connection to the coprocessor to cause the coprocessor to reserve resources on the coprocessor for an operation;
  responsive to receiving a response to the request from the coprocessor indicating that resources for the operation on the coprocessor have been reserved, issue a plurality of write instructions to write input data for the operation into coprocessor-accessible storage locations in the reserved resources;
  after issuing the plurality of write instructions, issue an operation instruction to cause the coprocessor to execute the operation;
  issue a plurality of read instructions to read result data of the operation from the coprocessor-accessible storage locations to multiprocessor-accessible storage locations; and
  close the connection,
wherein the coprocessor is configured to:
  receive the request for the connection, and in response:
    reserve resources on the coprocessor for the operation; and
    transmit the response to the request, indicating that resources for the operation on the coprocessor have been reserved;
  receive the plurality of write instructions, and in response, write the input data into the coprocessor-accessible storage locations in the reserved resources;
  receive the operation instruction, and in response, execute the operation; and
  receive the plurality of read instructions, and in response, write the result data from the coprocessor-accessible storage locations to the multiprocessor-accessible storage locations.

18. A method performed by a multiprocessor to execute an operation on a communicatively coupled coprocessor, the method comprising:
  transmitting a request for a connection to the coprocessor to cause the coprocessor to reserve resources on the coprocessor for the operation;
  responsive to receiving a response to the request from the coprocessor indicating that resources for the operation have been reserved on the coprocessor, issuing a plurality of write instructions to write input data for the operation into coprocessor-accessible storage locations in said reserved resources;
  after issuing the plurality of write instructions, issuing an operation instruction to cause the coprocessor to execute the operation using said input data;

issuing a plurality of read instructions to read result data of the operation from the coprocessor-accessible storage locations to multiprocessor-accessible storage locations, blocking on said issuing the plurality of write instructions until said response to the requested connection is received; and closing the connection, wherein the method further comprises issuing a macro initiation instruction, wherein the macro initiation instruction causes disabling of interrupts and execution of a predetermined number of instructions following the macro initiation instruction without intervening preemption.

19. The method according to claim 18, wherein the predetermined number is determined based on an operand of the macro initiation instruction.

20. The method according to claim 18, wherein the macro initiation instruction causes interrupts to be disabled for a predetermined number of subsequent instructions.

21. The method according to claim 18, wherein the macro initiation instruction includes said blocking.

* * * * *